(12) United States Patent
Takahashi et al.

(10) Patent No.: US 11,479,399 B2
(45) Date of Patent: Oct. 25, 2022

(54) CONTAINER AND METHOD FOR MANUFACTURING CONTAINER

(71) Applicant: DAI NIPPON PRINTING CO., LTD., Tokyo (JP)

(72) Inventors: Makiko Takahashi, Tokyo (JP); Kaoru Watanabe, Tokyo (JP); Hiroshi Ishikawa, Tokyo (JP); Satoshi Takimoto, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 423 days.

(21) Appl. No.: 16/499,041

(22) PCT Filed: Mar. 28, 2018

(86) PCT No.: PCT/JP2018/013043
§ 371 (c)(1),
(2) Date: Sep. 27, 2019

(87) PCT Pub. No.: WO2018/181616
PCT Pub. Date: Oct. 4, 2018

(65) Prior Publication Data
US 2020/0039715 A1    Feb. 6, 2020

(30) Foreign Application Priority Data

Mar. 29, 2017  (JP) .............................. JP2017-065754
Mar. 29, 2017  (JP) .............................. JP2017-065855
Sep. 27, 2017  (JP) .............................. JP2017-187125

(51) Int. Cl.
*B65D 77/20*    (2006.01)
*B32B 27/08*    (2006.01)
(Continued)

(52) U.S. Cl.
CPC .......... *B65D 77/2032* (2013.01); *B32B 27/08* (2013.01); *B65D 51/1638* (2013.01);
(Continued)

(58) Field of Classification Search
CPC ................ B65D 81/3453; B65D 77/20; B65D 77/2028; B65D 77/204; B65D 77/2064; B65D 81/34; B65D 2251/20; A47J 36/027
(Continued)

(56) References Cited

U.S. PATENT DOCUMENTS 3,865,302 A  *  2/1975  Kane ...................... B65D 77/20
                                                                426/106
3,893,566 A  *  7/1975  Ross ..................... B65D 43/161
                                                              229/125.08
(Continued)

FOREIGN PATENT DOCUMENTS

JP      6344477     2/1988
JP      0995365     4/1997
(Continued)

OTHER PUBLICATIONS

Japanese Office Action, issued in the corresponding Japanese Patent application No. 2016-240076, dated Nov. 11, 2020, 10 pages.
(Continued)

*Primary Examiner* — Steven A. Reynolds
*Assistant Examiner* — Prince Pal
(74) *Attorney, Agent, or Firm* — Hamre, Schumann, Mueller & Larson, P.C.

(57) ABSTRACT

There is provided a container that makes it possible to suppress intrusion of bacteria from the tip of a pleat part into the inside of the container. The container includes: a main body that includes a body part defining a containing portion and a flange part extending outward from an upper portion of the body part; and a lid that is joined to the flange part of
(Continued)

the main body via an outer edge seal portion so as to cover the containing portion, the lid being formed by a lid member folded back at a fold-back portion such that portions of the lid member overlap each other. The lid has: a pleat part that includes the portions of the lid member overlapping each other and that extends from an edge of one side to an edge of the other side of the lid in a first direction; and a first lid part and a second lid part that are formed by the lid member and that are arranged on opposite sides of the pleat part. The pleat part includes: a pleat seal portion in which inner surfaces of the portions of the lid member are joined together and that extends from the edge of the one side to the edge of the other side of the lid in the first direction; and a steam passing portion that includes a through hole or a cutout formed in the pleat seal portion. Seal strength of the pleat seal portion is lower than that of the outer edge seal portion.

16 Claims, 33 Drawing Sheets

(51) Int. Cl.
  *B65D 51/16*   (2006.01)
  *B65D 81/34*   (2006.01)
(52) U.S. Cl.
  CPC ...... *B65D 81/3453* (2013.01); *B32B 2439/40* (2013.01); *B32B 2439/70* (2013.01)
(58) Field of Classification Search
  USPC ................ 229/125.5; 426/113, 127; 220/740
  See application file for complete search history.

(56) References Cited

U.S. PATENT DOCUMENTS

| | | | | | |
|---|---|---|---|---|---|
| 3,997,677 | A * | 12/1976 | Hirsch | ................. | B65D 81/343 428/419 |
| 4,252,238 | A * | 2/1981 | Spiegelberg | ........... | B65D 83/08 206/274 |
| 4,387,551 | A * | 6/1983 | Cowan | .................... | B29C 65/76 156/69 |
| 4,834,247 | A * | 5/1989 | Oshima | .................. | B65D 75/12 220/360 |
| 4,848,649 | A * | 7/1989 | Fuller | .................... | B65D 77/32 229/123.2 |
| 4,890,439 | A * | 1/1990 | Smart | ................ | B65D 81/3461 428/458 |
| 4,963,045 | A * | 10/1990 | Willcox | ................. | A45D 34/04 401/184 |
| 5,039,001 | A * | 8/1991 | Kinigakis | ............ | B65D 77/225 426/118 |
| 5,167,974 | A * | 12/1992 | Grindrod | ............. | B65D 75/326 206/466 |
| 5,171,950 | A * | 12/1992 | Brauner | ............. | B65D 81/3469 219/730 |
| 5,376,424 | A * | 12/1994 | Watanabe | ................ | E04B 1/803 428/920 |
| 5,587,192 | A * | 12/1996 | Beizermann | ......... | B65D 77/225 220/360 |
| 5,916,615 | A * | 6/1999 | Brady | .................... | B65D 75/26 229/123.1 |
| 5,919,547 | A * | 7/1999 | Kocher | .................. | B65D 81/20 426/127 |
| 6,032,800 | A * | 3/2000 | Kocher | .............. | B65D 81/2076 426/127 |
| 6,182,850 | B1 * | 2/2001 | Marbler | ................ | B65D 77/225 428/137 |
| 7,709,771 | B2 * | 5/2010 | Kanzaki | ............. | B65D 75/5805 219/730 |
| 8,829,400 | B2 * | 9/2014 | Yasumuro | ............ | B65D 77/225 219/730 |
| 10,974,888 | B2 * | 4/2021 | Kado | .................. | B65D 81/3453 |
| 11,008,146 | B2 * | 5/2021 | Chen | ...................... | B65D 65/40 |
| 2003/0123758 | A1 * | 7/2003 | Mita | ...................... | B65D 77/02 383/103 |
| 2006/0257056 | A1 * | 11/2006 | Miyake | .............. | B65D 75/5805 383/211 |
| 2007/0023425 | A1 * | 2/2007 | Kanzaki | ............. | B65D 81/3461 219/727 |
| 2007/0110856 | A1 * | 5/2007 | Kanzaki | ............... | B65D 77/225 426/107 |
| 2009/0110784 | A1 * | 4/2009 | Yasumuro | ............ | B65D 77/225 426/107 |
| 2009/0110785 | A1 * | 4/2009 | Yasumuro | ............. | A47J 36/027 426/107 |
| 2009/0145895 | A1 * | 6/2009 | Yasumuro | ............ | B65D 81/343 219/730 |
| 2009/0226117 | A1 * | 9/2009 | Davis | .................... | B29C 59/007 383/5 |
| 2009/0250466 | A1 * | 10/2009 | Fujimura | .......... | B29C 66/81465 220/359.1 |
| 2009/0283440 | A1 * | 11/2009 | Krumme | ............ | B65D 75/5855 428/34.1 |
| 2009/0289032 | A1 * | 11/2009 | Flanagan | ................... | C08J 5/12 216/34 |
| 2015/0048090 | A1 * | 2/2015 | Bandou | .............. | B65D 83/0805 220/359.1 |
| 2016/0326361 | A1 * | 11/2016 | Yamaguchi | ........... | C08F 279/02 |
| 2017/0021999 | A1 * | 1/2017 | Pawluk | .............. | B65D 90/0013 |
| 2020/0283213 | A1 * | 9/2020 | Zanarella | .............. | B65D 77/206 |
| 2021/0261310 | A1 * | 8/2021 | Kuiper | .................. | B32B 27/306 |

FOREIGN PATENT DOCUMENTS

| | | |
|---|---|---|
| JP | 2002-053183 | 2/2002 |
| JP | 2002-284251 | 10/2002 |
| JP | 2005-035568 | 2/2005 |
| JP | 2005-075426 | 3/2005 |
| JP | 2008-018946 | 1/2008 |
| JP | 2009-172902 | 8/2009 |
| JP | 2010-070217 | 4/2010 |
| JP | 2010-228182 | 10/2010 |
| JP | 2011-162198 | 8/2011 |
| JP | 4911030 | 4/2012 |
| JP | 1923326 | 5/2018 |
| WO | 2007/020854 | 2/2007 |

OTHER PUBLICATIONS

Korean Office Action, issued in the corresponding Korean patent application No. 10-2019-7031735, dated Jul. 30, 2021, 19 pages (inlcuding translation).
International Search Report, issued in the corresponding PCT application No. PCT/JP2018/013043, dated Jun. 12, 2018, 5 pages.

* cited by examiner

| S2 / S1 | L2 / L1 | FIRST SAMPLE | SECOND SAMPLE | THIRD SAMPLE | FOURTH SAMPLE | FIFTH SAMPLE |
|---|---|---|---|---|---|---|
| 1.3 | 0.3 | EXCELLENT | EXCELLENT | EXCELLENT | EXCELLENT | EXCELLENT |
| 1.4 | 0.3 | EXCELLENT | EXCELLENT | EXCELLENT | EXCELLENT | EXCELLENT |
| 1.5 | 0.3 | EXCELLENT | EXCELLENT | EXCELLENT | EXCELLENT | EXCELLENT |
| 1.6 | 0.3 | EXCELLENT | EXCELLENT | EXCELLENT | EXCELLENT | GOOD |

FIG.25

| S2 / S1 | L2 / L1 | FIRST SAMPLE | SECOND SAMPLE | THIRD SAMPLE | FOURTH SAMPLE | FIFTH SAMPLE |
|---|---|---|---|---|---|---|
| 1.3 | 1 | EXCELLENT | EXCELLENT | EXCELLENT | GOOD | EXCELLENT |
| 1.4 | 1 | EXCELLENT | GOOD | GOOD | GOOD | EXCELLENT |
| 1.5 | 1 | GOOD | GOOD | GOOD | GOOD | GOOD |
| 1.6 | 1 | GOOD | GOOD | NOT GOOD | NOT GOOD | NOT GOOD |

FIG.26

| S2 / S1 | L2 / L1 | FIRST SAMPLE | SECOND SAMPLE | THIRD SAMPLE | FOURTH SAMPLE | FIFTH SAMPLE |
|---|---|---|---|---|---|---|
| 1.3 | 0.2 | GOOD | GOOD | GOOD | EXCELLENT | GOOD |
| 1.3 | 0.4 | EXCELLENT | EXCELLENT | EXCELLENT | EXCELLENT | EXCELLENT |
| 1.3 | 0.6 | EXCELLENT | EXCELLENT | EXCELLENT | EXCELLENT | EXCELLENT |
| 1.3 | 0.8 | EXCELLENT | EXCELLENT | EXCELLENT | EXCELLENT | EXCELLENT |
| 1.3 | 1 | EXCELLENT | EXCELLENT | EXCELLENT | GOOD | GOOD |

FIG.27

|  | FIRST SAMPLE | SECOND SAMPLE | THIRD SAMPLE | AVERAGE |
|---|---|---|---|---|
| OUTER EDGE SEAL PORTION | 15.4N | 16.7N | 15.1N | 15.7N |
| PLEAT SEAL PORTION | 8.1N | 8.6N | 9.4N | 8.7N |

FIG. 28

|  | FIRST SAMPLE | SECOND SAMPLE | THIRD SAMPLE | AVERAGE |
|---|---|---|---|---|
| OUTER EDGE SEAL PORTION | 4.1N | 4.8N | 3.0N | 4.0N |
| PLEAT SEAL PORTION | 2.2N | 2.3N | 2.3N | 2.3N |

FIG. 29

CONTAINER AND METHOD FOR MANUFACTURING CONTAINER

TECHNICAL FIELD

An embodiment of the present disclosure relates to a container including a main body having a body part and a flange part, and a lid joined to the flange part, and a method for manufacturing the same.

BACKGROUND OF THE INVENTION

For example, as disclosed in Patent Literature 1 as a container for containing contents such as cooked food, there is known a container that includes a body part defining a containing portion, a main body that has a flange part extending outward from the upper side of the body part, and a lid that is joined to the flange part. The container is provided with a steam removal mechanism for letting out steam generated when the contents are heated by a microwave oven or the like. In the container disclosed in Patent Literature 1, the steam removal mechanism is composed of a through hole formed in the steam removal seal portion of the butt part (pleat part) of the lid.

PRIOR ART DOCUMENT

Patent Document

Patent Literature 1: Japanese Patent No. 4911030

SUMMARY OF THE INVENTION

Problems to be Solved by the Invention

According to Patent Literature 1 described above, the pleat part is formed by overlapping partial inner surfaces of two multilayer films. In this case, since the ends of the multilayer films are exposed to the outside at the tip of the pleat part, there is a high possibility that bacteria enter from the tip of the pleat part into the inside of the container.

An embodiment of the present disclosure aims to provide a container that can effectively solve such a problem and a method for manufacturing the same.

Solution to Problem

A container having a containing portion for containing contents according to a first embodiment of the present disclosure includes: a main body that includes a body part defining the containing portion and a flange part extending outward from an upper portion of the body part; and a lid that is joined to the flange part of the main body via an outer edge seal portion so as to cover the containing portion, the lid being formed by a lid member folded back at a fold-back portion such that portions of the lid member overlap each other. The lid has: a pleat part that includes the portions of the lid member overlapping each other and that extends from an edge of one side to an edge of the other side of the lid in a first direction; and a first lid part and a second lid part that are formed by the lid member and that are arranged on opposite sides of the pleat part. The pleat part includes: a pleat seal portion in which inner surfaces of the portions of the lid member are joined together and that extends from the edge of the one side to the edge of the other side of the lid in the first direction; and a steam passing portion that includes a through hole or a cutout in the pleat seal portion. Seal strength of the pleat seal portion is lower than that of the outer edge seal portion.

In the container according to the first embodiment of the present disclosure, a maximum distance between inner edges of the outer edge seal portion opposed in the first direction D1 may be smaller than a maximum distance between the inner edges of the outer edge seal portion opposed in a second direction orthogonal to the first direction.

In the container according to the first embodiment of the present disclosure, the flange part may include a first edge portion and a second edge portion opposed to each other in the second direction orthogonal to the first direction, and the pleat part may extend in the first direction on a side nearer the first edge portion than a center point of the containing portion of the main body.

In the container according to the first embodiment of the present disclosure, L2/L1 may be 0.3 or more and 0.6 or less, where L1 represents a maximum distance in the second direction between the center point of the containing portion of the main body and the inner edge of the outer edge seal portion extending along the first edge portion and L2 represents a maximum distance in the second direction between a base portion of the pleat part and the inner edge of the outer edge seal portion extending along the first edge portion.

In the container according to the first embodiment of the present disclosure, seal strength of the pleat seal portion with a width of 15 mm at 25° C. is preferably 12N or less.

In the container according to the first embodiment of the present disclosure, the steam passing portion may include the through hole formed in the pleat seal portion so as not to reach the fold-back portion of the pleat part.

In the container according to the first embodiment of the present disclosure, the through hole may have at least partially a shape linearly extending along the first direction.

In the container according to the first embodiment of the present disclosure, the steam passing portion may include the cutout formed in the pleat seal portion at the fold-back portion of the pleat part.

In the container according to the first embodiment of the present disclosure, an A axis may be shorter than a B axis, where the A axis is an axis that passes through the center point of the containing portion and has a minimum distance when connecting two points in an outer edge of the outer edge seal portion and the B axis is an axis that passes through the center point of the containing portion and connects two points in the outer edge of the outer edge seal portion so as to be orthogonal to the A axis. The pleat part may traverse the containing portion and extend along the B axis.

In the container according to the first embodiment of the present disclosure, a ratio of a length of the B axis to a length of the A axis may be 1.2 or more and 3.0 or less.

In the container according to the first embodiment of the present disclosure, a bottom member constituting the main body may include at least a thermoplastic resin layer constituting an inner surface located on the containing portion side; and a base material laminated on the thermoplastic resin layer, and the base material of the bottom member may include a stretched film.

In the container according to the first embodiment of the present disclosure, the bottom member may further include a print layer.

In the container according to the first embodiment of the present disclosure, tensile strength of the bottom member may be 40 MPa or more.

The container according to the first embodiment of the present disclosure may further include an opening means formed on the lid and the flange part, and tear strength of the main body and the lid may be 15N or less.

In the container according to the first embodiment of the present disclosure, the flange part may include a first edge portion and a second edge portion extending parallel to each other, and the opening means may be configured to facilitate tearing of an area the flange part extending along the first edge portion at a position more inside than the outer edge seal portion extending along the first edge portion.

In the container according to the first embodiment of the present disclosure, the opening means may include at least a notch or a scar group formed in the flange part.

A method for manufacturing a container including: a containing portion that contains contents and a steam passing portion that is configured to communicate the containing portion with outside when pressure of the containing portion increases according to the first embodiment of the present disclosure, includes: a main body preparation step of preparing a main body that includes a body part defining the containing portion and a flange part extending outward from an upper portion of the body part; a step of filling contents into the body part of the main body; a step of preparing a lid for covering the containing portion; and a step of forming an outer edge seal portion by joining the lid to the flange part of the main body. The step of preparing the lid comprises: a step of preparing a lid member for constituting the lid; a step of forming a pleat part by folding back the lid member at a fold-back portion such that portions of the lid member overlap each other; a step of forming a pleat seal portion by joining inner surfaces of the portions of the lid member at the pleat part; and a step of forming a through hole or a cutout constituting the steam passing portion in the pleat seal portion. The seal strength of the pleat seal portion is lower than that of the outer edge seal portion.

In the method for manufacturing the container according to the first embodiment of the present disclosure, the main body preparing step may include: a step of preparing a bottom member for constituting the main body; and a step of forming the body part by subjecting the bottom member to draw forming.

In the method for manufacturing the container according to the first embodiment of the present disclosure, a bottom member for constituting the main body may have at least a thermoplastic resin layer constituting an inner surface located on the containing portion side; and a base material laminated on the thermoplastic resin layer, and the base material of the bottom member may include a stretched film.

A container according to a second embodiment of the present disclosure includes: a main body (container main body) that includes a body part defining a containing portion and a flange part provided by one round on an upper portion of the body part; and a lid member that is joined to the flange part to cover the containing portion of the main body. An outer edge seal portion is provided by one round between the flange part and the lid. The lid includes a pleat part in which inner surfaces are opposed to each other. The pleat part has two first pleat seal portions that extend from the flange part toward a tip of the pleat part and a second pleat seal portion that is positioned between the two first pleat seal portions. An A axis is shorter than a B axis, where the A axis is an axis that passes through a center point of the containing portion and has a minimum distance when connecting two points in an outer edge of an outer edge seal portion and the B axis is an axis that passes through the center point of the containing portion and connects two points in the outer edge of the outer edge seal portion so as to be orthogonal to the A axis. The pleat part traverses the containing portion and extends along the B axis. The second pleat seal portion is provided with a steam passing portion.

In the container of the second embodiment of the present disclosure, the pleat part may be formed by folding back a single base material.

In the container of the second embodiment of the present disclosure, the steam passing portion may include an incision, a cutout, or a hole.

In the container of the second embodiment of the present disclosure, the outer edge seal portion may be formed with a width of 3 mm or more and 7 mm or less.

In the container of the second embodiment of the present disclosure, a ratio of a length of the B axis to a length of the A axis may be 1.2 or more and 3.0 or less.

A container having a containing portion for containing contents according to a third embodiment of the present disclosure includes: a main body that includes a body part defining the containing portion and a flange part extending outward from an upper portion of the body part, the main body being formed by a bottom member (first laminated body); a lid that is joined to the flange part of the main body via an outer edge seal portion so as to cover the containing portion, the lid being formed by a lid member (second laminated body); and a steam passing portion that is configured to communicate the containing portion with outside of the container when pressure of the containing portion increases. The bottom member includes at least a thermoplastic resin layer constituting an inner surface located on the containing portion side; and a base material laminated on the thermoplastic resin layer. The base material of the bottom member includes a stretched film.

In the container according to the third embodiment of the present disclosure, the bottom member may further include a print layer provided on the base material so that a display portion is viewable when the main body is seen from an outer surface side of the bottom member.

In the container of the third embodiment of the present disclosure, tensile strength of the bottom member may be 40 MPa or more.

In the container of the third embodiment of the present disclosure, joint strength between the flange part and the lid may be 23N or more.

In the container of the third embodiment of the present disclosure, depth of the body part may be 5 mm or more and 20 mm or less.

In the container of the third embodiment of the present disclosure, thickness of the bottom member may be 150 μm or less.

A method for manufacturing a container including: a containing portion that contains contents and a steam passing portion that is configured to communicate the containing portion with outside when pressure of the containing portion increases according to the third embodiment of the present disclosure, includes: a step of preparing a bottom member (first laminated body) for constituting a main body having a body part defining the containing portion and a flange part extending outward from an upper portion of the body part; a step of forming the body part by subjecting the bottom member to draw forming; a step of filling contents into the body part; a step of overlapping a lid member (second laminated body) for constituting a lid covering the containing portion on the bottom member; and a step of joining the lid member to the flange part extending outward from the upper portion of the body part of the bottom member. The bottom member includes at least a thermoplastic resin layer constituting an inner surface located on the containing portion side; and a base material laminated on the thermoplastic resin layer. The base material of the bottom member includes a stretched film.

In the method for manufacturing a container according to the third embodiment of the present disclosure, the bottom member may further include a print layer provided on the base material so that a display portion is viewable when the main body is seen from an outer surface side of the bottom member.

In the method for manufacturing a container of the third embodiment of the present disclosure, tensile strength of the bottom member may be 40 MPa or more.

A container having a containing portion for containing contents according to a fourth embodiment of the present disclosure includes: a main body that includes a body part defining the containing portion and a flange part extending outward from an upper portion of the body part, the main body being formed by a bottom member (first laminated body); a lid that is joined to the flange part of the main body via an outer edge seal portion so as to cover the containing portion, the lid being formed by a lid member (second laminated body); a steam passing portion that is configured to communicate the containing portion with outside of the container when pressure of the containing portion increases; and an opening means formed at the lid and the flange part, and tear strength of the main body and the lid is 15N or less.

In the container of the fourth embodiment of the present disclosure, the flange part may include a first edge portion and a second edge portion extending parallel to each other in the first direction, and the opening means may be configured to facilitate tearing of the main body and the lid in the first direction.

In the container of the fourth embodiment of the present disclosure, the opening means may be configured to facilitate tearing of an area the flange part extending along the first edge portion at a position more inside than the outer edge seal portion extending along the first edge portion.

In the container according to the fourth embodiment of the present disclosure, the bottom member may include at least a thermoplastic resin layer that constitutes an inner surface located on the containing portion side; and a first base material that includes a stretched film that is stretched along the first direction.

In the container according to the fourth embodiment of the present disclosure, the opening means may include at least a notch or a scar group formed in the flange part.

In the container of the fourth embodiment of the present disclosure, joint strength between the flange part and the lid may be 23N or more.

In the container of the fourth embodiment of the present disclosure, depth of the body part may be 5 mm or more and 20 mm or less.

In the container of the fourth embodiment of the present disclosure, thickness of the bottom member may be 150 μm or less.

A method for manufacturing a container including: a containing portion that contains contents and a steam passing portion that is configured to communicate the containing portion with outside when pressure of the containing portion increases according to the fourth embodiment of the present disclosure, includes: a step of preparing a bottom member (first laminated body) for constituting a main body having a body part defining the containing portion and a flange part extending outward from an upper portion of the body part; a step of forming the body part by subjecting the bottom member to draw forming; a step of filling contents into the body part; a step of overlapping a lid member (second laminated body) for constituting a lid covering the containing portion on the bottom member; and a step of joining the lid member to the flange part extending outward from the upper portion of the body part of the bottom member. The flange part has an opening means formed. The draw forming is performed with a temperature of the bottom member lower than a melting point of the thermoplastic resin layer of the bottom member.

In the method for manufacturing a container of the fourth embodiment of the present disclosure, tear strength of the main body and the lid may be 15N or less.

In the method for manufacturing a container of the fourth embodiment of the present disclosure, the flange part may include a first edge portion and a second edge portion extending parallel to each other in the first direction, and the opening means may be configured to facilitate tearing of the main body and the lid in the first direction.

Effect of the Invention

According to the container of the first embodiment of the present disclosure, it is possible to suppress intrusion of bacteria from the tip of the pleat part into the inside of the container.

BRIEF DESCRIPTION OF THE DRAWINGS

FIG. 25 is a diagram illustrating measurement results in example A1 of the first embodiment.

FIG. 26 is a diagram illustrating measurement results in example A2 of the first embodiment.

FIG. 27 is a diagram illustrating measurement results in example A3 of the first embodiment.

FIG. 28 is a diagram illustrating measurement results at 25° C. in example A4 of the first embodiment.

FIG. 29 is a diagram illustrating measurement results at 100° C. in the example A4 of the first embodiment.

DETAILED DESCRIPTION OF THE INVENTION

First Embodiment

Figure 1:
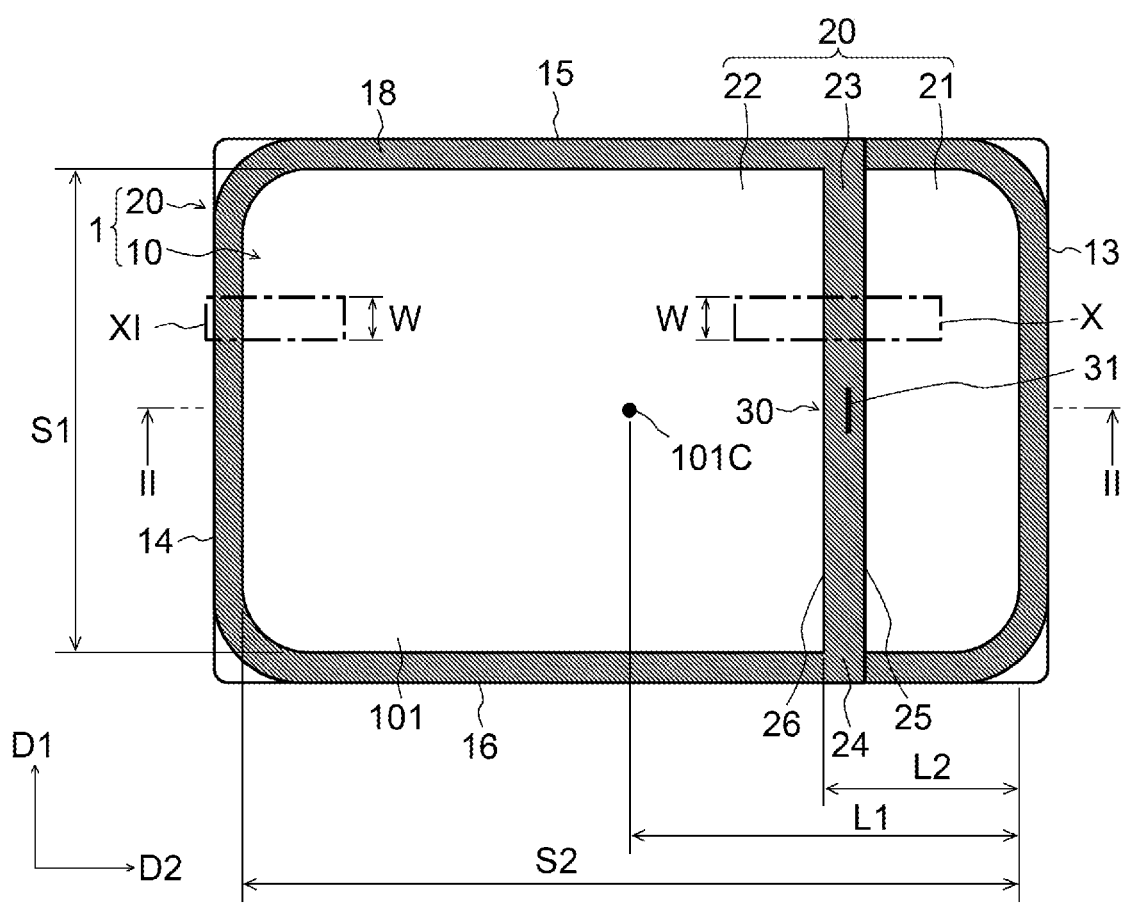
FIG. 1 is a plan view of a container in a first embodiment.

A first embodiment will be described with reference to FIGS. 1 to 17. In the drawings attached to this specification, for the convenience of illustration and the ease of understanding, the reduction scales and the length-to-width ratios are modified and exaggerated as appropriate from actual ones.

In addition, the terms such as "parallel", "orthogonal", and "identical", for example, and the values of length and angle used herein to specify the shapes or geometric conditions and the degrees thereof are not bound by strict meanings but should be interpreted including the extent to which similar functions can be expected.

Figure 2A:
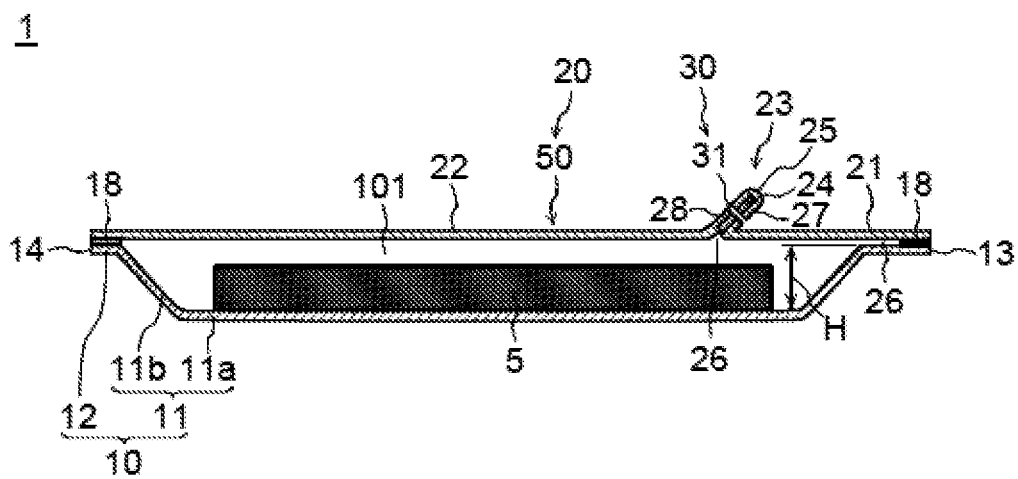
FIG. 2A is a cross-sectional view of the container illustrated in FIG. 1 as viewed along line II-II.

FIG. 1 is a plan view of a container 1 according to the present embodiment. FIG. 2A is a cross-sectional view of the container 1 illustrated in FIG. 1 as viewed along line II-II. The container 1 includes a main body 10 in which a containing portion 101 for containing contents is formed, and a lid 20 joined to the main body 10 so as to cover the containing portion 101. A portion of the lid 20 has a steam passing portion 30 for letting out the steam generated in the containing portion 101 by heating the contents to the outside of the containing portion 101.

The term "joining" here is a concept including both welding and adhesion. The "welding" means attaching the lid 20 to the main body 10 by at least partially melting at least either the main body 10 or the lid 20. Further, "adhesion" means attaching the lid 20 to the main body 10 using a component separate from the main body 10 and the lid 20, such as an adhesive.

The contents contained in the main body 10 include at least water. Examples of the contents include retort food, frozen food, refrigerated food, and others. The contents may also be ones containing relatively little water, such as fish fillets and dried fish.

Hereinafter, the main body 10 and the lid 20 will be described.

[Main Body]

As illustrated in FIGS. 1 and 2A, the main body 10 includes a body part 11 that defines the containing portion 101 and a flange part 12 that extends outward from the upper portion of the body part 11. The body part 11 includes, for example, a bottom portion 11a and a side portion 11b erected from the bottom portion 11a so as to extend around the outer edge of the bottom portion 11a. The flange part 12 is connected to the upper portion of the body part 11 by one round. The lid 20 is disposed on the upper surface of the flange part 12. Although not illustrated, when the rigidity of the main body 10 is low, the body part 11 and the flange part 12 may be partially curved.

The terms "bottom surface", "side surface", "upper portion", and the like used herein refer to the positions and orientations of the container 1, the main body 10, the lid 20, and their constituent elements with reference to the state in which the container 1 is placed with the containing portion 101 of the main body 10 opened upward. Further, the term "outside" refers to the side away from the center of the containing portion 101 of the main body 10 in a plan view. Further, the term "inside" refers to the side closer to the center of the containing portion 101 of the main body 10.

In the present embodiment, each of the bottom portion 11a and the flange part 12 has a substantially rectangular outline. For example, the flange part 12 includes a first edge portion 13 and a second edge portion 14 opposed to each other, and a third edge portion 15 and a fourth edge portion 16 extending between the first edge portion 13 and the second edge portion 14. The first edge portion 13 and the second edge portion 14 extend in parallel to each other in a first direction D1, and are opposed to each other in a second direction D2 crossing the first direction D1. The third edge portion 15 and the fourth edge portion 16 extend in parallel to each other in the second direction D2 crossing the first direction D1, and also are opposed to each other in the first direction D1. In the example illustrated in FIG. 1, the second direction D2 is orthogonal to the first direction D1. The term "parallel" means that the angle between the direction in which one edge portion extends and the direction in which the other edge portion extends is 20° or less. In addition, the term "crossing" means that the angle between the direction in which one edge portion extends and the direction in which the other edge portion extends is greater than 20°.

As illustrated in FIG. 1, the corner of the flange part may have an arc shape which is chamfered to protrude outward. Although not illustrated, the corner of the flange part may have a non-chamfered angular shape. Further, the outline of the bottom portion 11a and the outline of the flange part 12 may or may not be similar.

As illustrated in FIG. 1, the lid 20 for covering the containing portion 101 of the main body 10 is joined to the upper surface of the flange part 12 via an outer edge seal portion 18. In addition, as long as the outer edge seal portion 18 is continuous around the circumference of the flange part 12, the flange part 12 does not have to be entirely joined to the lid 20 but the flange part 12 may have a non-seal portion not joined to the lid 20.

Referring to FIG. 1, the sign S1 represents the maximum distance between the inner edges of the outer edge seal portion 18 opposed in the first direction D1, that is, the maximum distance in the first direction D1 from an inner edge of the outer edge seal portion 18 along the third edge portion 15 to an inner edge of the outer edge seal portion 18 along the fourth edge portion 16. In the example illustrated in FIG. 1, the maximum distance S1 is equal to the maximum distance in the first direction D1 between the inner edge of the third edge portion 15 and the inner edge of the fourth edge portion 16 of the flange part 12. In addition, the sign S2 represents the maximum distance between the inner edges of the outer edge seal portion 18 opposed in the second direction D2, that is, the maximum distance in the second direction D2 from an inner edge of the outer edge seal portion 18 along the first edge portion 13 to an inner edge of the outer edge seal portion 18 along the second edge portion 14. In the example illustrated in FIG. 1, the maximum distance S2 is equal to the maximum distance in the second direction D2 between the inner edge of the first edge portion 13 and the inner edge of the second edge portion 14 of the flange part 12.

In the example illustrated in FIG. 1, the maximum distance S1 is shorter than the maximum distance S2. The ratio of the maximum distance S2 to the maximum distance S1 (=S2/S1) may be, for example, 1.0 or more and 1.8 or less, and may be 1.3 or more and 1.6 or less.

[Lid]

As illustrated in FIGS. 1 and 2A, the lid 20 is formed by folding back a sheet member (hereinafter, also referred to as lid member) for producing the lid 20 at a fold-back portion 25 such that portions of the sheet member overlap each other. In the following description, the overlapping portions of the lid member 50 folded back at the fold-back portion 25 will be referred to as a pleat part 23. As illustrated in FIG. 1, the pleat part 23 extends in the first direction D1 from one edge portion (on the third edge portion 15 side of the flange part 12) to the other edge portion (on the fourth edge portion 16 side of the flange part 12) of the lid 20. As described later, the first direction D1 in which the pleat part 23 extends is a direction parallel to a transport direction T in which the bottom member and the lid member for forming the main body 10 and the lid 20 are transported in the manufacturing process of the container 1.

The lid 20 has the pleat part 23, and a first lid part 21 and a second lid part 22 that are positioned on opposite sides of the pleat part 23 and are formed from the lid member 50. The first lid part 21 is located closer to the first edge portion 13 than the pleat part 23 in the second direction D2, and the second lid part 22 is located closer to the second edge portion 14 than the pleat part 23 in the second direction D2. In the following description, a portion of the lid member 50 constituting the pleat part 23 which is located closer to the first lid part 21 than the fold-back portion 25 will be referred to as a first portion 27, and a portion of the lid member 50 constituting the pleat part 23 which is located closer to the second lid part 22 than the fold-back portion 25 will be referred to as a second portion 28. As illustrated in FIG. 2A, the first portion 27 and the second portion 28 are integrated via the fold-back portion 25. In the present embodiment, as illustrated in FIG. 2A, the first portion 27 of the pleat part 23 and the first lid part 21 are also integrated, and the second portion 28 of the pleat part 23 and the second lid part 22 are also integrated.

The pleat part 23 includes a pleat seal portion 24 and a steam passing portion 30 formed in the pleat seal portion 24. The pleat seal portion 24 is a seal portion in which inner surfaces of portions of the lid member 50 are joined together to extend from one edge portion (on the third edge portion 15 side of the flange part 12) to the other edge portion (on the fourth edge portion 16 side of the flange part 12) of the lid 20 in the first direction D1. The steam passing portion 30 includes, for example, a through hole 31 formed in the pleat seal portion 24 so as to penetrate the pleat part 23. In the example illustrated in FIG. 1, the through hole 31 has a shape extending linearly along the first direction D1. With the linearly extending shape, the dimension of the through hole 31 can be reduced in a direction orthogonal to the first direction D1. This makes it possible to decrease the width of the pleat seal portion 24 required for formation of the through hole 31.

Figure 2B:
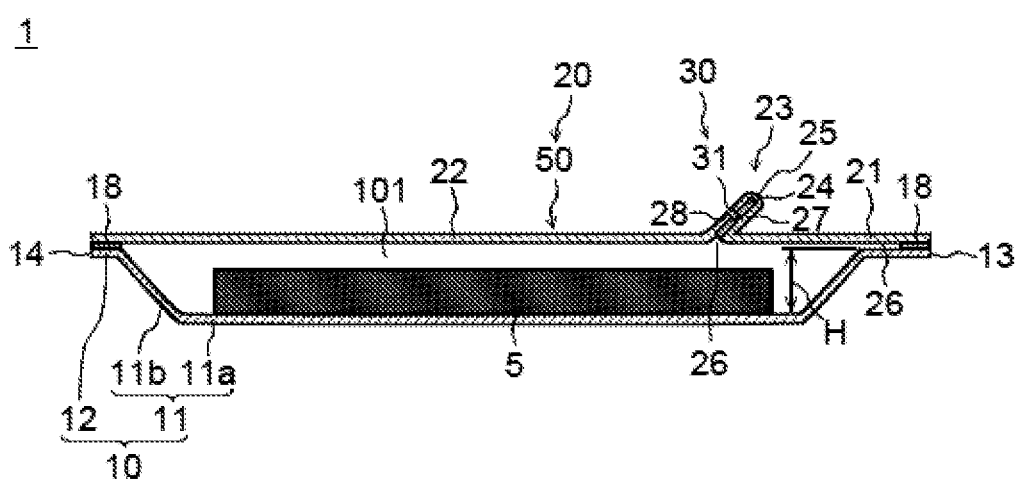
FIG. 2B is a cross-sectional view of a modification example of a steam passing portion of the container.

FIG. 2A illustrates an example in which the through hole 31 penetrates both the first portion 27 and the second portion 28 of the pleat part 23. However, the through hole 31 is not limited to this but may penetrate at least either the first portion 27 or the second portion 28 of the pleat part 23. For example, as illustrated in FIG. 2B, the through hole 31 may penetrate the second portion 28 but may not penetrate the first portion 27. Alternatively, although not illustrated, the through hole 31 may penetrate the first portion 27 but may not penetrate the second portion 28. When the through hole 31 penetrates at least one of the first portion 27 and the second portion 28 of the pleat part 23, it is possible to suppress the through hole 31 of one container 1 from getting caught in the through hole 31 of another container 1 during packing or stacking of the containers 1 as compared to the case in which the through hole 31 penetrates both the first portion 27 and the second portion 28. Further, it is possible to suppress intrusion of bacteria and the like into the container 1 through the through hole 31.

As illustrated in FIG. 1, the pleat part 23 may extend in the first direction D1 on the side closer to the first edge portion 13 than a center point 101C of the containing portion 101 of the main body 10. In other words, the pleat part 23 may not overlap the central point 101C of the containing portion 101 of the main body 10 in a plan view. Although not illustrated, the pleat part 23 may extend in the first direction D1 so as to overlap the center point 101C of the containing portion 101 of the main body 10 in a plan view.

In FIG. 1, reference sign L1 represents the maximum distance in the second direction D2 between the center point 101C of the containing portion 101 of the main body 10 and the inner edge of the outer edge seal portion 18 along the first edge portion 13. Reference sign L2 represents the maximum distance in the second direction D2 between a base 26 of the pleat part 23 and the inner edge of the outer edge seal portion 18 along the first edge portion 13. When the pleat part 23 is positioned closer to the first edge portion 13 than the center point 101C of the containing portion 101 of the main body 10, the maximum distance L2 is shorter than the maximum distance L1. On the other hand, when the pleat part 23 overlaps the center point 101C of the containing portion 101 of the main body 10, the maximum distance L2 is equal to the maximum distance L1.

As a result of intensive research conducted by the inventors of the present invention, it has been revealed that, in the case where the pleat part 23 overlaps or is close to the center point 101C of the containing portion 101 of the main body 10, when the internal pressure of the containing portion 101 increases, the pleat seal portion 24 or the outer edge seal portion 18 are likely to peel on the third edge portion 15 or the fourth edge portion 16 as described later in relation to examples below. When the pleat seal portion 24 or the outer edge seal portion 18 on the third edge portion 15 or the fourth edge portion 16 peels off earlier than the pleat seal portion 24 around the steam passing portion 30, the steam in the containing portion 101 comes out of the third edge portion 15 or the fourth edge portion 16, not out of the steam passing portion 30. Therefore, in order to suppress the steam from escaping from the third edge portion 15 or the fourth edge portion 16, the pleat part 23 is preferably separated from the central point 101C of the containing portion 101 of the main body 10. On the other hand, when the pleat part 23 is too far from the center point 101C of the containing portion 101 of the main body 10, pressure will be unlikely to be applied to the pleat seal portion 24 around the steam passing portion 30. In consideration of these points, the pleat part 23 is preferably provided at a position away from the center point 101C within a predetermined range. For example, L2/L1 is preferably 0.3 or more and 0.8 or less, and more preferably 0.3 or more and 0.6 or less.

(Bottom Member)

Figure 3:
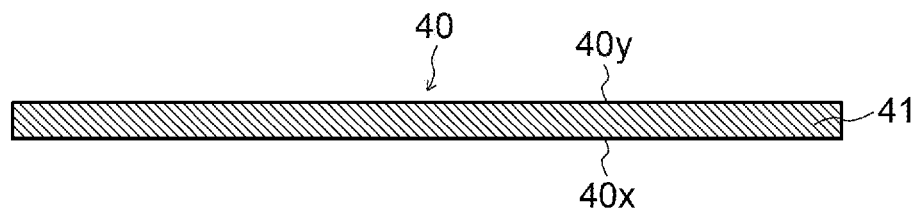
FIG. 3 is a cross-sectional view of an example of a layered structure of a bottom member constituting a main body.

Next, a layered structure of a sheet member (hereinafter, also referred to as bottom member) for forming the main body 10 will be described. As illustrated in FIG. 3, the bottom member 40 includes at least a first base material 41.

Figure 4:
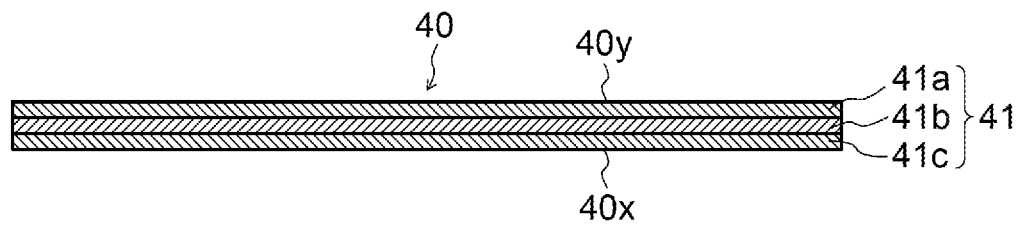
FIG. 4 is a cross-sectional view of another example of a layered structure of a bottom member constituting a main body.
Figure 5:
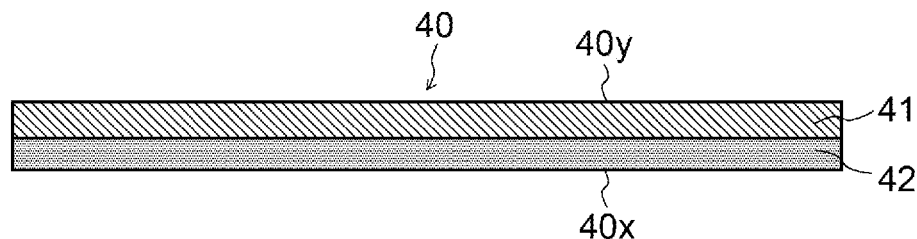
FIG. 5 is a cross-sectional view of another example of a layered structure of a bottom member constituting a main body.

When producing the main body 10 by the sheet forming method, a film of non-stretched plastic such as non-stretched polypropylene and non-stretched nylon can be used as a material for forming the first base material 41. The first base material 41 may be formed from a single layer as illustrated in FIG. 3 or may include a plurality of layers as illustrated in FIG. 4. For example, the first base material 41 is a coextruded sheet including a first layer 41a made of polypropylene, a second layer 41b made of EVOH or nylon, and a third layer 41c made of polypropylene. EVOH is an ethylene-vinyl alcohol copolymer. As illustrated in FIG. 5, the bottom member 40 may further include a thermoplastic resin layer 42 positioned closer to an inner surface 40x than the first base material 41. As a material for forming the thermoplastic resin layer 42, a non-stretched polypropylene film, polyethylene, and a resin with a blend of them, or the like can be used, for example. When the sheet member for forming the bottom member 40 includes the first base material 41 containing a non-stretched plastic film, the thickness of the sheet member is 150 μm or more and 800 μm or less, for example.

Figure 6:
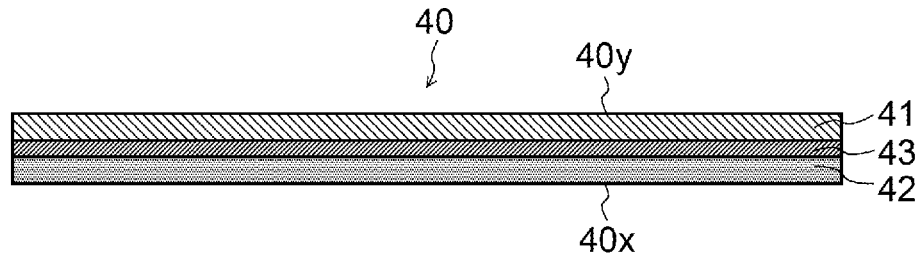
FIG. 6 is a cross-sectional view of another example of a layered structure of a bottom member constituting a main body.

In addition, the bottom member 40 may be made of a sheet member including the first base material 41 including a stretched plastic film that is at least uniaxially stretched, preferably biaxially stretched, and a thermoplastic resin layer 42. In this case, as illustrated in FIG. 6, the bottom member 40 may further include a second base material 43 located between the first base material 41 and the thermoplastic resin layer 42. A layered structure of the bottom member 40 illustrated in FIG. 6 can be similar to the layered structure of the lid member 50 described later. When the sheet member for forming the bottom member 40 includes the first base material 41 containing a stretched plastic film and the thermoplastic resin layer 42, the thickness of the sheet member is 60 μm or more and 200 μm or less, for example.

The sheet forming method is a method for heating and softening a sheet member, and then pressing a mold to the sheet to form a desired shape on the sheet. Vacuum forming, pressure forming, vacuum pressure forming, press forming, or the like can be used. In addition, the main body 10 can be produced by another method such as injection molding.

(Lid Member)

Figure 7:
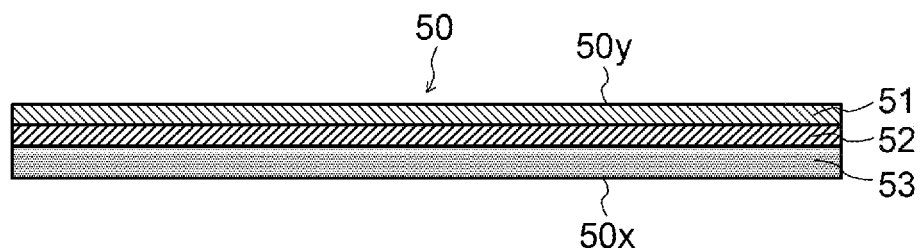
FIG. 7 is a cross-sectional view of an example of a layered structure of a lid member constituting a lid.

Next, the layered configuration of the lid member 50 constituting the lid 20 will be described. The lid member 50 includes at least the first base material 51 and a thermoplastic resin layer 53. FIG. 7 illustrates an example in which the lid member 50 has the first base material 51, a print layer 52, and the thermoplastic resin layer 53. The first base material 51 constitutes an outer surface 50y of the lid member 50. The thermoplastic resin layer 53 constitutes an inner surface 50x of the lid member 50. The print layer 52 can be provided between the first base material 51 and the thermoplastic resin layer 53, and can be provided on the inner surface 50x of the first base material 51. The inner surface 50x is a surface located on the containing portion 101 side of the lid 20, and the outer surface 50y is a surface located on the opposite side of the inner surface 50x.

The first base material 51 has a certain rigidity so as to suppress the extension of the lid 20 when the container 1 is opened. For example, the first base material 51 includes a stretched plastic film that is at least uniaxially stretched, preferably biaxially stretched. As a material for forming a stretched plastic film, polyamides such as nylon (ONy), or polyesters such as polyethylene terephthalate (PET) and polybutylene terephthalate (PBT) can be used, for example. Each of these stretched plastic films may be configured as a gas barrier film provided with a transparent steam deposition layer. The stretched plastic film contained in the first base material 51 is preferably stretched along the first direction D1. For example, an angle formed by the stretching direction of the stretched plastic film included in the first base material 51 and the first direction D1 is preferably 45 degrees or less, more preferably 30 degrees or less, and further preferably 20 degrees or less.

The thickness of the stretched plastic film of the first base material 51 is appropriately set according to the material to be used. For example, when nylon is used as a material for forming the stretched plastic film of the first base material 51, the thickness of the stretched plastic film of the first base material 51 is 9 μm or more and 50 μm or less, preferably 12 μm or more and 25 μm or less. The stretched plastic film refers to a film having a tensile elongation of less than 300%, preferably 200% or less when measured in accordance with JIS K 7127.

The print layer 52 of the lid member 50 is a layer printed on the first base material 51 in order to show product information or provide aesthetic characteristics to the container 1. The print layer 52 expresses characters, numbers, symbols, graphics, patterns, and the like. As a material for forming the print layer 52, ink for gravure printing and ink for flexographic printing can be used.

The ink constituting the print layer 52 contains a binder and a pigment. The binder includes, for example, polyurethane and the like. Polyurethane is a hardened material produced by the reaction of a polyol as a main agent and an isocyanate compound as a curing agent.

The thermoplastic resin layer 53 is a layer that is melted to constitute seal portions such as the outer edge seal portion 18 and the pleat seal portion 24. As a material for forming the thermoplastic resin layer 53, one kind or two or more kinds of resins selected from polyethylene such as low-density polyethylene and linear low-density polyethylene, and polypropylene can be used. The thermoplastic resin layer 53 can be a non-stretched film. The non-stretched film refers to a film having a tensile elongation of 300% or more, preferably 400% or more when measured in accordance with JIS K 7127. The thermoplastic resin layer 53 may be a single layer or a multilayer. The thickness of the thermoplastic resin layer 53 is, for example, 30 μm or more and 100 μm or less.

An adhesive resin layer or an adhesive layer containing an adhesive may be provided between the first base material 51 provided with the print layer 52 and the thermoplastic resin layer 53. As the adhesive resin layer, one kind or two or more combined kinds of resins selected from low-density polyethylene, medium-density polyethylene, high-density polyethylene, linear low-density polyethylene, polyethylene such as a copolymer with ethylene-α-olefin polymerized using a metallocene catalyst, ethylene-vinyl acetate copolymers, ethylene-acrylic acid copolymers, ethylene-ethyl acrylate copolymers, ethylene-methacrylic acid copolymers, ethylene-methyl methacrylate copolymers, ethylene-maleic acid copolymers, saturated carboxylic acid copolymers, and ionomer resins can be used. The adhesive is produced from an adhesive composition prepared by mixing a first composition containing a main agent and a solvent and a second composition containing a curing agent and a solvent. Specifically, the adhesive includes a hardened material produced by the reaction of the main agent and the solvent in the adhesive composition. Examples of the main agent include polyol, and examples of the curing agent include isocyanate compounds. Examples of the adhesive may include ether-based two-component reactive adhesives and ester-based two-component reactive adhesives. Examples of ether-based two-component reactive adhesives include polyether polyurethanes. The polyether polyurethane is a hardened material produced by the reaction of a polyether polyol as a main agent and an isocyanate compound as a curing agent. Examples of the ester-based two-component reactive adhesive include polyester polyurethane and polyester. The polyester polyurethane is a hardened material produced by the reaction of a polyester polyol as a main agent and an isocyanate compound as a curing agent. Moreover, acryl polyol may be used as a main agent.

First Modification Example of the Lid Member

Figure 8:
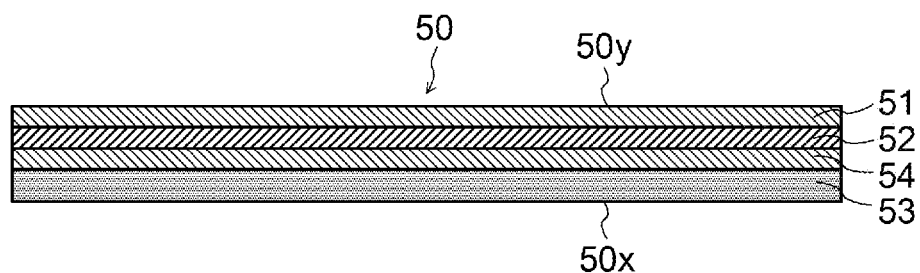
FIG. 8 is a cross-sectional view of another example of a layered structure of a lid member constituting a lid.

As illustrated in FIG. 8, the lid member 50 may further include a second base material 54 positioned between the first base material 51 and the thermoplastic resin layer 53. In the example illustrated in FIG. 8, the second base material 54 is located between the print layer 52 provided on the first base material 51 and the thermoplastic resin layer 53.

The second base material 54, like the first base material 51, preferably includes a stretched plastic film that is at least uniaxially stretched, preferably biaxially stretched. As a material for forming a stretched plastic film, the material similar to the first base material 51 can be used. Similar to the stretched plastic film of the first base material 51, the stretched plastic film included in the second base material 54 is also preferably stretched along the first direction D1. For example, an angle formed by the stretching direction of the stretched plastic film included in the second base material 54 and the first direction D1 is preferably 45 degrees or less, more preferably 30 degrees or less, and further preferably 20 degrees or less.

In the example illustrated in FIG. 8, polyethylene terephthalate can be used as a material for forming the stretched plastic film of the first base material 51, and nylon can be used as a material for forming the stretched plastic film of the second base material 54. In this case, the thickness of the stretched plastic film of the first base material 51 is, for example, 9 μm or more and 50 μm or less, preferably 12 μm or more and 25 μm or less. The thickness of the stretched plastic film of the second base material 54 is, for example, 9 μm or more and 50 μm or less, preferably 15 μm or more and 25 μm or less.

Between the first base material 51 and the second base material 54 provided with the print layer 52 and between the second base material 54 and the thermoplastic resin layer 53, the above-mentioned adhesive resin layer or an adhesive layer containing an adhesive may be provided.

Second Modification Example of the Lid Member

Figure 9:
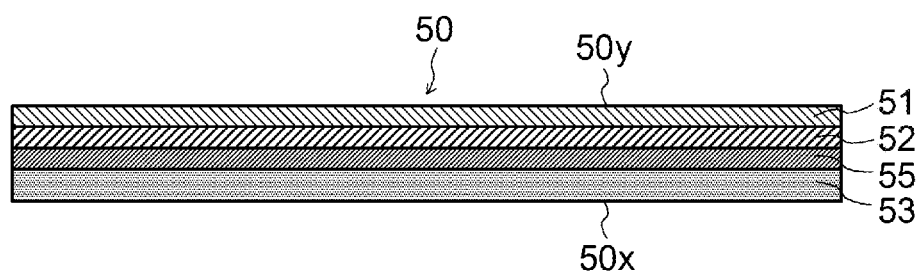
FIG. 9 is a cross-sectional view of another example of a layered structure of a lid member constituting a lid.

As illustrated in FIG. 9, the lid member 50 may further include an intermediate layer 55 positioned between the first base material 51 and the thermoplastic resin layer 53. In the example illustrated in FIG. 9, the intermediate layer 55 is located between the print layer 52 provided on the first base material 51 and the thermoplastic resin layer 53.

The intermediate layer 55 includes, for example, a gas barrier layer. As the gas barrier layer, for example, a steam-deposited layer of a metal oxide such as aluminum oxide or an inorganic oxide such as silicon oxide can be provided. In addition, as the gas barrier layer, a resin layer having a high gas barrier property such as ethylene-vinyl alcohol copolymer (EVOH), polyvinylidene chloride resin (PVDC), or aliphatic polyamide such as nylon MXD 6 may be provided. This can suppress the infiltration of oxygen and steam into the interior of the container 1. The thickness of the intermediate layer 55 is, for example, 12 μm or more and 25 μm or less.

(Seal Strength)

In the container 1 according to the present embodiment, preferably, the pleat seal portion 24 peels off around the steam passing portion 30 earlier than the outer edge seal portion 18, whereby steam is released from the steam passing portion 30.

In consideration of this point, the pleat seal portion 24 preferably has an easy peeling property. For example, the seal strength of the pleat seal portion 24 is lower than the seal strength of the outer edge seal portion 18.

Hereinafter, a method for measuring the seal strength of the pleat seal portion 24 and the seal strength of the outer edge seal portion 18 will be described. As a measuring instrument, the thermostat-equipped tensile tester RTC-1310A manufactured by Orientec Corporation can be used.

Figure 10:
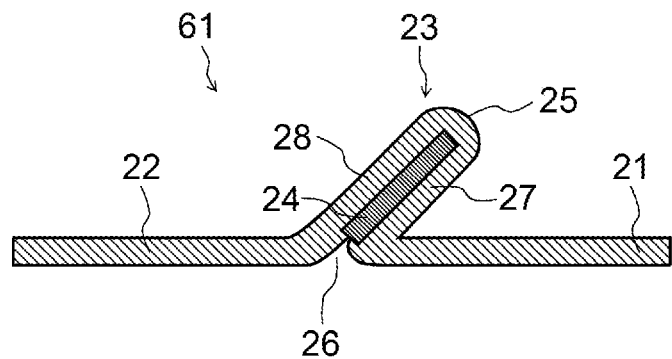
FIG. 10 is a diagram illustrating a first test piece for measuring seal strength of a pleat seal portion of a pleat part of the lid.
Figure 11:
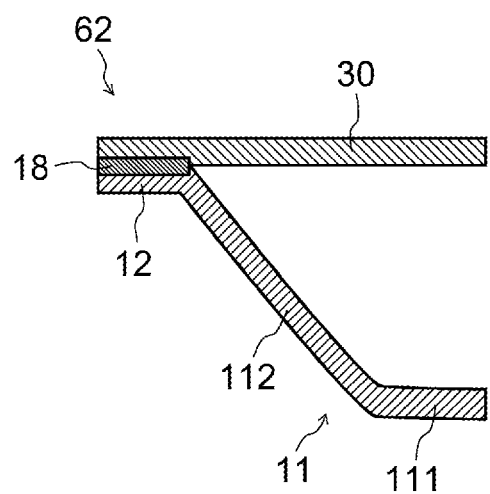
FIG. 11 is a diagram illustrating a second test piece for measuring seal strength of an outer edge seal portion between the lid and the flange part.

First, a portion of the container 1 is cut out to prepare a test piece. FIG. 10 is a diagram illustrating a first test piece 61 for measuring the seal strength of the pleat seal portion 24. The first test piece 61 is obtained by cutting out a portion of the lid 20 including the first lid part 21, the second lid part 22, and the pleat part 23 as indicated by a frame of dashed-dotted line with reference sign X in FIG. 1. FIG. 11 is a diagram illustrating a second test piece 62 for measuring the seal strength of the outer edge seal portion 18. The second test piece 62 is obtained by cutting out a portion of the container 1 including the body part 11, the flange part 12, and the lid 20 joined to the flange part 12 as indicated by a frame of dashed-dotted line with reference sign XI in FIG. 1. The seal portions of the first test piece 61 and the second test piece 62 has a width W of 15 mm (see FIG. 1).

Figure 12:
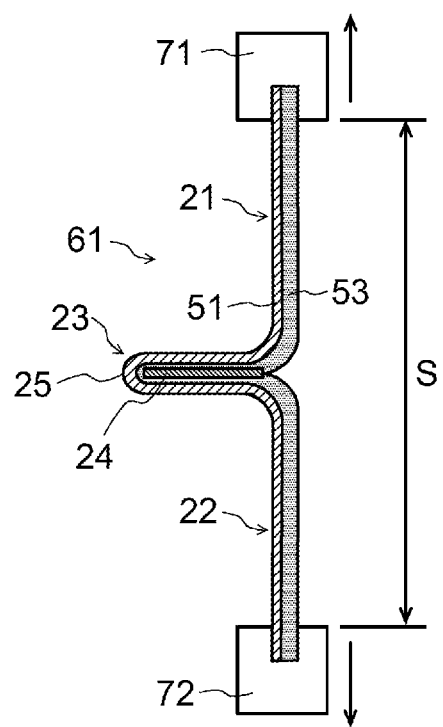
FIG. 12 is a diagram for describing a method for measuring seal strength.
Figure 13:
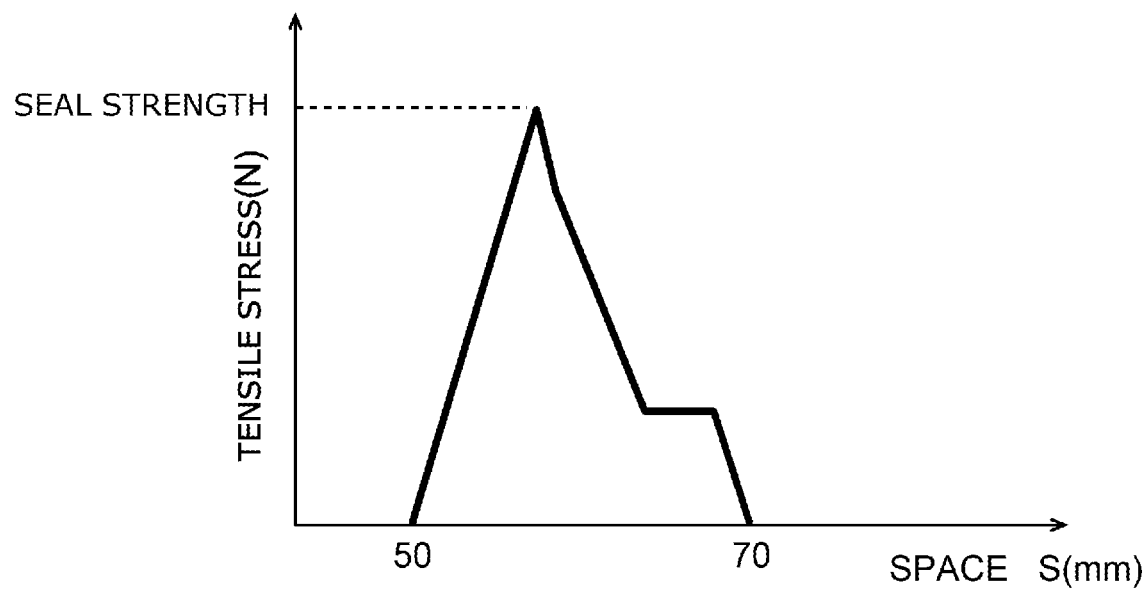
FIG. 13 is a diagram illustrating a change in tensile stress with respect to spacing between a pair of grippers that pulls a test piece for measurement of seal strength.

FIG. 12 is a diagram for describing a method for measuring the seal strength of the pleat seal portion 24 using the first test piece 61. First, the portions of the first test piece 61 that are not joined (here, the first lid part 21 and the second lid part 22) are respectively gripped by a first holding tool 71 and a second holding tool 72 of the measuring instrument. Further, the holding tools 71 and 72 are pulled in opposite directions to each other at a speed of 300 mm/min to measure the maximum value of the tensile stress (see FIG. 13). In the example illustrated in FIG. 12, the directions in which the holding tools 71 and 72 are pulled are orthogonal to the planar direction of the portion of the first test piece 61 joined by the pleat seal portion 24. FIG. 13 is a diagram illustrating changes in tensile stress with respect to spacing S.

For the three first test pieces 61, the maximum value of the tensile stress is measured, and the average value is taken as the seal strength of the pleat seal portion 24. The spacing S between the holding tools 71 and 72 at the start of pulling is 20 mm, and the spacing S between the holding tools 71 and 72 at the end of pulling is 40 mm.

Although not illustrated, the method for measuring the seal strength of the outer edge seal portion 18 using the second test piece 62 is the same as the method for measuring the seal strength of the pleat seal portion 24. Specifically, first, the lid 20 of the second test piece 62 is gripped by one of the holding tools 71, 72, and the body part 11 of the second test piece 62 is gripped by the other of the holding tools 71, 72. Subsequently, the holding tools 71 and 72 are pulled in opposite directions to each other at a speed of 300 mm/min to measure the maximum value of tensile stress. For the three second test pieces 62, the maximum value of the tensile stress is measured, and the average value is taken as the seal strength of the outer edge seal portion 18.

The seal strength of the outer edge seal portion 18 under an environment at a temperature of 25° C. and a relative humidity of 50% is, for example, 10N or more, more preferably 15N or more. The seal strength of the pleat seal portion 24 under an environment at a temperature of 25° C. and a relative humidity of 50% is lower than the seal strength of the outer edge seal portion 18, which is, for example 12N or less, more preferably 10N or less.

The seal strength of the outer edge seal portion 18 at 100° C. is, for example, 3.0 N or more. The seal strength of the pleat seal portion 24 at 100° C. is lower than the seal strength of the outer edge seal portion 18, which is, for example, 8.0N or less, more preferably 2.5N or less.

Method for Manufacturing the Container

Next, a method for manufacturing the container 1 using the above-described bottom member 40 and lid member 50 will be described with reference to FIGS. 14A to 17.

Figure 14A:
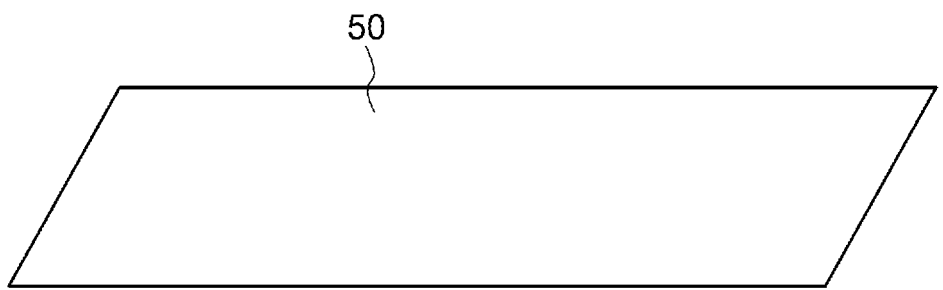
FIG. 14A is a diagram illustrating a manufacturing process of the lid.
Figure 14B:
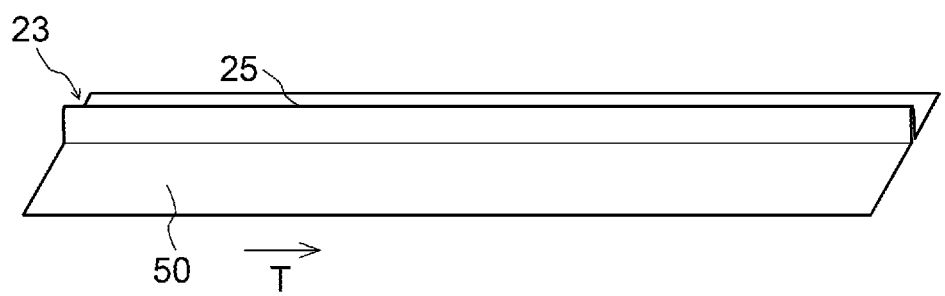
FIG. 14B is a diagram illustrating the manufacturing process of the lid.

First, referring to FIGS. 14A to 14D, the process of manufacturing the lid 20 using the lid member 50 will be described. First, as illustrated in FIG. 14A, the lid member 50 is prepared. Then, as illustrated in FIG. 14B, the lid member 50 is folded back at the fold-back portion 25 such that portions of the lid member 50 overlap, thereby to form the pleat part 23. The step of folding back the lid member 50 is performed while the lid member 50 is transported in the transport direction T.

Figure 14C:
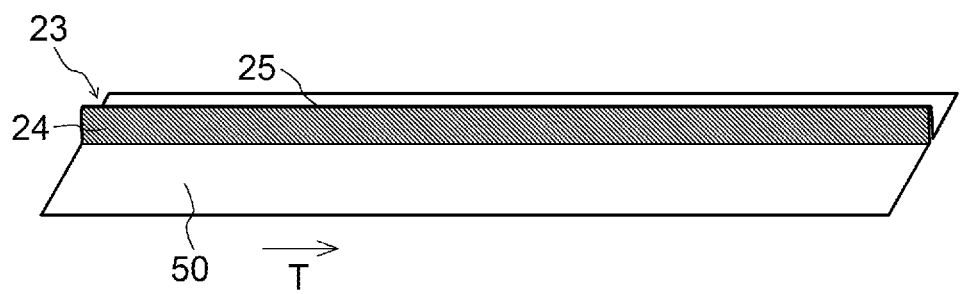
FIG. 14C is a diagram illustrating the manufacturing process of the lid.

Subsequently, as illustrated in FIG. 14C, the inner surfaces of portions of the lid member 50 are joined together in the pleat part 23 to form the pleat seal portion 24. For example, the pleat seal portion 24 extending along the transport direction T is formed by compressing the pleat part 23 of the lid member 50 being transported in the transport direction T with a pair of seal rollers while heating the pleat part 23.

Figure 14D:
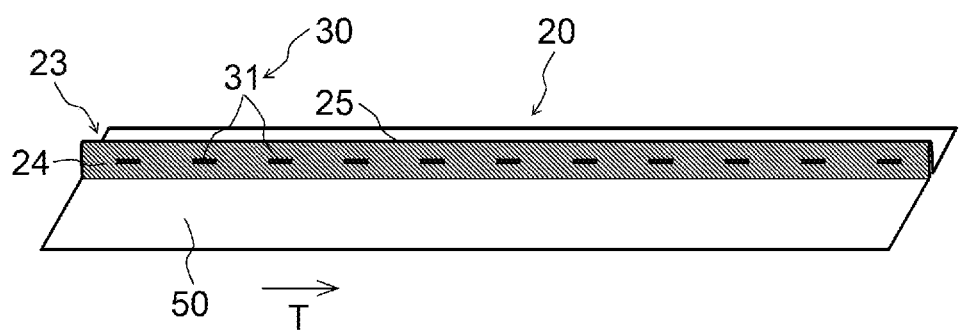
FIG. 14D is a diagram illustrating the manufacturing process of the lid.

Subsequently, as illustrated in FIG. 14D, through holes 31 are formed in the pleat seal portion 24 to penetrate the pleat part 23 and the pleat seal portion 24 along the transport direction T in a cycle corresponding to the dimensions of the lid 20 in the first direction D1 described above. For example, a cutting blade of a shape corresponding to the through holes 31 is pierced into the pleat part 23. In this manner, the lid 20 can be produced including the steam passing portion 30 with the through holes 31 in the pleat seal portion 24 of the pleat part 23.

Figure 15:
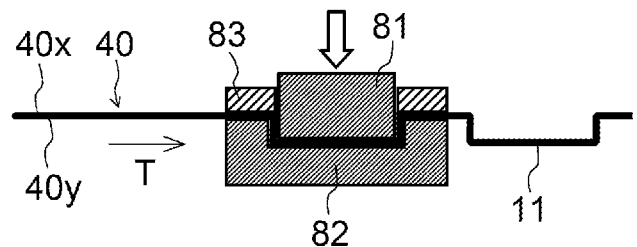
FIG. 15 is a diagram illustrating the manufacturing process of the container.

Next, referring to FIG. 15, the process of manufacturing the main body 10 using the bottom member 40 will be described. The main body 10 can be manufactured by forming the bottom member 40 using a sheet forming method such as vacuum forming, pressure forming, or vacuum pressure forming. Here, the process of manufacturing the main body 10 by a plug assist forming method will be described. First, a male mold 81 is disposed on an inner surface 40x side of the bottom member 40, and a female mold 82 is disposed on an outer surface 40y side. Then, the male mold 81 is relatively moved toward the female mold 82, and the bottom member 40 is pushed into the recess of the female mold 82. As a result, as illustrated in FIG. 15, the body part 11 can be formed in the bottom member 40. At this time, a pressing plate 83 may be used to fix the bottom member 40 in order to suppress those portions of the bottom member 40 other than the body part 11 from being stretched.

In the step of subjecting the bottom member 40 to sheet forming, the space on the side where the female mold 82 is located, that is, the space on the outer surface 40y side of the bottom member 40 may be in a vacuum state under a pressure lower than atmospheric pressure. This allows the outer surface 40y of the bottom member 40 to be closely attached to the female mold 82, whereby the bottom member 40 can be formed with high accuracy. The pressure in the vacuum state is preferably 0.05 atm ($0.05 \times 10^5$ Pa) or more and 0.3 atm ($0.3 \times 10^5$ Pa) or less. In addition, the space on the side where the male mold 81 is located, that is, the space on the inner surface 40x side of the bottom member 40 may be in a compressed-air state under a pressure higher than the atmospheric pressure. This also allows the outer surface 40y of the bottom member 40 to be closely attached to the female mold 82, whereby the bottom member 40 can be formed with high accuracy. The pressure in the compressed-air state is preferably 1.5 atm ($1.5 \times 10^5$ Pa) or more and 5 atm ($5.0 \times 10^5$ Pa) or less.

Figure 16:
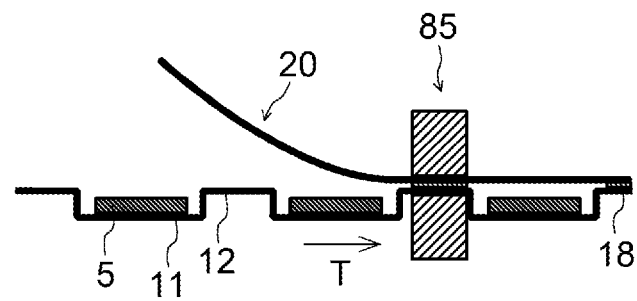
FIG. 16 is a diagram illustrating the manufacturing process of the container.

Then, the process of producing the container 1 will be described with reference to FIGS. 16 and 17. First, as illustrated in FIG. 16, the body part 11 is filled with contents 5. In this case, since the body part 11 is in the open state over the entire area, the contents 5 can be easily charged into the body part 11.

Then, as illustrated in FIG. 16, the body part 11 filled with the contents 5 is covered with the lid 20. Subsequently, the lid 20 is joined to the flange part 12 extending outward from the top of the body part 11 using a bonding device 85 to form the outer edge seal portion 18.

Figure 17:
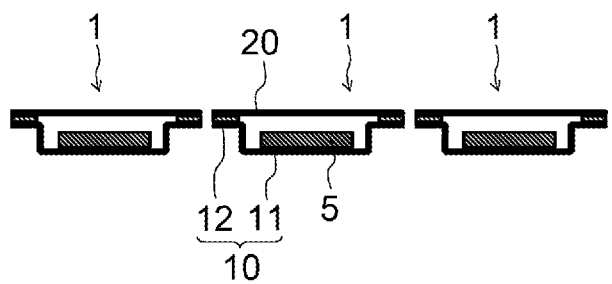
FIG. 17 is a diagram illustrating the manufacturing process of the container.

Subsequently, as illustrated in FIG. 17, the lid 20 and the flange part 12 are cut at the outer edge seal portion 18. In this manner, the container 1 can be obtained, including the main body 10 with the body part 11 and the flange part 12 and the lid 20 joined to the flange part 12 and having the contents 5 contained therein.

Effects of the Present Embodiment

In the present embodiment, as described above, the pleat part 23 of the lid 20 is formed by folding back a portion of the lid member 50 for forming the lid 20 at the fold-back portion 25. This makes it possible to improve the efficiency of the process of forming the pleat part 23, as compared with the case where the pleat part 23 is formed by stacking two lid members. In addition, the presence of the fold-back portion 25 suppresses intrusion of bacteria and the like from the pleat part 23 into the inside of the container 1.

In the present embodiment, since the intrusion of bacteria and the like into the interior of the container 1 can be suppressed by the fold-back portion 25, it is possible to reduce the seal strength of the pleat seal portion 24 formed in the pleat part 23 while maintaining hygiene of the interior of the container 1, as compared to the case where the end of the lid member 50 in the pleat part 23 is exposed to the outside. This makes the pleat seal portion 24 easier to peel off as compared with the outer edge seal portion 18. Accordingly, it is possible to suppress peeling of the outer edge seal portion 18 on the flange part 12 when the contents 5 are heated, and suppress release of steam from the flange part 12.

Further, in the present embodiment, forming the pleat part 23 to be distant from the center point 101C of the containing portion 101 of the main body 10 makes it possible to suppress the pleat seal portion 24 or the outer edge seal portion 18 on the third edge portion 15 or the fourth edge portion 16 on the flange part 12 from peeling off earlier than the pleat seal portion 24 around the steam passing portion 30. This also suppresses release of steam from the flange part 12 when the contents 5 are heated.

Further, in the present embodiment, forming the pleat part 23 to be distant from the center point 101C of the containing portion 101 of the main body 10 makes it possible to provide the lid 20 with wide print display overlapping the center point 101C of the containing portion 101 of the main body 10 by the print layer 52. This enhances the visibility and design of the print display of the lid 20.

Note that various modifications can be made to the embodiment described above. Hereinafter, modifications will be described with reference to the drawings as needed. In the following description and the drawings used in the following description, components that can be configured in the same manner as the components in the above-described embodiment will be given the same reference signs as the reference signs used for the corresponding components in the above-described embodiment, and duplicate description will be omitted. In addition, in the case where it is obvious that the effects and advantages obtained in the above-described embodiment can be obtained also in the modification example, the description thereof may be omitted.

First Modification of the Container

Figure 18:
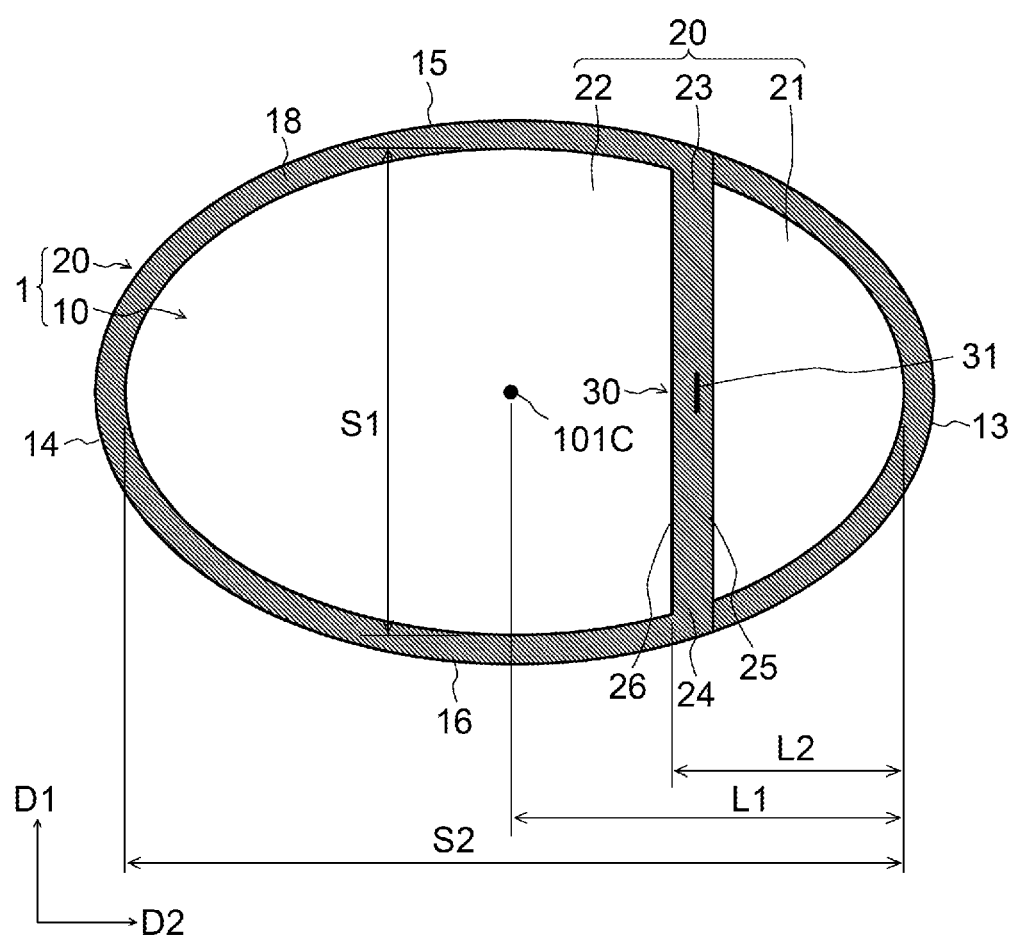
FIG. 18 is a plan view of a modification example of the container.

In the above-described embodiment, the bottom portion 11a and the flange part 12 of the main body 10 have a substantially rectangular outline, but the container 1 is not limited to this. For example, as illustrated in FIG. 18, the bottom portion 11a and the flange part 12 may have a circular contour such as an oval. Also in the example illustrated in FIG. 18, the pleat part 23 of the lid 20 extends in the first direction D1 from one edge portion (on the third edge portion 15 side of the flange part 12) to the other edge portion (on the fourth edge portion 16 side of the flange part 12) of the lid 20.

Also in the example illustrated in FIG. 18, the maximum distance S2 in the second direction D2 may be larger than the maximum distance S1 in the first direction D1, as in the above-described embodiment. Further, the pleat part 23 may be located closer to the first edge portion 13 than the center point 101C of the containing portion 101 of the main body 10.

Second Modification of the Container

In the above-described embodiment and modification, the maximum distance S2 of the containing portion 101 in the second direction D2 is larger than the maximum distance S1 of the containing portion 101 in the first direction D1 as an example. However, the container is not limited to this but the maximum distance S2 of the containing portion 101 in the second direction D2 may be equal to the maximum distance S1 of the containing portion 101 in the first direction D1. For example, as illustrated in FIG. 19, the bottom portion 11a and the flange part 12 of the main body 10 may have a substantially square outline.

Figure 19:
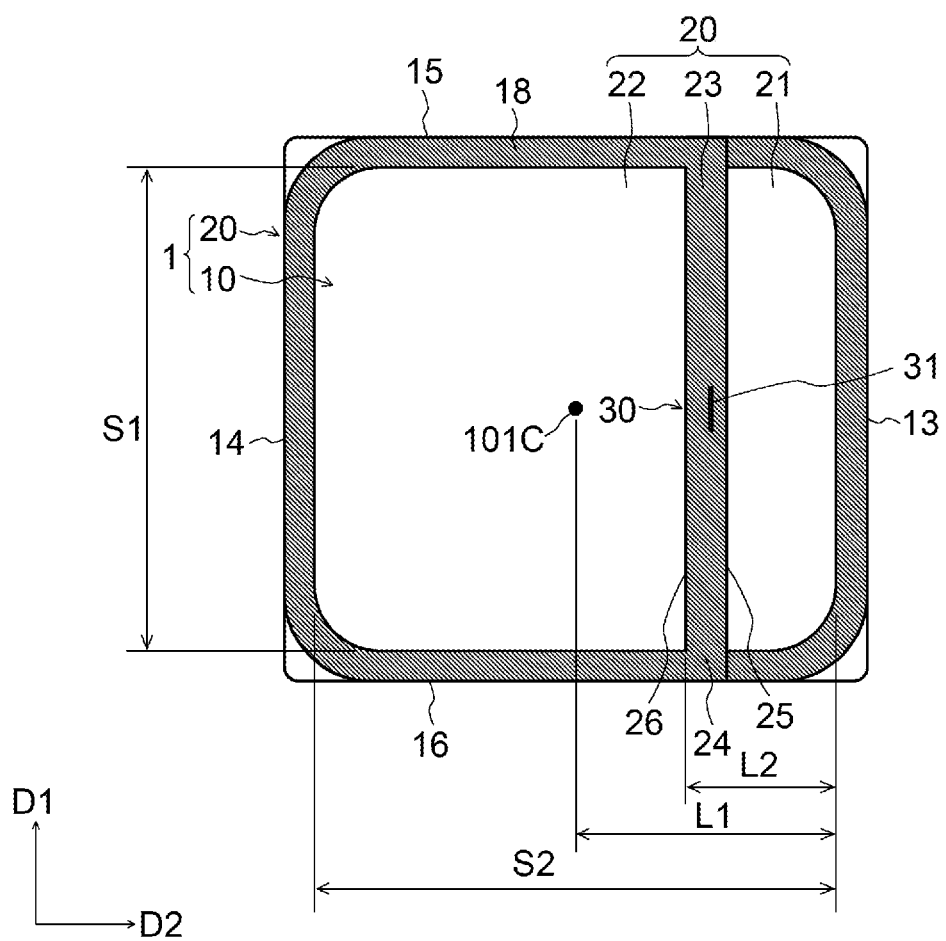
FIG. 19 is a plan view of a modification example of the container.

Also in the example illustrated in FIG. 19, the pleat part 23 may be located closer to the first edge portion 13 than the center point 101C of the containing portion 101 of the main body 10.

First Modification of the Steam Passing Portion

Figure 20:
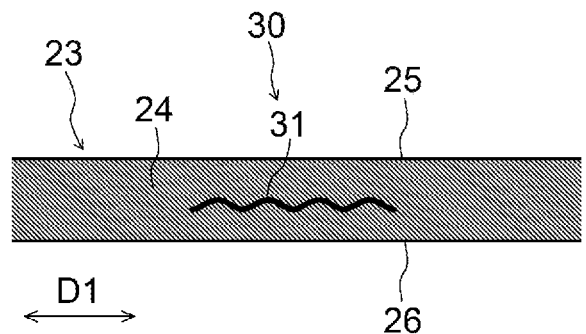
FIG. 20 is a view of a modification example of the steam passing portion.

In the above-mentioned embodiment, the through holes 31 of the steam passing portion 30 have a shape extended linearly along the first direction D1 as an example. However, the steam passing portion is not limited to this. As illustrated in FIG. 20, the through holes 31 of the steam passing portion 30 may have a wavelike shape that is undulated in a direction orthogonal to the first direction D1. This makes it easier to pierce the pleat part 23 with a cutting blade of a shape corresponding to the through holes 31.

Second Modification of the Steam Passing Portion

Figure 21:
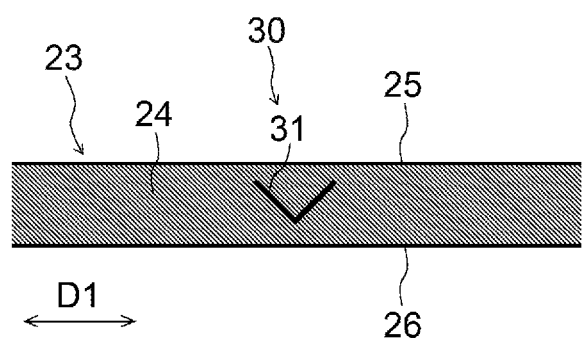
FIG. 21 is a view of a modification example of the steam passing portion.

In the above-mentioned embodiment and modification, the through holes 31 of the steam passing portion 30 extend along the first direction D1 as an example. However, the steam passing portion is not limited to this. As illustrated in FIG. 21, the through holes 31 may have a V-shape or the like protruding toward the base 26.

Third Modification of the Steam Passing Portion

Figure 22:
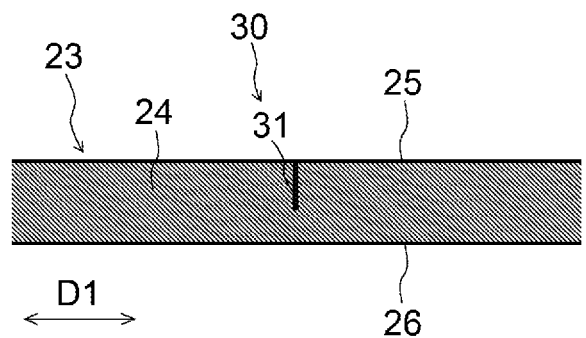
FIG. 22 is a view of a modification example of the steam passing portion.

In the above-mentioned embodiment and modifications, the through holes 31 of the steam passing portion 30 do not reach the fold-back portion 25 of the pleat part 23 as an example. However, the steam passing portion is not limited to this. As illustrated in FIG. 22, the through holes 31 may be formed in the pleat seal portion 24 so as to reach the fold-back portion 25 of the pleat part 23.

Fourth Modification of the Steam Passing Portion

Figure 23:
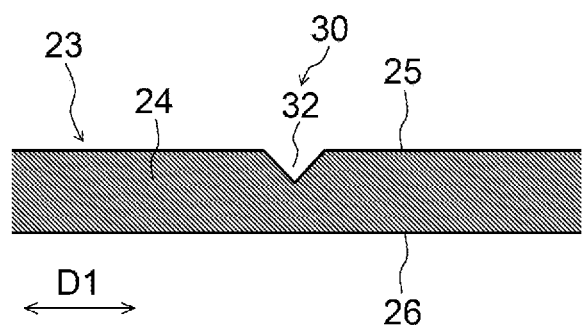
FIG. 23 is a view of a modification example of the steam passing portion.
Figure 24:
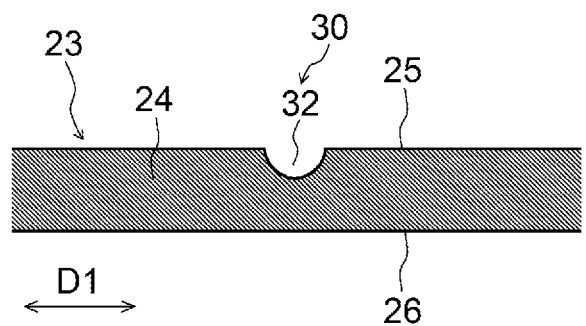
FIG. 24 is a view of a modification example of the steam passing portion.

In the above-mentioned embodiment and modifications, the steam passing portion 30 includes the through holes 31 as an example. However, the configuration of the steam passing portion 30 is not particularly limited as long as the steam of the containing portion 101 can be released to the outside through the peeling portion of the pleat seal portion 24. For example, the steam passing portion 30 may include a cutout 32 formed in the pleat seal portion 24 at the fold-back portion 25 of the pleat part 23. The cutout 32 may have a triangular shape as illustrated in FIG. 23 or may have a semicircular shape as illustrated in FIG. 24. The cutout 32 preferably has a shape that tapers from the fold-back portion 25 to the base 26 as illustrated in FIGS. 23 and 24.

Although some modifications to the above-described embodiment have been described, it is naturally possible to apply a plurality of modifications in combination as appropriate.

EXAMPLES

Next, the first embodiment will be more specifically described by examples. However, the first embodiment is not limited to the descriptions of the following examples unless the first embodiment deviates from the gist of the embodiment.

Example A1

As the bottom member 40 constituting the main body 10, a member including the first base material 41 formed from a single layer as illustrated in FIG. 3 was prepared. As the first base material 41, a non-stretched polypropylene film with a thickness of 300 μm was used. Then, five substantially rectangular main bodies 10 each of four types were produced by a sheet forming method such that, when the outer edge seal portion 18 was formed up to the inner edge of the flange part 12, the ratio (=S2/S1) of the maximum distance S2 in the second direction D2 to the maximum distance S1 in the first direction D1 was 1.3, 1.4, 1.5, or 1.6. In any of the four types of main bodies 10, the maximum distance S1 was 200 mm, and a depth H of the main body 10 was 20 mm.

In addition, as the lid member 50 constituting the lid 20, a laminated body having a layered structure similar to that of the lid member 50 illustrated in FIG. 9 except for the absence of the print layer 52 was prepared. As the first base material 51, a 12 μm-thick biaxially stretched PET film with a transparent deposition layer was used. As the second base material 54, a 15 μm-thick stretched nylon film was used. As the thermoplastic resin layer 53, a sealant film having an easy peeling property was used. Then, a portion of the lid member 50 was folded back, and the folded-back portion was heated to form the pleat part 23 and the pleat seal portion 24 having a width of 8 mm. Subsequently, through holes 31 having a length of 10 mm was formed at a position 4 mm away from the base 26 of the pleat part 23 in such a manner as to linearly extend along the extending direction of the pleat part 23.

Subsequently, 100 g of water was filled into the containing portion 101 of the main body 10, and then the outer edge seal portion 18 for joining the lid 20 is formed on the flange part 12 of the main body 10, thereby to produce the container 1 containing water. The outer edge seal portion 18 was in contact with the inner edge of the flange part 12, and the width of the outer edge seal portion 18 was 7 mm. Further, the main body 10 and the lid 20 were combined such that the direction in which the pleat part 23 of the lid 20 extends is parallel to the first direction D1 which is the direction of the maximum distance S1 of the main body 10. Also, the position of the lid 20 with respect to the main body 10 was adjusted such that the ratio of the maximum distance L2 between the base 26 of the pleat part 23 and the inner edge of the outer edge seal portion 18 along the first edge portion 13 to the maximum distance L1 between the center point 101C of the containing portion 101 of the main body 10 and the inner edge of the outer edge seal portion 18 along the first edge portion 13 was 0.3.

Then, the 100 g of water contained in the container 1 was heated for one minute and 15 seconds using a 700-W microwave oven. It has been observed that the pleat seal portion 24 around the through holes 31 was peeled off in all the containers 1. In addition, it has been checked whether peeling occurred in the outer edge seal portion 18 between the flange part 12 and the lid 20. FIG. 25 shows the results. Referring to FIG. 25, "Excellent" means that no peeling occurred in the outer edge seal portion 18. "Good" means that the outer edge seal portion 18 has peeled off but the peeling did not reach the outer edge of the outer edge seal portion 18. "Not good" means that the outer edge seal portion 18 has peeled off up to the outer edge of the outer edge seal portion 18.

As shown in FIG. 25, in any of the four types of containers 1, no peeling occurred in the outer edge seal portion 18 in four or more of the five samples. In particular, in the cases where the ratio S2/S1 was 1.3, 1.4, and 1.5, no peeling occurred in the outer edge seal portion 18 in all the five samples.

Example A2

In the same manner as in Example A1, five substantially rectangular containers 1 each of four types were produced except that the lid 20 was formed such that the ratio of the maximum distance L2 to the maximum distance L1 was 1.0. Further, in the same manner as in Example A1, it has been checked whether peeling occurred in the outer edge seal portion 18 between the flange part 12 and the lid 20. FIG. 26 shows the results.

As shown in FIG. 26, in the case where the ratio S2/S1 was 1.3, 1.4 or 1.5, there occurred no peeling up to the outer edge of the outer edge seal portion 18 even when the ratio L2/L1 was 1.0. In particular, it has been observed that, in the case where the ratio S2/S1 was 1.3, no peeling occurred in the outer edge seal portion 18 in four of the five samples. On the other hand, in the case where the ratio S2/S1 was 1.6, there occurred peeling up to the outer edge of the outer edge seal portion 18 in three of the five samples.

Example A3

The main bodies 10 were produced in the same manner as in Example A1, using, as the bottom member 40, the first base material 41 formed from a 400 μm-thick coextruded sheet including a first layer 41a made of polypropylene, a second layer 41b made of EVOH, and a third layer 41c made of polypropylene. The ratio S2/S1 was 1.3. The depth H of the main body 10 was 30 mm.

Then, the same lid 20 as in Example A1 was produced. Subsequently, 100 g of water was filled into the containing portion 101 of the main body 10, and then the outer edge seal portion 18 for joining the lid 20 is formed on the flange part 12 of the main body 10, thereby to produce the container 1 containing water. At this time, five containers 1 each of five types having L2/L1 of 0.2, 0.4, 0.6, 0.8 or 1.0 were produced. Subsequently, in the same manner as in Example A1, it has been checked whether peeling occurred in the outer edge seal portion 18 between the flange part 12 and the lid 20. FIG. 27 shows the results.

As shown in FIG. 27, no peeling occurred up to the outer edge of the outer edge seal portion 18 in any of the five types of containers 1. In particular, in the cases where the ratio L2/L1 was 0.4, 0.6 or 0.8, no peeling occurred in the outer edge seal portion 18 in all the five samples.

As illustrated in Example A1 described above, even when the ratio S2/S1 was 1.3 and the ratio L2/L1 was 0.3, no peeling occurred in the outer edge seal portion 18 in all the five samples. Therefore, it is considered that, when the ratio L2/L1 is 0.3 or more and 0.8 or less, the steam can be stably remove to the outside from the through holes 31.

Example A4

The first test piece 61 and the second test piece 62 were cut out from the container 1 in Example A3. Subsequently, by the above-described measurement method illustrated in FIGS. 12 and 13, the seal strength of the pleat seal portion 24 was measured using the first test piece 61, and the seal strength of the outer edge seal portion 18 was measured using the second test piece 62. The measurements were carried out under environments of 25° C. and 100° C. Under the environment of 100° C., the measurement was started two minutes after the temperature of the thermostat bath of the tensile tester RTC-1310A manufactured by Orientec Corporation reached 100° C. FIG. 28 shows the measurement results at 25° C., and FIG. 29 shows the measurement results at 100° C.

As shown in FIG. 28, the seal strength of the outer edge seal portion 18 at 25° C. was 15N or more, and the seal strength of the pleat seal portion 24 at 25° C. was 10N or less. In addition, the seal strength of the outer edge seal portion 18 at 100° C. was 3.0N or more, and the seal strength of the pleat seal portion 24 at 100° C. was 2.5N or less. As described above, since the seal strength of the pleat seal portion 24 is lower than the seal strength of the outer edge seal portion 18, it can be expected that peeling tends to proceed in the pleat seal portion 24 as compared to the outer edge seal portion 18.

Second Embodiment

Next, a second embodiment of the present invention will be described. First, problems to be solved by the second embodiment will be described.

Conventionally, there are known containers (packages) that are capable of cooking food contained therein in a microwave oven and partially peeling off a seal portion by internal steam pressure to release the steam (for example, JP 4-1179 A, JP 2004-268948 A, and WO 2007/020854).

However, in the techniques described in JP 4-1179 A and JP 2004-268948 A, the opening for releasing the steam is formed between the flange part and the lid of the main body, which causes a problem that the contents are easy to leak together with the steam. In addition, in the technique described in WO 2007/020854, there is the need to provide a lower member on the lid, which causes a problem of complexity in the structure.

Thus, an issue of the present embodiment is to provide a container for cooking in a microwave oven, more specifically, a container for microwave oven with excellent usability.

The container for microwave oven according to the present embodiment includes: a main body including a body part defining a containing portion and a flange part provided over the entire circumference of the body part; and a lid joined to the flange part to cover the containing portion of the main body. An outer edge seal portion is provided around the entire circumference between the flange part and the lid. The lid has a pleat part of which inner surfaces face each other.

The pleat part has two first pleat seal portions that extend from the flange part toward a tip of the pleat part, and a second pleat seal portion that is positioned between the two first pleat seal portions. An A axis may be shorter than a B axis, where the A axis is an axis that passes through the center of the containing portion and has a minimum distance when connecting two points in an outer edge of the outer edge seal portion and the B axis is an axis that passes through the center of the containing portion and connects two points in the outer edge of the outer edge seal portion so as to be orthogonal to the A axis. The pleat part traverses the containing portion and extends along the B axis. The second pleat seal portion is provided with a steam passing portion.

According to the present embodiment, the pleat part is provided along the B axis, and therefore, during cooking in a microwave oven, it is possible to stably release the steam from the steam passing portion of the second pleat seal portion provided in the pleat part. This makes it possible to suppress release of the steam through the first pleat seal portions or the outer edge seal portion, thereby suppressing the contents from leaking out.

(Container)

Figure 30:
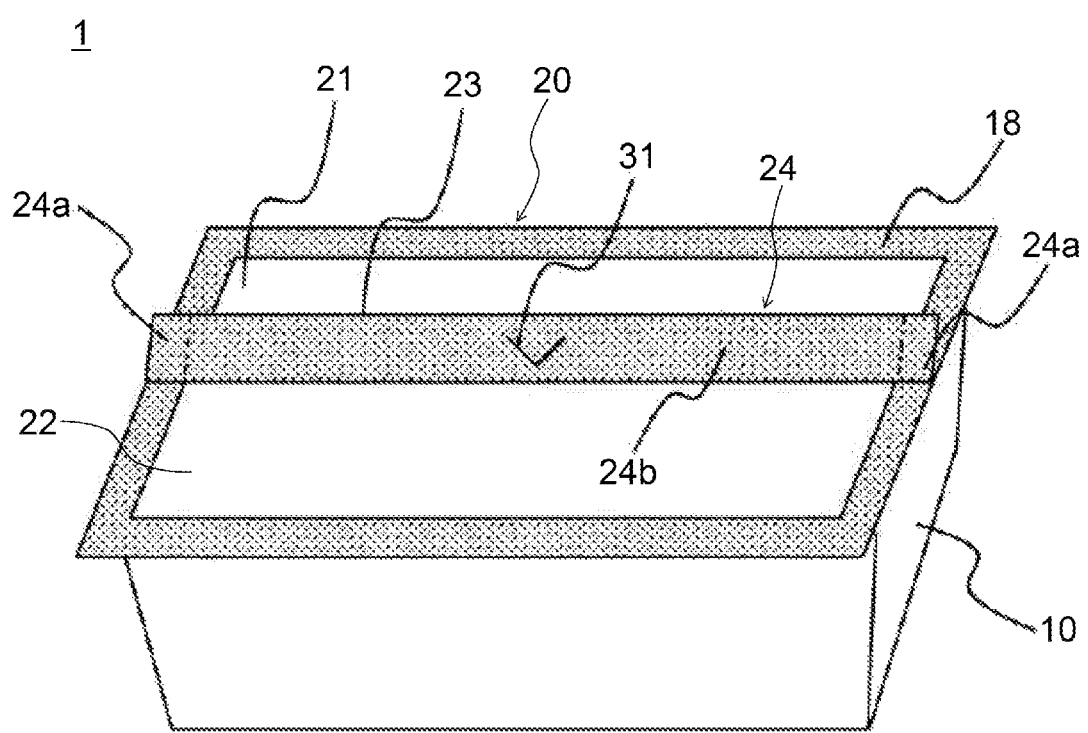
FIG. 30 is an external perspective view of a container for microwave oven according to a second embodiment.
Figure 31A:
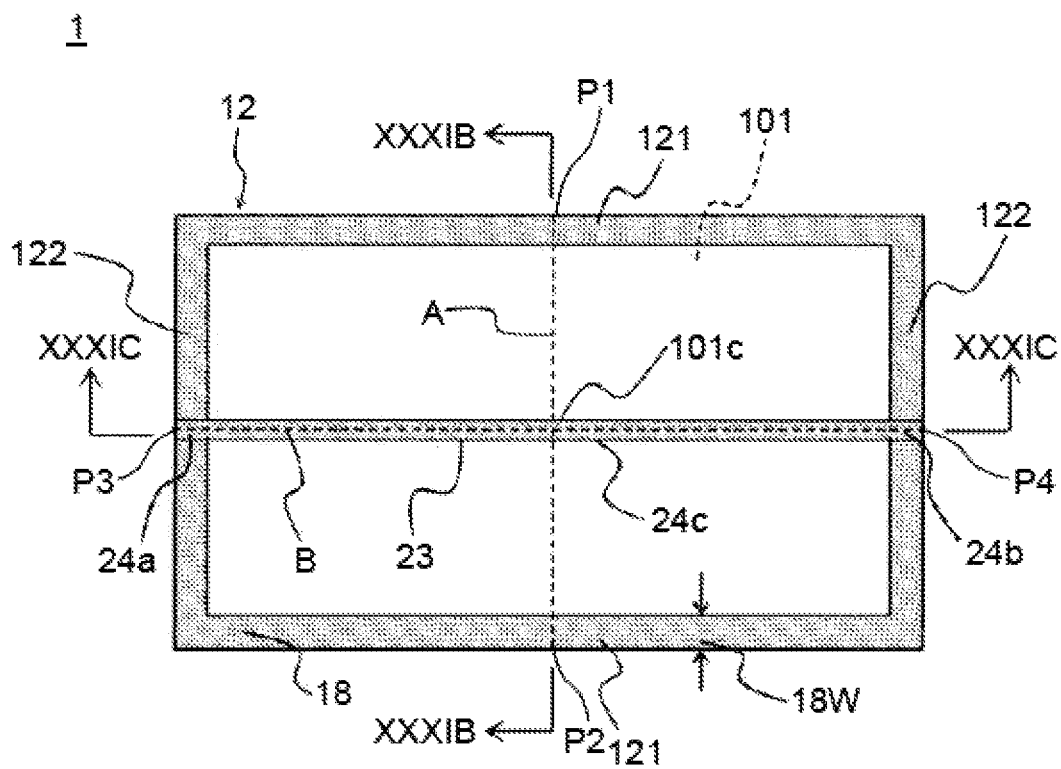
FIG. 31A is a plan view of the container for microwave oven according to the second embodiment.
Figure 31B:
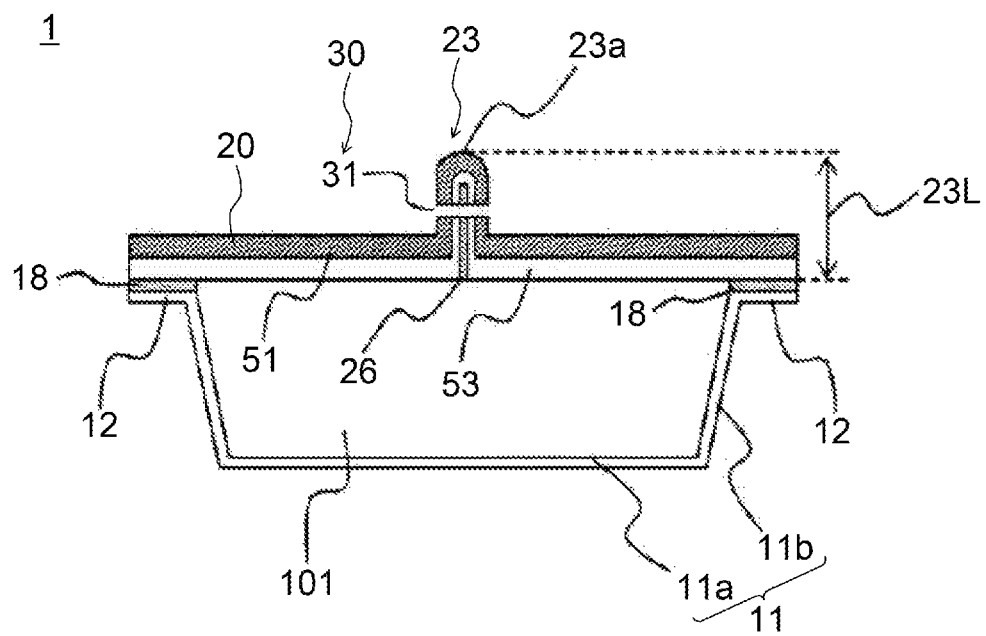
FIG. 31B is a cross-sectional view of the container for microwave oven according to the second embodiment.
Figure 31C:
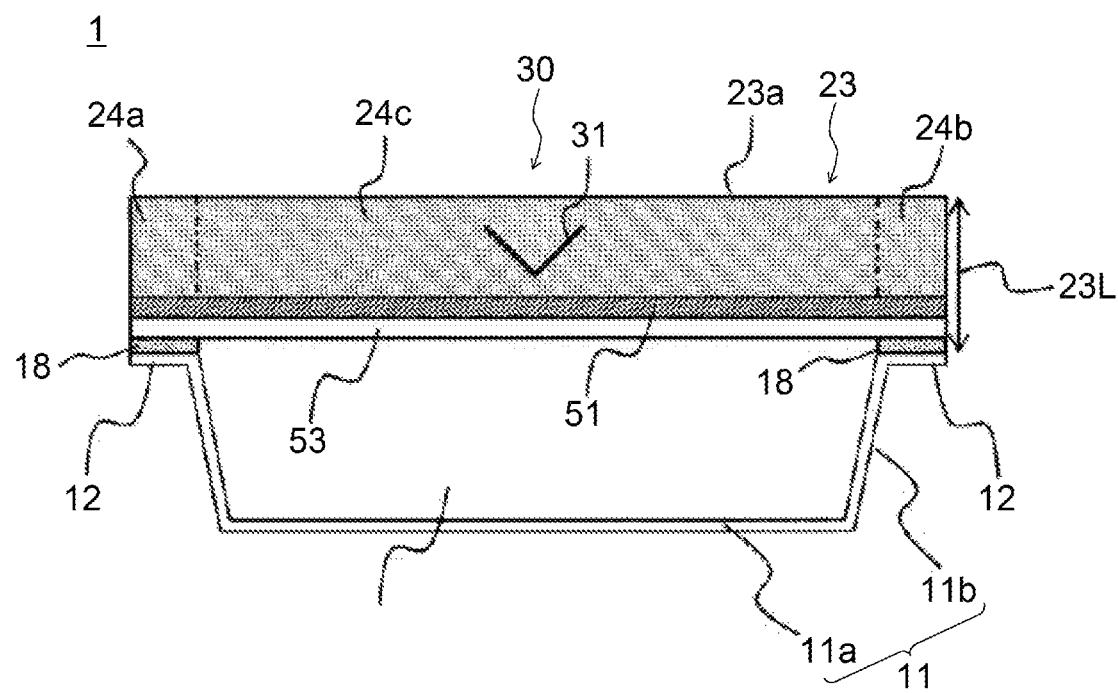
FIG. 31C is a cross-sectional view of the container for microwave oven according to the second embodiment.

Hereinafter, a container 1 of the present embodiment will be specifically described. FIG. 30 is an external perspective view of a container 1 for microwave oven according to an embodiment of the present invention. FIGS. 31A to 31C are a plan view and cross-sectional views of the container 1 for microwave oven according to the embodiment. FIG. 31A is a plan view, FIG. 31B is a cross-sectional view of FIG. 31A taken along line XXXIB-XXXIB, and FIG. 31C is a cross-sectional view of FIG. 31A taken along line XXXIC-XXXIC. In the second embodiment, the same components as those in the first embodiment may be assigned the same reference numerals and detailed explanations thereof may be omitted. In addition, in the case where it is obvious that the effects and advantages obtained in the first embodiment can be obtained also in the second embodiment, the description thereof may be omitted.

A lid 20 includes a pleat part 23 and a pleat seal portion 24. An outer edge seal portion 18 is formed over the entire circumference between a flange part 12 and the lid 20 of a main body 10. In FIGS. 30 and 31A to 31C, the region of the outer edge seal portion 18 and the region of the pleat seal portion 24 are hatched.

(Outer Edge Seal Portion)

As illustrated in FIGS. 31B and 31C, the outer edge seal portion 18 is formed between the lid 20 and the flange part 12. The outer edge seal portion 18 is formed by heat sealing a sealant layer of the lid 20 and the flange part 12. In the present embodiment, as hatched in FIG. 31A, the outer edge seal portion 18 is formed over the entire area of the flange part 12. A width 18W of the outer edge seal portion 18 is not particularly limited, but is preferably 3 mm or more and 7 mm or less. With the width W of the outer edge seal portion 18 being less than 3 mm, when pressure is applied to a containing portion 101, the outer edge seal portion 18 is more likely to peel off to leak the contents. In addition, when the width W of the outer edge seal portion 18 exceeds 7 mm, there arises a problem that the user cannot easily peel off the outer edge seal portion 18 to open the container.

(Pleat Part and Pleat Seal Portion)

The pleat part 23 is formed such that the inner surfaces of the lid 20 face each other. The lid 20 of the present embodiment is formed of a sheet film, and the film is folded back at a tip 23a of the pleat part 23 to make the film continuous as illustrated in FIG. 31B. The pleat seal portion 24 is formed by sealing thermoplastic resin layers 53 of the lid member 50 each other. The dimension lines with reference sign 23L illustrated in FIGS. 31B and 31C indicate the length from the tip 23a to a base 26 of the pleat part 23. As illustrated in FIG. 31C, the pleat seal portion 24 is divided into first pleat seal portions 24a and 24b positioned on the flange part 12 of the main body 10 and a second pleat seal portion 24c positioned between the two first pleat seal portions 24a and 24b. In the present embodiment, the second pleat seal portion 24c is formed across the one first pleat seal portion 24a and the other first pleat seal portion 24b. That is, there exists no non-seal portion in the pleat part 23. In FIGS. 30 and 31C, the boundary between the first pleat seal portion 24a and the second pleat seal portion 24c and the boundary between the first pleat seal portion 24b and the second pleat seal portion 24c are indicated by one-dot chain lines. As illustrated in FIGS. 31B and 31C, the first pleat seal portions 24a and 24b and the second pleat seal portion 24c are formed from the base 26 to the tip 23a of the pleat part 23.

(Description of A axis and B axis)

An A-axis and a B-axis for specifying the orientation of the pleat part will be defined. As illustrated in FIG. 31A, the A axis shown with code A is an axis that passes through the center of the containing portion 101 and has the minimum distance when two points (P1, P2) on the outer edge of the outer edge seal portion 18 are connected. The B axis shown with code B is an axis that passes through the center of the containing portion 101 and connects two points (P3, P4) on the outer edge of the outer edge seal portion 18 so as to be orthogonal to the A axis. The A axis is shorter than the B axis. The ratio of the length of the B axis to the length of A axis is preferably 1.2 to 3.0, and more preferably 1.4 to 2.0. In the present embodiment, as illustrated in FIG. 31A, the pleat part 23 passes through the center of the containing portion 101 and is located on the B axis. That is, the pleat part 23 is parallel to the B axis. However, the pleat part 23 does not have to be necessarily on the B axis or in parallel to the B axis as far as the pleat part 23 is formed along the B axis. The "formed along the B axis" means that the angle formed with the B axis is 0° or more and less than 45°. The pleat part 23 is preferably formed at an angle of 10° or less with the B axis. Further, in the embodiment, as illustrated in FIG. 31A, the pleat part 23 is formed across one short side portion 122 to the opposed other short side portion 122 of the flange part 12. In the present embodiment, as illustrated in FIG. 31A, the direction in which the short side portion 122 extends is perpendicular to the direction in which the pleat part 23 extends.

(Steam Passing Portion)

As illustrated in FIGS. 30 and 31C, the second pleat seal portion 24c is provided with a steam passing portion 30. In the present embodiment, the steam passing portion 30 includes a V-shaped through hole 31. As illustrated in FIG. 31C, the V-shaped through hole 31 is arranged such that the apex point faces the main body 10. In the vertical direction, the through hole 31 is preferably formed at a position separated upward 2 mm to 5 mm from the base 26 of the pleat part. Further, in the horizontal direction, the through hole 31 is preferably formed near the center of the containing portion from the viewpoint of stably releasing the steam from the through hole 31, but the through hole 31 is preferably formed far from the center of the containing portion from the viewpoint of enhancing the steaming effect.

(Lid)

A material of the lid member 50 constituting the lid 20 illustrated in FIGS. 31A to 31C will be described. The lid member 50 includes at least the first base material 51 and the thermoplastic resin layer 53. As a material of the first base material 51, a polyester resin such as polyethylene terephthalate, a polyamide resin such as nylon (Ny), polypropylene, or the like can be used. The first base material 51 is preferably biaxially stretched. In addition, as a material for forming the thermoplastic resin layer 53, a mixed resin containing one resin and a resin incompatible with the one resin can be used. As the mixed resin, a mixed resin of polypropylene and polyethylene, a mixed resin of polyethylene and polybutene, or the like can be used. The thermoplastic resin layer 53 constitutes a layer to be the innermost layer of the lid member 50. When the first base material 51 and the thermoplastic resin layer 53 both contain polypropylene, biaxially stretched polypropylene is used in the first base material 51, and non-stretched polypropylene is used in the thermoplastic resin layer 53. The lid member 50 may include a plurality of first base materials 51. In addition, the lid member 50 may include any layers other than the first base material 51 and the thermoplastic resin layer 53. The other layer may be provided outside the first base material 51, or may be provided between the first base material 51 and the thermoplastic resin layer 53. Other layers include barrier layers and the like. The barrier layer can be any of a resin layer or the like having a gas barrier property including a deposited layer of metal oxide such as aluminum oxide, inorganic oxide such as silicon oxide, ethylene-vinyl alcohol copolymer (EVOH), polyvinylidene chloride resin (PVDC), and aromatic polyamide such as nylon MXD6. Each layer can be laminated using a dry laminating method, a melt extrusion method, or the like.

(Main Body)

Figure 32A:
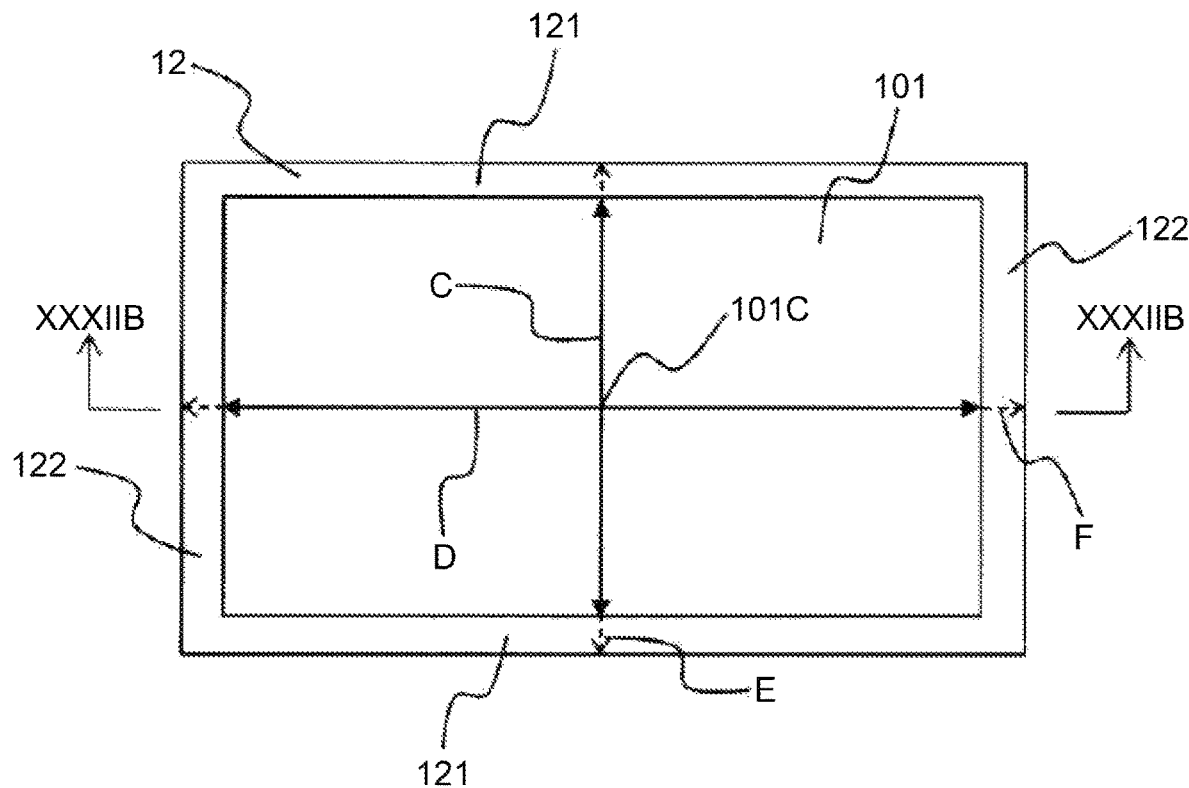
FIG. 32A is a plan view of a main body of the container for microwave oven according to the second embodiment.
Figure 32B:
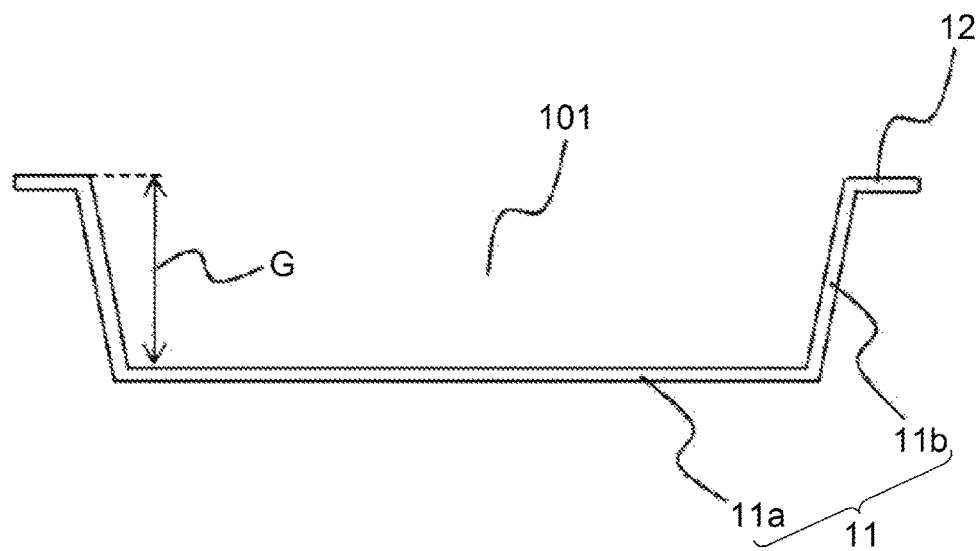
FIG. 32B is a cross-sectional view of the main body of the container for microwave oven according to the second embodiment.

FIGS. 32A and 32B are plan views of the main body 10 constituting the container 1 for microwave oven according to the present embodiment. FIG. 32A is a plan view, and FIG. 32B is a cross-sectional view of FIG. 32A taken along line XXXIIB-XXXIIB. As illustrated in FIG. 32A, the flange part 12 of the main body 10 includes two opposing long side portions 121 and two opposing short side portions 122. In the present embodiment, the outline of the outline of the flange part 12 is rectangular. Further, in the present embodiment, the outline of the inner edge of the flange part 12 is rectangular.

A C axis indicated by sign C and a D axis indicated by sign D will be described with reference to FIG. 32A. The C axis passes through the center of the containing portion 101, and has the minimum distance when connecting two points on the inner edge of the flange part 12. The D axis passes through the center of the containing portion 101 and connects two points on the inner edge of the flange part 12 so as to be orthogonal to the C axis. The D axis is longer than the C axis. In the present embodiment, the C axis is located on the same straight line as the A axis illustrated in FIG. 31A. Further, in the present embodiment, the D axis is located on the same straight line as the B axis. An E axis indicated by sign E passes through the center of the containing portion 101, and has the minimum distance when connecting two points on the inner edge of the flange part 12. An F axis indicated by sign F passes through the center of the containing portion 101 and connects two points on the inner edge of the flange part 12 so as to be orthogonal to the E axis. The F axis is longer than the E axis. In the present embodiment, the E axis is located on the same straight line as the C axis and the A axis. Further, in the present embodiment, the F axis is located on the same straight line as the D axis and the B axis. Since the C axis and the E axis are located on the same straight line and the D axis and the F axis are located on the same straight line. Thus, FIG. 32A illustrates these axes such that the difference in length between the C axis and the E axis and the difference in length between the D axis and the F axis can be easily seen from the difference between the shapes of arrows on the both ends of the axes. Also, the C axis and the D axis are illustrated by solid lines, and the E axis and the F axis are illustrated by broken lines. The length of the D axis relative to the length of the C axis is not particularly limited as long as the C axis is shorter than the D axis, but is preferably 1.2 to 3.0, and more preferably 1.4 to 2.0.

As illustrated to FIG. 32B, the body part 11 contains a side portion 11b and a bottom portion 11a. In a plan view, the bottom portion 11a is rectangular. The side portion 11b stands from the periphery of the bottom portion 11a. As illustrated in FIG. 32B, the flange part 12 is connected to the upper edge of the side portion 11b and extends horizontally outward. Referring to FIG. 32B, G represents the depth of the main body 10, that is, the depth of the containing portion 101, and indicates the distance along the vertical direction from the upper edge of the flange part to the upper edge of the bottom portion 11a.

The main body 10 is formed using a thermoplastic resin such as polyolefin such as polypropylene (PP), polyethylene (PE), or polystyrene (PS). The main body 10 can be molded by, for example, an injection molding method. The thickness of the main body 10 is preferably in the range of 0.5 to 2.0 mm.

(Contents)

The contents include water. Examples of the contents include retort food, frozen food, refrigerated food, and others. In addition, food can be curry, porridge, pan-fried noodles, household dishes, fish, others. These contents are heated and evaporate liquid to increase the pressure in the containing portion 101 of the container. Thus, the container is requested to have a steam removal function to release the steam from the containing portion 101 to the outside.

(The Principle of Steam Release)

When the container for microwave oven of the embodiment filled with the contents is heated and cooked in a microwave oven, the water evaporates to generate steam. The generated steam exerts a force to lift the lid. The force is larger with increasing proximity to the center of the containing portion 101. In the embodiment, since the pleat part 23 is provided along the B axis of the main body 10, that is, along the longitudinal direction of the main body 10. This makes the force unlikely to be applied to the first pleat seal portions 24a and 24b so that the steam can be stably released from the steam passing portion 30 provided in the second pleat seal portion 24c. This makes it possible to suppress release of the steam through the first pleat seal portions 24a and 24b and the outer edge seal portion 18, thereby suppressing the contents from leaking out.

Comparative Embodiment

Figure 33:
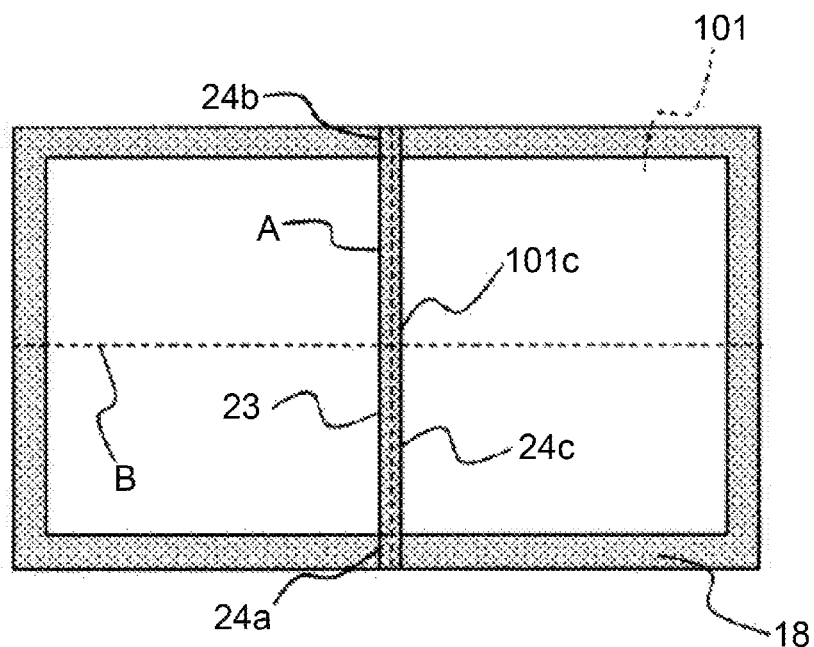
FIG. 33 is a plan view of a container for microwave oven according to a comparative embodiment.

FIG. 33 is a plan view of a container for microwave oven according to a comparative embodiment. The same components as those in the embodiment will be given the same reference signs and duplicated description will be omitted. The comparative embodiment is the same as the present embodiment except that the pleat part 23 is positioned on the A axis. In the comparative embodiment, the pleat part 23 passes through the center of the containing portion 101 and is positioned on the A axis, and the second pleat seal portion 24c is provided with the steam passing portion 30. Also in the comparative embodiment, the second pleat seal portion 24c is formed across the one first pleat seal portion 24a and the other first pleat seal portion 24b. Further, the first pleat seal portion 24a and 24b and the second pleat seal portion 24c are formed from the base to the tip of the pleat part 23. Also in the comparative embodiment, the steam passing portion 30 is formed in the second pleat seal portion 24c and includes a V-shaped incision.

When the container for microwave oven of the comparative embodiment filled with the contents is heated and cooked in a microwave oven, the resultant steam exerts a force to lift the lid 20 as described above. The force is larger with increasing proximity to the center of the containing portion 101. In the comparative embodiment, the pleat part 23 is provided along the A axis, and thus the distance from the center of the containing portion 101 to the outer edge of the first pleat seal portions 24a and 24b is short. Thus, it is considered that the steam leaks out through the first pleat seal portions 24a and 24b before being released from the steam passing portion provided in the second pleat seal portion 24c. Further, the first pleat seal portions 24a and 24b are formed in a state in which the pleat part 23 of the lid 20 and a portion of the lid 20 sealed on the flange part 12 overlap each other. That is, the first pleat seal portions 24a and 24b are formed in a state in which four films overlap. Therefore, the portions of the outer edge seal portion 18 overlapping and sealed with the first pleat seal portions 24a and 24b are smaller in seal strength than the other portions. Therefore, steam may escape from the portions of the outer edge seal portion 18 overlapping and sealed with the first pleat seal portions 24a and 24b between the lid 20 and the flange part 12.

Modification Example of the Pleat Part

Figure 34:
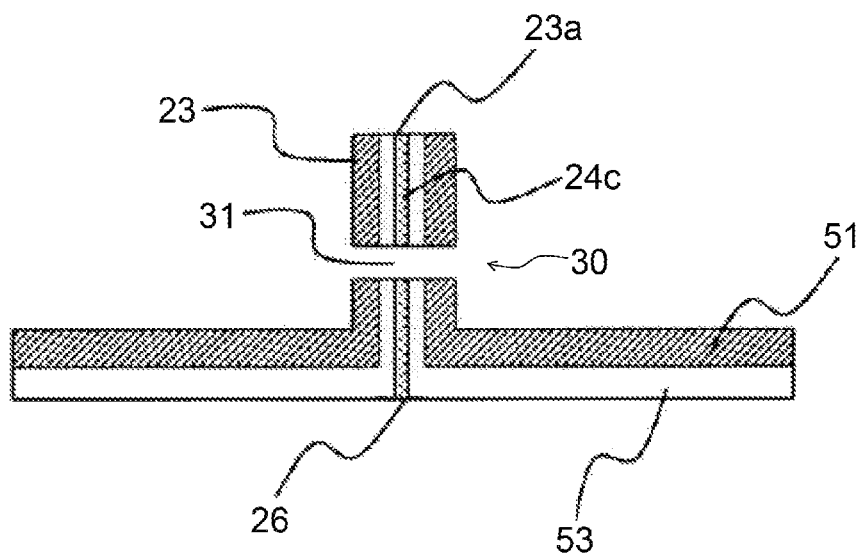
FIG. 34 is a cross-sectional view of a lid member in a modification example.

FIG. 34 is a cross-sectional view of the lid 20 in a modification example, which corresponds to a cross-sectional view of FIG. 31A along line XXXIB-XXXIB. In the example illustrated in FIGS. 30 to 31C, a single film is used to form the pleat part 23. However, in the modification example illustrated in FIG. 34, two films are used to form the pleat part 23. Referring to FIG. 34, the steam passing portion 30 includes the through hole 31. In the case where the pleat part 23 is made of two films, the films are not continuous at the tip 23a of the pleat part 23. Thus, it is essential to form the second pleat seal portion 24c across one first pleat seal portion 24a to the other first pleat seal portion 24b. In the modification example illustrated in FIG. 34, the steam passing portion 30 includes the through hole 31. However, when the pleat part 23 is made of two films, the steam passing portion 30 needs not to include the through hole. In this case, the steam passing portion 30 can act by forming a portion of the second pleat seal portion 24c with a small seal width in the vertical direction.

Modification Examples of the Main Body

Figure 35A:
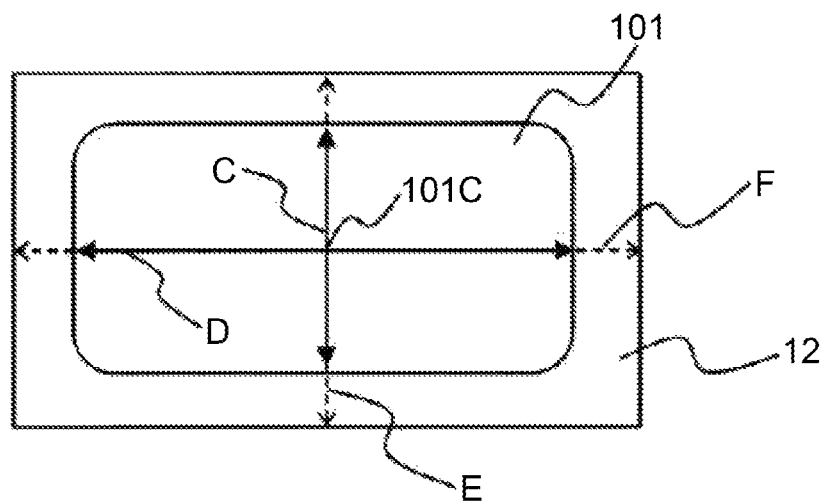
FIG. 35A is a plan view of a modification example of a planar shape of the main body.
Figure 35B:
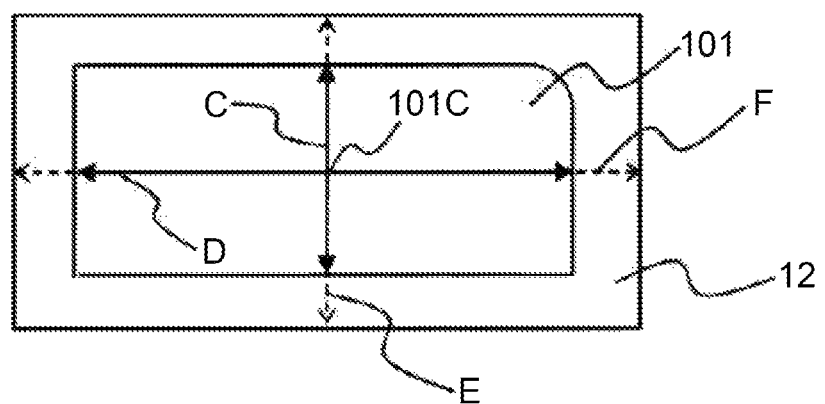
FIG. 35B is a plan view of a modification example of a planar shape of the main body.
Figure 35C:
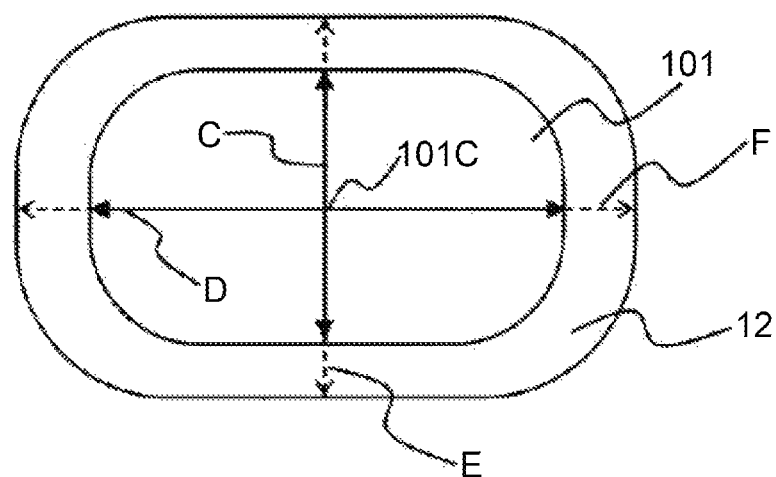
FIG. 35C is a plan view of a modification example of a planar shape of the main body.
Figure 35D:
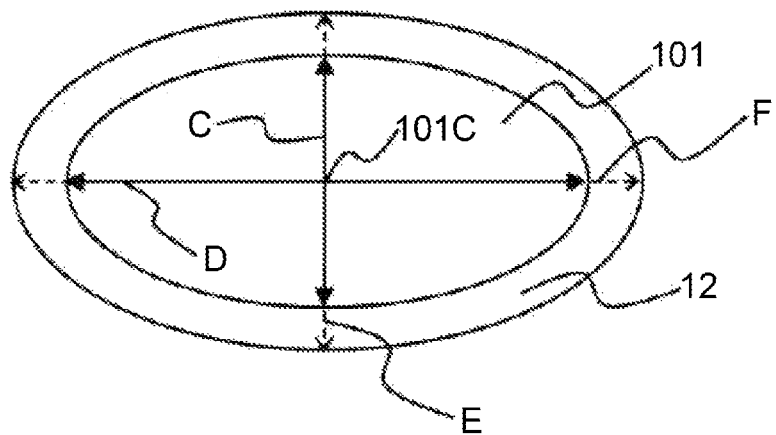
FIG. 35D is a plan view of a modification example of a planar shape of the main body.

FIGS. 35A to 35D are plan views of modification examples of the main body 10. FIGS. 35A to 35D illustrate four representative modification examples. As can be seen by comparison with FIG. 32A, in the modification example of FIG. 35A, all the four corners of inner edge of the flange part 12 are chamfered to form an outwardly convex arc. In the modification example of FIG. 35B, one corner of the inner edge of the flange part 12 is chamfered to form an outwardly convex arc. Referring to FIG. 35B, the upper right corner is chamfered, but any other corner may be chamfered, or any two or three corners may be chamfered. In the modification example of FIG. 35C, the four corners of inner edge and the four corners of outer edge of the flange part 12 are all chamfered to form an outwardly convex arc shape. In the second embodiment, the outline of the inner edge and the outline of the outer edge of the flange part 12 are rectangular as an example. However, some or all of the corners of the rectangular shape may be chamfered as illustrated in FIGS. 35A to 35C so as to form an outwardly convex arc. In the second embodiment, the outlines of the inner edges and the outer edge illustrated in FIGS. 35A to 35C are also included in the concept of a rectangular shape. In the modification illustrated of FIG. 35D, the inner edge and outer edge of the flange part 12 are elliptical.

Modification Example of the Outer Edge Seal Portion

Figure 36:
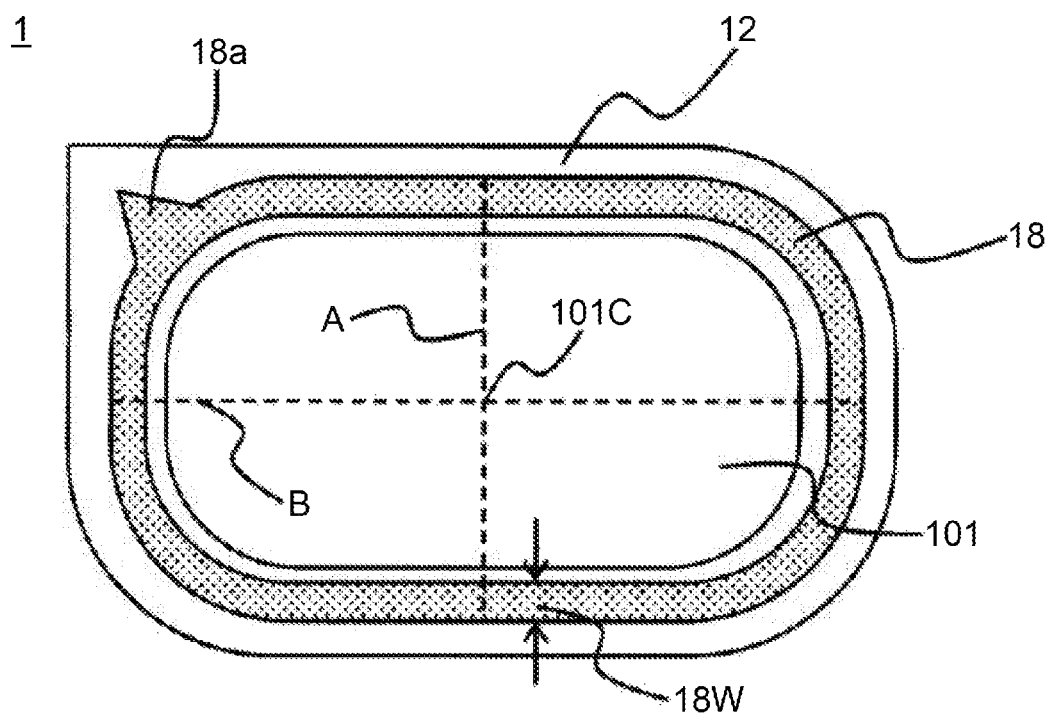
FIG. 36 is a plan view of a modification example of an outer edge seal portion.

FIG. 36 is a plan view of the container 1 illustrating a modification example of the outer edge seal portion 18. In FIG. 36, the pleat part 23 is not illustrated for convenience of illustration. As illustrated in FIG. 36, the outer edge seal portion 18 may not be provided across the entire width of the flange part 12. Also in this case, preferably, the width 18W of the outer edge seal portion 18 is 3 mm or more and 7 mm or less. In the modification example of FIG. 36, a portion (upper left side in the drawing) of the outer edge seal portion 18 is provided with a protruding seal portion 18a which protrudes outward. In the present modification, the protruding seal portion 18a has a tapered shape. As described above, providing the protruding seal portion 18a makes it possible to reduce the peel strength at the beginning of peeling, which facilitates the opening of the container.

Modification Example of the Position of the Pleat Part

Figure 37:
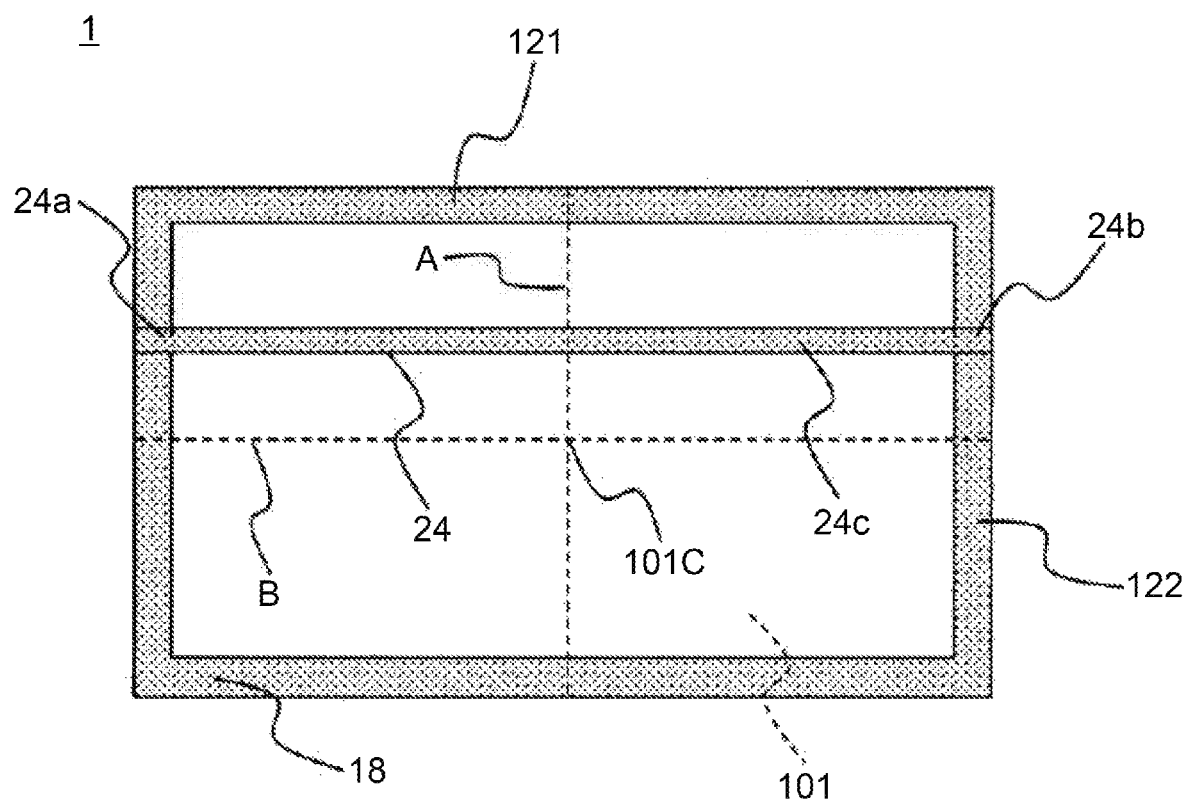
FIG. 37 is a plan view of a modification example of the position of a pleat part.

FIG. 37 is a plan view of the container illustrating a modification example of the position of the pleat part 23. In the modification example illustrated in FIG. 37, the pleat part 23 crosses the containing portion 101 and is parallel to the B axis, but is offset and closer to one long side portion 121. Referring to FIG. 37, the pleat part 23 is offset and closer to the long side portion 121 on the upper side of the drawing. That is, the pleat part 23 is provided so as not to pass through the center of the container.

Figure 38A:
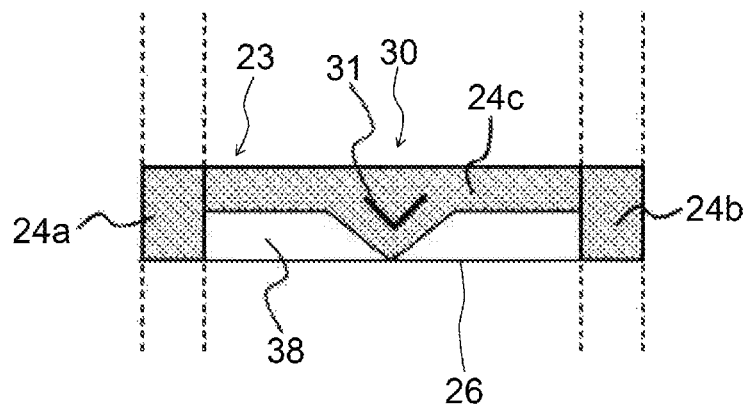
FIG. 38A is a diagram illustrating a modification example of seal form of a pleat seal portion.
Figure 38B:
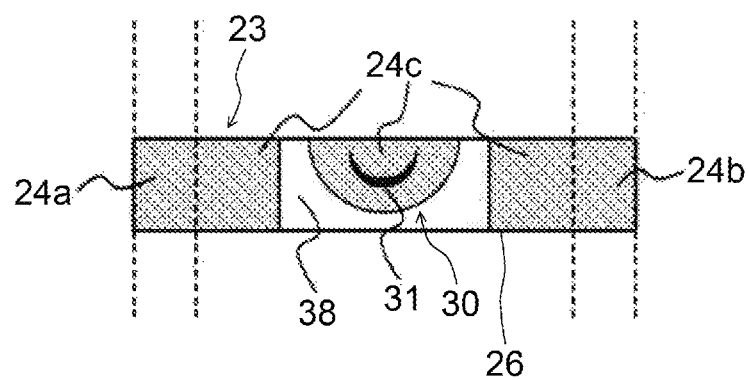
FIG. 38B is a diagram illustrating a modification example of seal form of the pleat seal portion.

FIGS. 38A and 38B are diagrams illustrating modification examples of the seal form of the pleat seal portion. FIGS. 38A and 38B correspond to FIG. 31C illustrating the embodiment, but illustrate only the pleat part 23. In FIGS. 38A and 38B, the sealed portions are shaded. The two dashed lines each on the right and left in FIGS. 38A and 38B indicate the width of the corresponding flange part 12. In the modification example of FIG. 38A, there is a trapezoidal non-seal portion 38 on the lower right and left sides of the second pleat seal portion 24c. The non-seal portion 38 is formed to include the base 26 of the pleat part 23. The second pleat seal portion 24c includes a downwardly convex portion and a V-shaped cutout (through hole) formed at a position corresponding to the convex portion. In the present modification example, the convex portion of the second pleat seal portion 24c has a triangular shape. However, the present invention is not limited to this. In the modification example of FIG. 38A, the second pleat seal portion 24c is formed across the two first pleat seal portions 24a and 24b. Thus, the modification example is also applicable to the case in which the pleat part 23 is made of two films as illustrated in FIG. 34.

In the modification example of FIG. 38B, the second pleat seal portion 24c is formed from a semicircular portion on the upper center side and right and left rectangular portions that are separated from the semicircular portion and are adjacent to the first pleat seal portions 24a and 24b. In FIG. 38B, a non-shaded portion constitutes the non-seal portion 38. The non-seal portion 38 is formed to include the tip 23a and the base 26 of the pleat part 23. In the modification example of FIG. 38B, the through hole (incision) 31 as the steam passing portion 30 has a downwardly convex semicircular arc portion in accordance with the semicircular portion of the second pleat seal portion 24c. The semicircular arc-shaped through hole (incision) 31 as the steam passing portion 30 is all accommodated in the second pleat seal portion 24c. In the modification example of FIG. 38B, there is the non-seal portion 38 between the first pleat seal portions 24a and 24b and the second pleat seal portion 24c. Thus, the modification example is not applicable to the case in which the pleat part 23 is made of two films as illustrated in FIG. 34.

Modification Example of the Seal Portion

In the container 1 according to the present embodiment, as in the first embodiment described above, preferably, the pleat seal portion 24 peels off around the steam passing portion 30 earlier than the outer edge seal portion 18, whereby steam is released from the steam passing portion 30. In consideration of this point, the pleat seal portion 24 may have an easy peeling property as in the first embodiment. For example, the seal strength of the second pleat seal portion 24c of the pleat seal portion 24 may be lower than the seal strength of the outer edge seal portion 18.

The seal strength of the outer edge seal portion 18 under an environment at a temperature of 25° C. and a relative humidity of 50% is, for example, 10N or more, more preferably 15N or more. The seal strength of the second pleat seal portion 24c under an environment at a temperature of 25° C. and a relative humidity of 50% is lower than the seal strength of the outer edge seal portion 18, which is, for example 12N or less, more preferably 10N or less.

The seal strength of the outer edge seal portion 18 at 100° C. is, for example, 3.0 N or more. The seal strength of the second pleat seal portion 24c at 100° C. is lower than the seal strength of the outer edge seal portion 18, which is, for example, 8.0N or less, more preferably 2.5N or less.

Modification Examples of the Steam Passing Portion

Figure 39A:
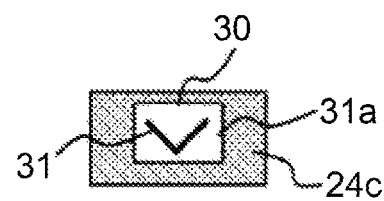
FIG. 39A is a diagram of a modification example of the steam passing portion.
Figure 39B:
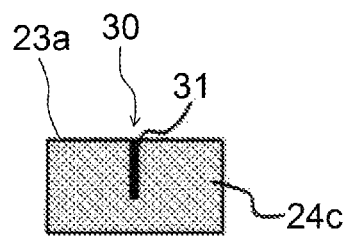
FIG. 39B is a diagram of a modification example of the steam passing portion.
Figure 39C:
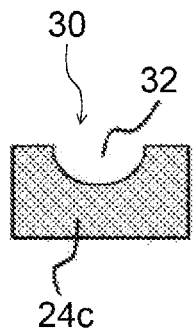
FIG. 39C is a diagram of a modification example of the steam passing portion.
Figure 39D:
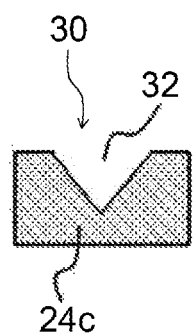
FIG. 39D is a diagram of a modification example of the steam passing portion.

FIGS. 39A to 39D are diagrams illustrating modification examples of the steam passing portion 30. FIGS. 39A to 39D are views corresponding to FIG. 31C illustrating the embodiment. However, for the convenience of illustration, these drawings illustrate only the steam passing portion 30 and its vicinity in an extracted form. In FIGS. 39A to 39D, the sealed portions are shaded. In the modification example of FIG. 39A, the steam passing portion 30 includes the non-seal portion 31a and the through hole 31, and the through hole 31 is formed in the non-seal portion 31a. In the modification example of FIG. 39A, the non-seal portion 31a has a rectangular shape, but may have a shape other than the rectangular shape. In the modification example of FIG. 39B, the steam passing portion 30 includes an I-shaped through hole (incision) 31 extending in the vertical direction. In the example of FIG. 39B, the upper end of the through hole 31 reaches the tip 23a of the pleat part 23. In the modification example of FIG. 39C, not a through hole (incision) but a cutout 32 is provided as the steam passing portion 30. In the modification example of FIG. 39C, the shape of the cutout 32 is a downwardly convex semicircular shape. Also in the modification example of FIG. 39D, a cutout 32 is provided as the steam passing portion 30. In the example of FIG. 39D, the shape of the cutout 32 is triangular. Instead of the incision, a hole may be formed.

Modification Examples of the Main Body

The main body 10 may be formed using a sheet forming method such as a vacuum forming method or a compressed air forming method. For example, in the case of producing the main body 10 by processing a plastic sheet by deep drawing as a kind of sheet forming method, a sheet in which PP, Ny, and PP are laminated in order, a sheet in which LLDPE, Ny, and LLDPE are laminated in order can be used. When the main body is formed by deep drawing, the thickness of the main body can be 100 to 500 µm.

EXAMPLES

Next, the second embodiment will be more specifically described by examples. However, the second embodiment is not limited to the descriptions of the following examples unless the second embodiment deviates from the gist of the embodiment.

Example B1

Using a 300 µm-thick coextruded sheet (PP/EVOH (ethylene-vinyl alcohol copolymer)/PP), the main body 10 illustrated in FIGS. 32A and 32B was formed by a sheet forming method. A molded tray having an outer size of the flange part 12 (E axis×F axis) of 110 mm×150 mm, an inner size (C axis×D axis) of 90 mm×130 mm, and a depth G of 30 mm was produced as the main body 10. Next, a laminated film was prepared by sequentially laminating a 12 µm-thick polyethylene terephthalate film, a 15 µm-thick biaxially stretched polyamide film, and a 50 µm-thick easy peel film. Then, the laminated film produced as described above was used to form the pleat part 23, the pleat seal portion, and the V-shaped through hole 31 as the steam passing portion 30, thereby producing the lid 20. The molded tray produced as described above (the main body 10) was filled with 100 g of water and the lid 20 was joined to the main body 10, thereby forming the container illustrated in FIG. 30. At this time, the length (L) from the tip 23a to the base 26 of the pleat part 23 was 10 mm. The pleat part 23 was located on the B axis. The through hole 31, as the steam passing portion 30, was located in the center of the containing portion 101. The width of the outer edge seal portion 18 was 7 mm. The distance from the base 26 of the pleat part 23 to the lower end of the through hole 31 was 3 mm.

Example B2

A container was produced in the same manner as in Example B1, except that a V-shaped through hole 31 was formed at a position shifted by 30 mm in the horizontal direction as the steam passing portion 30.

Example B3

A container was produced in the same manner as in Example B1, except that the steam passing portion 30 was changed to an I-shaped through hole 31 extending in the vertical direction. The I-shaped incision was formed so as to reach the tip 23a of the pleat part 23.

Comparative Example B1

A container was produced in the same manner as Example B1, except that the pleat part 23 was positioned on the A axis. That is, the container in Comparative example B1 corresponds to the container illustrated in FIG. 33.

Comparative Example B2

A container was produced in the same manner as in Comparative example B1, except that the steam passing portion 30 was changed to an I-shaped incision extending in the vertical direction.

Evaluation Results of the Examples and the Comparative Examples

The evaluation sample was allowed to stand at the center of a 600 W microwave oven (manufactured by Sharp Corporation), heated until it let steam out, and evaluated by visual confirmation.

Table 1 shows the evaluation results as follows:

TABLE 1

| | Pleat part | Incision shape | Incision position in horizontal | Results |
|---|---|---|---|---|
| Example B1 | On B axis | V shape | Center of containing portion | Good: Steam was passed through incision in pleat part |
| Example B2 | On B axis | V shape | Position shifted 30 mm from center of containing portion | Good: Steam was passed through incision in pleat part |
| Example B3 | On B axis | I shape | Center of containing portion | Good: Steam was passed through incision in pleat part |
| Comparative Example B1 | On A axis | V shape | Center of containing portion | Not good: Steam was passed through not only incision in pleat part but also portion of peripheral seal portion overlapping pleat part and sealed, the portion being peeled off from pleat part |
| Comparative Example B2 | On A axis | I shape | Center of containing portion | Not good: Steam was passed through not only incision in pleat part but also portion of peripheral seal portion overlapping pleat part and sealed, the portion being peeled off from pleat part |

As the evaluation results show, in the case where the pleat part was provided along the B axis (parallel to the long side portion) as in Example B1 to Example B3, steam came out of the steam passing portion 30 provided in the second pleat seal portion 24c of the pleat part 23 (steam passing), and good results were obtained. On the other hand, as in Comparative example B1 and Comparative example B2, when the pleat part was provided along the A axis (parallel to the short side portion), steam came out not only from the steam passing portion 30 provided in the second pleat seal portion 24c of the pleat part 23 but also from between the lid and the flange part, whereby part of water leaked out.

Third Embodiment

Next, a third embodiment of the present invention will be described. First, problems to be solved by the third embodiment will be described.

As a container for containing contents such as cooked food, a deep-drawn container obtained by subjecting a laminate to deep-draw forming is known as disclosed in JP 2006-232280 A, for example. The deep drawing container includes a main body having a body part formed by deep drawing and a flange part extending outward from an upper portion of the body part, and a lid joined to the flange part. Further, the container is provided with a steam passing portion for letting out steam generated when the contents are heated by a microwave oven or the like.

Various kinds of information such as images and characters representing a product, images and characters explaining how to use, and the like are displayed by printing on a container of a type in which the contents are heated in a microwave or the like. Hereinafter, a part of the container on which various kinds of information such as images and characters are printed will also be referred to as a display portion.

In deep draw forming, the laminate to be the main body is greatly stretched. Therefore, when the display portion is provided in advance in the laminate, the display portion will be largely distorted by deep draw forming. Therefore, in the deep drawn container, it is difficult to provide the display portion on the container side, and thus the display portion is provided on the lid. However, since the area of the display portion is greatly restricted on the lid alone, it is desirable that the main body can also be used as the display portion.

An object of the present embodiment is to provide a container that can effectively solve these issues and a method for manufacturing the same.

A container having a containing portion for containing contents according to the present embodiment of the present disclosure includes: a main body that has a body part defining the containing portion and a flange part extending outward from an upper portion of the body part, the main body being formed by a bottom member (first laminated body); a lid that is joined to the flange part of the main body via an outer edge seal portion so as to cover the containing portion, the lid being formed by a lid member (second laminated body); and a steam passing portion that is configured to communicate the containing portion with outside of the container when pressure of the containing portion increases. The bottom member has at least a thermoplastic resin layer constituting an inner surface located on the containing portion, and a base material laminated on the thermoplastic resin layer. The base material of the bottom member includes a stretched film.

A method for manufacturing a container according to the present embodiment including: a containing portion that contains contents and a steam passing portion that is configured to communicate the containing portion with outside when pressure of the containing portion increases, includes: a step of preparing a bottom member (first laminated body) for constituting a main body having a body part defining the containing portion and a flange part extending outward from an upper portion of the body part; a step of forming the body part by subjecting the bottom member to draw forming; a step of filling contents into the body part; a step of overlapping a lid member (second laminated body) for constituting a lid covering the containing portion on the bottom member; and a step of joining the lid member to the flange part extending outward from the upper portion of the body part of the bottom member. The bottom member has at least a thermoplastic resin layer constituting an inner surface located on the containing portion, and a base material laminated on the thermoplastic resin layer. The base material of the bottom member includes a stretched film.

According to the present embodiment, it is possible to provide a container that includes a main body provided with a display portion excellent in printability of the display portion.

Figure 40:
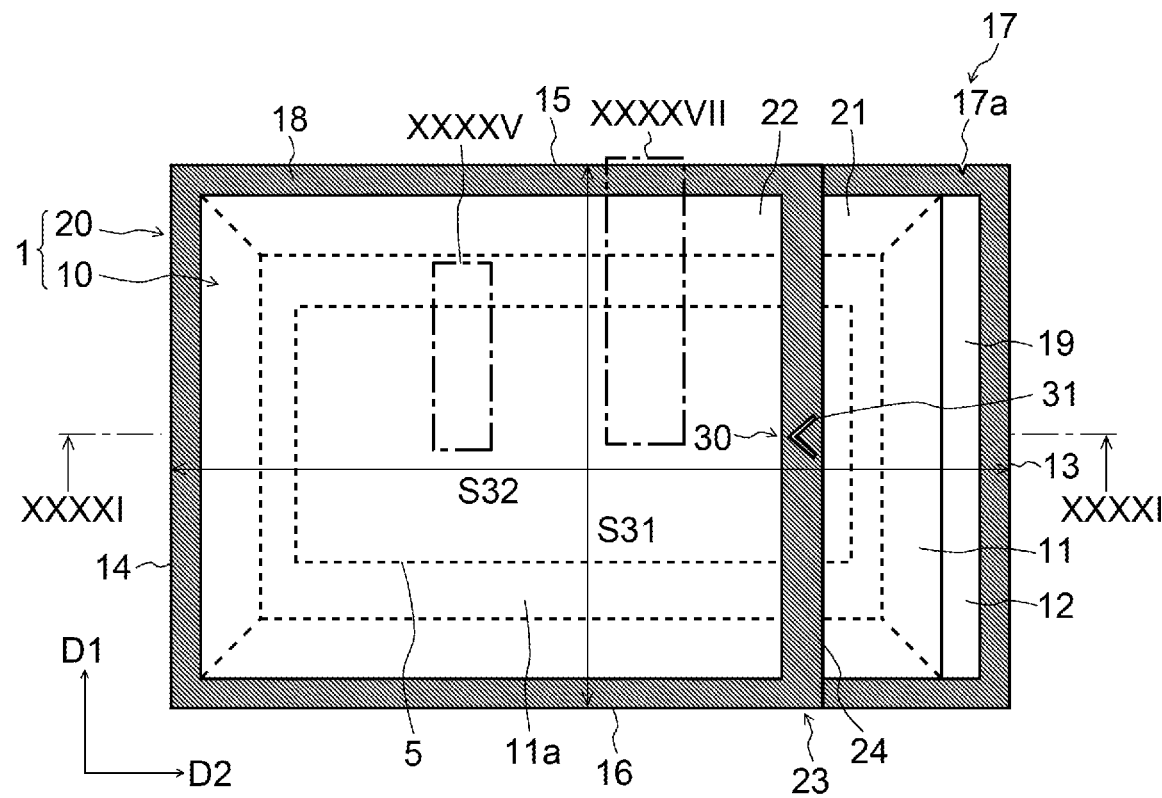
FIG. 40 is a plan view of a container in a third embodiment.
Figure 41:
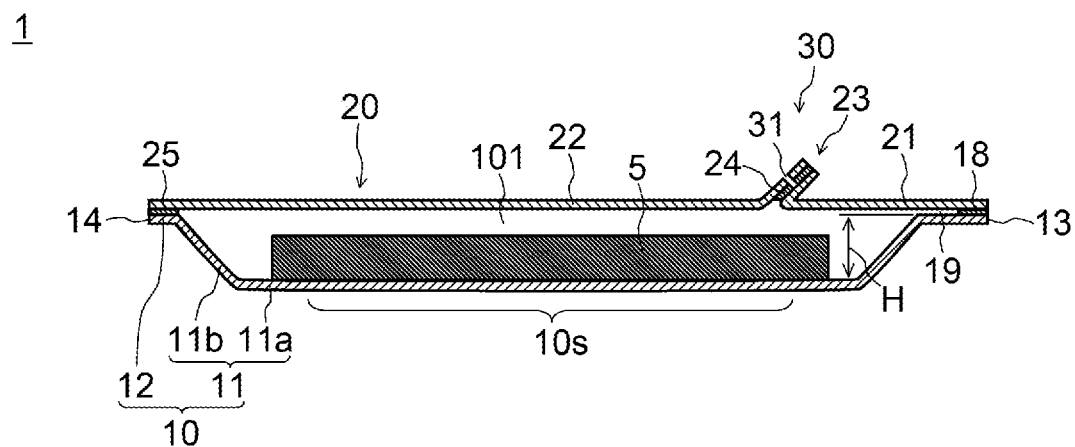
FIG. 41 is a cross-sectional view of the container illustrated in FIG. 40 as viewed along line XXXXI-XXXXI.

Hereinafter, a container 1 of the present embodiment will be specifically described. FIG. 40 is a plan view of the container 1 according to the present embodiment. FIG. 41 is a cross-sectional view of the container 1 illustrated in FIG. 40 as viewed along line XXXXI-XXXXI. The container 1 includes a main body 10, a lid 20, and a steam passing portion 30 as in the first embodiment. Moreover, the container 1 may further include an opening means 17 for making it easy to open the container 1 by tearing. In the third embodiment, the same components as those in the first embodiment may be assigned the same reference numerals and detailed explanations thereof may be omitted. In addition, in the case where it is obvious that the effects and advantages obtained in the first embodiment can be obtained also in the third embodiment, the description thereof may be omitted.

Hereinafter, the main body 10, the lid 20, the steam passing portion 30, and the opening means 17 will be described.

[Main Body]

As illustrated in FIG. 41, the main body 10 includes a display portion 10s which is visually recognized when the main body 10 is viewed from the outer surface side of the bottom member (first laminated body) constituting the main body 10. The display portion 10s is a portion of the main body 10 on which various kinds of information such as images, figures, patterns, characters, numbers, and symbols are printed. Examples of the information includes a product name, raw material names of the product, a content volume, an expiration date, a preservation method, a manufacturer, a seller, a nutritional component indication, a usage method, handling precautions and the like. The layer constituting the display portion 10s is contained in the bottom member as described later. Although not illustrated, the lid 20 may include a display portion as well.

In FIG. 40, reference sign S31 represents the dimension of the container 1 as seen in a first direction D1, and reference sign S32 represents the dimension of the container 1 as seen in a second direction D2. Further, in FIG. 41, reference sign H represents the depth of a body part 11 of the main body 10. The depth H is, for example, 5 mm or more and 20 mm or less. Further, H/S 31 and H/S 32 are both 0.2 or less. As described above, in the present embodiment, the degree of forming the body part 11 by forming the laminated body is relatively small. This makes it possible to suppress the distortion of the display portion 10s provided in advance in the laminated body due to the forming. Moreover, for the laminated body constituting the main body 10, a component having comparatively high tensile strength and unlikely to stretch can be used. For example, a laminated body including a stretched film can be used as the bottom member (first laminated body) constituting the main body 10 as described later.

[Lid]

The lid 20 is disposed on a flange part 12 to cover the containing portion 101 of the main body 10, and is joined to an upper surface of the flange part 12 via an outer edge seal portion 18. The flange part 12 does not have to be entirely joined to the lid 20 but the flange part 12 may have a non-seal portion 19 not joined to the lid 20. In the example illustrated in FIG. 41, of the flange part 12 extending along a first edge portion 13, in a portion on the inner side of the outer edge seal portion 18 extending along a first edge portion 13, the non-seal portion 19 extends along the first direction D1 from the outer edge seal portion 18 on a third edge portion 15 side to the outer edge seal portion 18 on a fourth edge portion 16 side. The opening means 17 is configured to open the container 1 along the non-seal portion 19.

As illustrated in FIGS. 40 and 41, the lid 20 includes a first lid part 21 located on the first edge portion 13 side and a second lid part 22 located on the second edge portion 14 side. An end portion of the first lid part 21 and an end portion of the second lid part 22 overlap with each other, and are joined to each other by a pleat seal portion 24.

[Steam Passing Portion]

As illustrated in FIG. 40, the steam passing portion 30 includes a through hole 31 formed in the pleat seal portion 24. The through hole 31 penetrates at least one of the first lid part 21 and the second lid part 22. In the example illustrated in FIG. 41, the through hole 31 penetrates the second lid part 22. As described later, when the pressure of the containing portion 101 increases and the peeling of the pleat seal portion 24 progresses and reaches the through hole 31, the steam in the containing portion 101 can pass through the through hole 31 to the outside. In the example illustrated in FIG. 41, the through hole 31 is located in the center of the pleat seal portion 24 extending in the first direction D1. Although not illustrated, the through hole 31 may be shifted from the center of the pleat seal portion 24. As illustrated in FIG. 40, the through hole 31 may have a shape that is convex toward the containing portion 101, for example, a V shape.

[Opening Means]

The opening means 17 is configured to facilitate tearing of the main body 10 and the lid 20 in the first direction D1 in which the first edge portion 13 extends. For example, the opening means 17 includes a notch 17a formed in the main body 10 and the lid 20 at a position in the third edge portion 15 close to the first edge portion 13. The notch 17a may be a cutout or incision. The user can tear the main body 10 and the lid 20 in the first direction D1 starting from the notch 17a.

As illustrated in FIG. 40, the opening means 17 is configured to facilitate tearing of the flange part 12 extending along the first edge portion 13 at a position more inside than the outer edge seal portion 18 extending along the first edge portion 13. For example, when the notch 17a of the opening means 17 is viewed along the first direction D1, the notch 17a overlaps the non-seal portion 19 of the flange part 12 extending along the first edge portion 13. In this case, when the user tears off the main body 10 and the lid 20 in the first direction D1 starting from the notch 17a, the tear line passes through the non-seal portion 19 of the flange part 12. In the non-seal portion 19 of the flange part 12, the flange part 12 and the lid 20 are close to each other although they are not joined. This makes it possible to improve the ease of tearing, as compared with the case where the main body 10 and the lid 20 are torn at the position of the body part 11.

Although not illustrated, the opening means 17 may be configured such that the main body 10 and the lid 20 are to be torn at the position of the body part 11. Even in this case, in the present embodiment, the bottom member 40 constituting the main body 10 provides the ease of tearing as described later, and thus the container 1 can be opened by tearing.

(Bottom Member)

Figure 42:
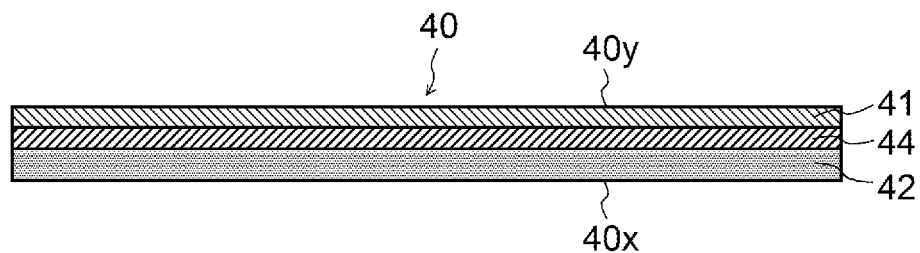
FIG. 42 is a cross-sectional view of an example of a layered structure of a laminated body constituting the main body and the lid.

Next, the layer configuration of the bottom member (first laminated body) 40 constituting the main body 10 will be described with reference to FIG. 42. The bottom member 40 includes at least a first base material 41 and a thermoplastic resin layer 42. FIG. 42 illustrates an example in which the bottom member 40 has the first base material 41, a print layer 44, and a thermoplastic resin layer 42. The first base material 41 constitutes an outer surface 40y of the bottom member 40. The thermoplastic resin layer 42 constitutes an inner surface 40x of the bottom member 40. The print layer 44 can be provided between the first base material 41 and the thermoplastic resin layer 42, and can be provided on the surface of the first base material 41 on the inner surface 40x side. The inner surface 40x is a surface located on the containing portion 101 side of the main body 10, and the outer surface 40y is a surface located on the opposite side of the inner surface 40x.

In the present embodiment, the first base material 41 has a certain rigidity so as to suppress the extension of the main body 10 when the container 1 is opened. For example, the first base material 41 includes a stretched film that is at least uniaxially stretched, preferably biaxially stretched. As a material for forming a stretched film, polyamides such as nylon (ONy), or polyesters such as polyethylene terephthalate (PET) can be used, for example. The stretched film contained in the first base material 41 is preferably stretched along the first direction D1. For example, an angle formed by the stretching direction of the stretched film included in the first base material 41 and the first direction D1 is preferably 45 degrees or less, more preferably 30 degrees or less, and further preferably 20 degrees or less.

The thickness of the stretched film of the first base material 41 is appropriately set according to the material to be used. For example, when nylon is used as a material for forming the stretched film of the first base material 41, the thickness of the stretched film of the first base material 41 is 9 μm or more and 50 μm or less, preferably 12 μm or more and 25 μm or less. The stretched film refers to a film having a tensile elongation of less than 300%, preferably 200% or more when measured in accordance with JIS K 7127. Table 2 shows specific examples of the nylon film constituting the first base material 41 together with the thickness and characteristics of each film. Further, Table 3 shows an example of a PET film constituting the first base material 41.

TABLE 2

| Manufacturer | | Kohjin Co., Ltd. | Unitika Ltd. | Toyobo Co., Ltd. |
|---|---|---|---|---|
| Product name | | Bonyl | Emblem | Harden film |
| Model number | | RX | ON | N1100 |
| Thickness (μm) | | 15, 25 | 15, 25 | 15 |
| Tensile modulus of elasticity (MPa) | MD | 2600 | 2500 | 1470 |
| | TD | 2100 | 2300 | 980 |
| Tensile strength (MPa) | MD | 250 | 240 | 206 |
| | TD | 290 | 270 | 290 |
| Tensile elongation (%) | MD | 120 | 100 | 105 |
| | TD | 110 | 100 | 65 |

TABLE 3

| Manufacturer | | Toyobo Co., Ltd. |
|---|---|---|
| Product name | | Ester film |
| Model number | | E5100 |
| Thickness (μm) | | 12, 16, 25 |
| Tensile modulus of elasticity (MPa) | MD | 3920 |
| | TD | 4020 |
| Tensile strength (MPa) | MD | 230 |
| | TD | 240 |
| Tensile elongation (%) | MD | 100 |
| | TD | 90 |

The print layer 44 of the bottom member 40 is a layer printed on the first base material 41 in order to show product information or provide aesthetic characteristics to the main body 10. The print layer 44 expresses characters, numbers, symbols, graphics, patterns, and the like. As a material for forming the print layer 44, ink for gravure printing and ink for flexographic printing can be used.

The ink constituting the print layer 44 contains a binder and a pigment. The binder includes, for example, polyurethane and the like. Polyurethane is a hardened material produced by the reaction of a polyol as a main agent and an isocyanate compound as a curing agent.

The thermoplastic resin layer 42 is a layer that is melted to constitute a seal portion such as the outer edge seal portion 18. As a material for forming the thermoplastic resin layer 42, one kind or two or more kinds of resins selected from polyethylene such as low-density polyethylene and linear low-density polyethylene, and polypropylene can be used. The thermoplastic resin layer 42 can be a non-stretched film. The non-stretched film refers to a film having a tensile elongation of 300% or more, preferably 400% or more when measured in accordance with JIS K 7127. The thermoplastic resin layer 42 may be a single layer or multiple layers. The thermoplastic resin layer 42 preferably includes an non-stretched film. The thickness of the thermoplastic resin layer 42 is, for example, 30 μm or more and 100 μm or less.

An adhesive resin layer or an adhesive layer containing an adhesive may be provided between the first base material 41 provided with the print layer 44 and the thermoplastic resin layer 42. As the adhesive resin layer, one kind or two or more combined kinds of resins selected from low-density polyethylene, medium-density polyethylene, high-density polyethylene, linear low-density polyethylene, polyethylene such as a copolymer with ethylene-α-olefin polymerized using a metallocene catalyst, ethylene-vinyl acetate copolymers, ethylene-acrylic acid copolymers, ethylene-ethyl acrylate copolymers, ethylene-methacrylic acid copolymers, ethylene-methyl methacrylate copolymers, ethylene-maleic acid copolymers, saturated carboxylic acid copolymers, and ionomer resins can be used. The adhesive is produced from an adhesive composition prepared by mixing a first composition containing a main agent and a solvent and a second composition containing a curing agent and a solvent. Specifically, the adhesive includes a hardened material produced by the reaction of the main agent and the solvent in the adhesive composition. Examples of the main agent include polyol, and examples of the curing agent include isocyanate compounds. Examples of the adhesive may include ether-based two-component reactive adhesives and ester-based two-component reactive adhesives. Examples of ether-based two-component reactive adhesives include polyether polyurethanes. The polyether polyurethane is a hardened material produced by the reaction of a polyether polyol as a main agent and an isocyanate compound as a curing agent. Examples of the ester-based two-component reactive adhesive include polyester polyurethane and polyester. The polyester polyurethane is a hardened material produced by the reaction of a polyester polyol as a main agent and an isocyanate compound as a curing agent. Moreover, acryl polyol may be used as a main agent.

First Modification Example of the Bottom Member

Figure 43:
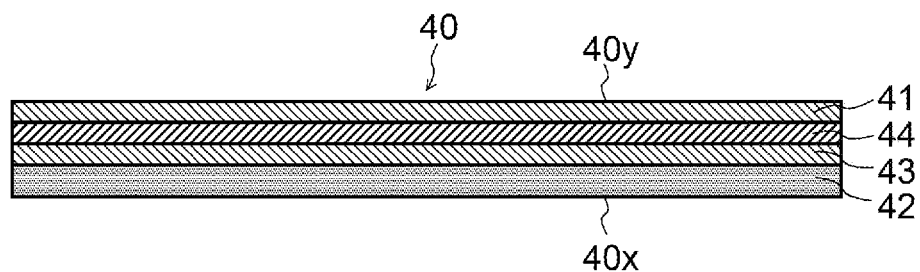
FIG. 43 is a cross-sectional view of another example of a layered structure of a laminated body constituting the main body and the lid.

As illustrated in FIG. 43, the bottom member 40 may further include a second base material 43 positioned between the first base material 41 and the thermoplastic resin layer 42. In the example illustrated in FIG. 43, the second base material 43 is located between the print layer 44 provided on the first base material 41 and the thermoplastic resin layer 42.

The second base material 43, like the first base material 41, preferably includes a stretched film that is at least uniaxially stretched, preferably biaxially stretched. As a material for forming a stretched film, the material similar to the first base material 41 can be used. Similar to the stretched film of the first base material 41, the stretched film included in the second base material 43 is also preferably stretched along the first direction D1. For example, an angle formed by the stretching direction of the stretched film included in the second base material 43 and the first direction D1 is preferably 45 degrees or less, more preferably 30 degrees or less, and further preferably 20 degrees or less.

In the example illustrated in FIG. 43, polyethylene terephthalate can be used as a material constituting the stretched film of the first base material 41. In this case, the thickness of the stretched film of the first base material 41 is, for example, 9 µm or more and 50 µm or less, preferably 12 µm or more and 25 µm or less. The specific example of the PET film constituting the first base material 41 is the same as the above-mentioned example illustrated in FIG. 42 and Table 3.

Between the first base material 41 and the second base material 43 provided with the print layer 44 and between the second base material 43 and the thermoplastic resin layer 42, the above-mentioned adhesive resin layer or an adhesive layer containing an adhesive may be provided.

Second Modification Example of the Bottom Member

Figure 44:
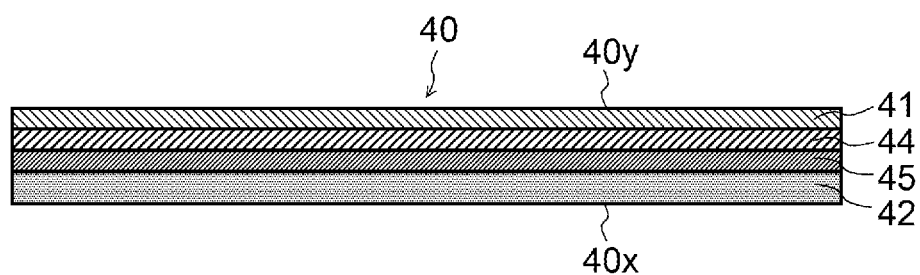
FIG. 44 is a cross-sectional view of another example of a layered structure of a laminated body constituting the main body and the lid.

As illustrated in FIG. 44, the bottom member 40 may further include an intermediate layer 45 positioned between the first base material 41 and the thermoplastic resin layer 42. In the example illustrated in FIG. 44, the intermediate layer 45 is located between the print layer 44 provided on the first base material 41 and the thermoplastic resin layer 42.

The intermediate layer 45 includes, for example, a gas barrier layer. As the gas barrier layer, for example, a steam-deposited layer of a metal oxide such as aluminum oxide or an inorganic oxide such as silicon oxide can be provided. In addition, as the gas barrier layer, a resin layer having a high gas barrier property such as ethylene-vinyl alcohol copolymer (EVOH), polyvinylidene chloride resin (PVDC), or aliphatic polyamide such as nylon MXD 6 may be provided. This can suppress the infiltration of oxygen and steam into the interior of the container 1. The thickness of the intermediate layer 45 is, for example, 12 µm or more and 25 µm or less.

(Lid Member)

The lid member (second laminated body) 50 has the same layer configuration as the bottom member 40. The lid member 50 includes at least the first base material and a thermoplastic resin layer. As in the case of the bottom member 40 illustrated in FIG. 42, the lid member 50 may include a first base material that constitutes the outer surface, a thermoplastic resin layer that constitutes the inner surface, and a print layer provided on the first base material. In addition, as in the case of the bottom member 40 illustrated in FIG. 43, the lid member 50 may further include a second base material located between the first base material and the thermoplastic resin layer. Further, as in the case of the bottom member 40 illustrated in FIG. 44, the lid member 50 may further include an intermediate layer positioned between the first base material and the thermoplastic resin layer. The layer configuration of the bottom member 40 and the layer configuration of the lid member 50 may be the same or different.

The configuration of the first base material, the print layer, the thermoplastic resin layer, and the second base material of the lid member 50 is the same as the configuration of the first base material 41, the print layer 44, the thermoplastic resin layer 42, and the second base material 43 of the bottom member 40. For example, the first base material of the lid member 50 may also include a stretched film that has been at least uniaxially stretched, similarly to the first base material 41 of the bottom member. This suppresses the extension of the lid 20 when the container 1 is opened.

(Tensile Strength)

As described above, in the present embodiment, the degree of forming the body part 11 by forming the bottom member 40 is relatively small. Therefore, for the bottom member 40, a component having comparatively high tensile strength and unlikely to stretch can be used. For example, the tensile strength of the bottom member 40 is 40 MPa or more, preferably 50 MPa or more, and more preferably 60 MPa or more.

Hereinafter, a method for measuring the tensile strength of the bottom member 40 will be described with reference to FIGS. 45 and 46. As a measuring instrument, for example, a universal material testing machine, Tensilon RTC-1310 manufactured by A & D Company, Limited can be used.

Figure 45:
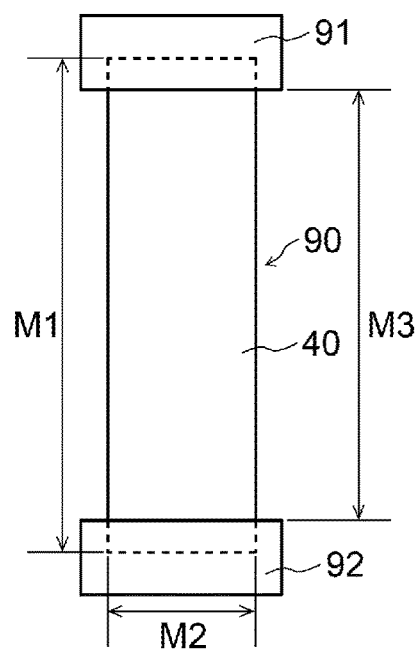
FIG. 45 is a diagram for describing a method for measuring tensile strength.
Figure 46:
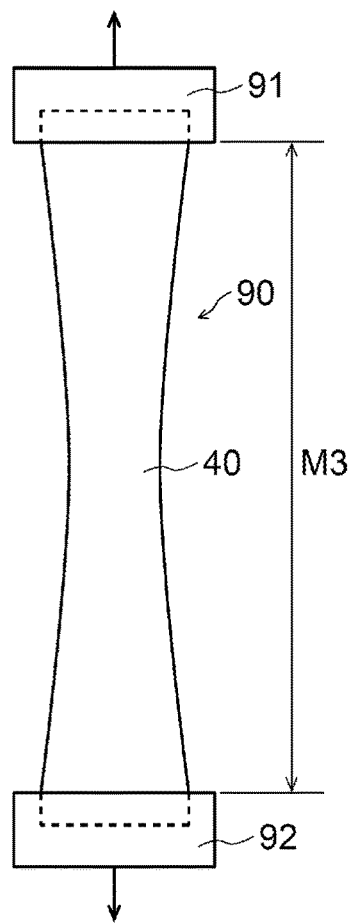
FIG. 46 is a diagram for describing the method for measuring tensile strength.

First, as illustrated in FIG. 45, a test piece 90 including the bottom member 40 is prepared. The test piece 90 is obtained, for example, by cutting out a portion of the main body 10 constituted by the bottom member 40. In FIG. 40, a dashed-dotted line frame with a reference sign XXXXV shows an example of a portion of the bottom portion 11a of the body part 11 of the main body 10 that is cut out to create the test piece 90.

As illustrated in FIG. 45, the test piece 90 has a rectangular shape including a long side of a length M1 and a short side of a length M2. As illustrated in FIG. 40, the test piece 90 is cut out from the main body 10 such that the direction of the long side of the test piece 90 matches the first direction D1.

After preparing the test piece 90, as illustrated in FIG. 45, both end of the test piece 90 along the long side are held by a first holding tool 91 and a second holding tool 92. A distance M3 between the first holding tool 91 and the second holding tool 92 is 50 mm. In addition, a length M2 of the short side of the test piece 90 is 10 mm. A length M1 of the long side is determined such that the predetermined distance M3 can be secured. For example, the length M1 of the long side is 100 mm or more.

Subsequently, the second holding tool 92 is displaced relative to the first holding tool 91 along the direction of the long side of the test piece 90 so that the distance M3 gradually increases. The speed at which the second holding tool 92 is displaced relative to the first holding tool 91 is 200 mm/min. Thereafter, when the distance M3 becomes 90 mm, the load acting on the second holding tool 92 is measured. Further, the measured load is divided by the cross-sectional area of the test piece 90 before being pulled by the first holding tool 91 and the second holding tool 92, and the calculated value is taken as the tensile strength [MPa] of the test piece 90. In the present embodiment, since the degree of draw forming of the bottom member 40 is small, the main body 10 can be produced using the bottom member 40 having high tensile strength. Moreover, it is possible to suppress the distortion of the display portion 10s provided in advance in the bottom member 40 by the print layer 44.

(Tear Property)

Next, the tear property of the bottom member 40 and the lid member 50 will be described. Herein, tear strength is used as an index of tear property. Hereinafter, a method for measuring the tear strength will be described with reference to FIGS. 47 and 48. As a measuring instrument, for example, a universal material testing machine, Tensilon RTC-1310 manufactured by A & D Company, Limited can be used.

Figure 47:
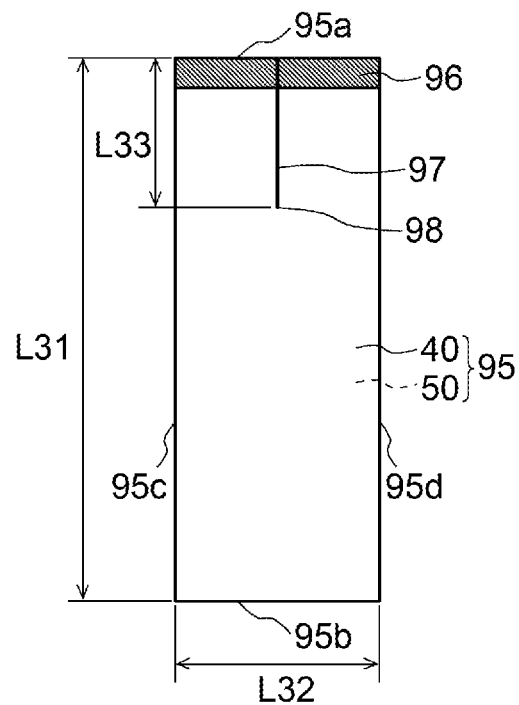
FIG. 47 is a diagram for describing a method for measuring tear strength.

First, as illustrated in FIG. 47, a test piece 95 including the bottom member 40 and the lid member 50 stacked on one another is prepared. The test piece 95 is obtained, for example, by cutting out a portion of the main body 10 constituted by the bottom member 40 and a portion of the lid 20 constituted by the lid member 50. In FIG. 40, a dashed-dotted line frame with a reference sign XXXXVII shows an example of a portion of the main body 10 and a portion of the lid 20 that are cut out to create the test piece 95. In the example illustrated in FIG. 40, the test piece 95 includes a portion in which the bottom member 40 and the lid member 50 are joined by a seal portion such as the outer edge seal portion 18. The seal portion such as the outer edge seal portion 18 in the completed state of the container 1 constitutes a seal portion 96 of the test piece 95 illustrated in FIG. 47. Moreover, in the example illustrated in FIG. 40, the test piece 95 includes both a portion of the bottom member 40 constituting the body part 11 of the main body 10 and a portion of the bottom member 40 constituting the flange part 12 of the main body 10. Although not illustrated, the test piece 95 may mainly include the portion of the bottom member 40 that constitutes the flange part 12 of the main body 10, and may not include at all or hardly the portion of the bottom member 40 that constitutes the body part 11 of the main body 10.

As illustrated in FIG. 47, the test piece 95 has a rectangular shape including a long side of a length L31 and a short side of a length L32. In FIG. 47, reference signs 95a and 95b denote ends along the long side (hereinafter, also referred to as first end and second end). The seal portion 96 extends along the first end 95a. Further, reference signs 95c and 95d denote ends along the short side (hereinafter, also referred to as third end and fourth end). As illustrated in FIG. 40, the test piece 95 is cut out from the container 1 such that the direction of the long side of the test piece 95 matches the first direction D1.

After preparing the test piece 60, as illustrated in FIG. 47, an incision 97 extending over a distance L33 along the long side is formed at a midpoint of the first end 95a along the short side. The incision 97 is formed such that an end point thereof reaches a portion where the bottom member 40 and the lid member 50 are not joined.

Figure 48:
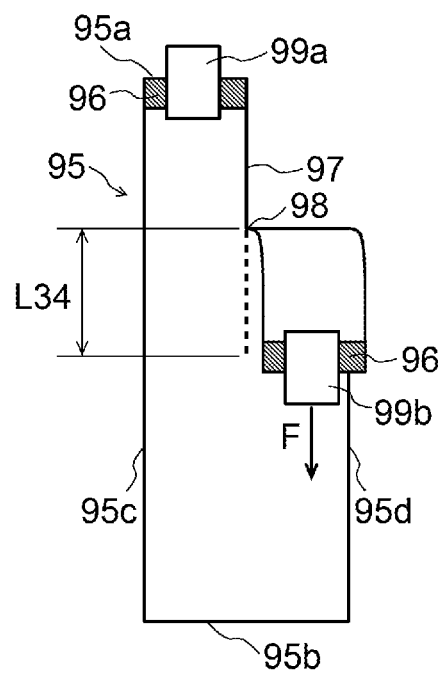
FIG. 48 is a diagram for describing the method for measuring tear strength.

Subsequently, as illustrated in FIG. 48, a portion of the first end 95a closer to the third end 95c than the incision 97 is held by a first holding tool 99a. Moreover, a portion of the first end 95a closer to the fourth end 95d is held by a second holding tool 99b. Thereafter, the second holding tool 99b is displaced toward the second end 95b along the long side of the test piece 95. Accordingly, the test piece 95 is torn along the long side starting from the end point 98 of the incision 97. The speed at which the second holding tool 99b is displaced relative to the first holding tool 99a is 200 mm/min. At that time, force [N] required to displace the second holding tool 99b is measured.

The displacement of the second holding tool 99b is continued over a distance L34 along the long side. The maximum value of the force [N] required to displace the second holding tool 99b over the distance L34 is taken as the tear strength [N] of the test piece 95. The tear strength of the test piece 95 reflects the tear property of the bottom member 40 constituting the main body 10 and the tear property of the lid member 50 constituting the lid 20.

The distance L33 of the incision 97 is 30 mm, for example. The length L2 of the short side is 25 mm. The distance L34 by which the test piece 95 is torn in measurement is 50 mm. The length L31 of the long side is determined such that the predetermined distance L33 and distance L34 can be secured. For example, the length L31 of the long side is 100 mm or more.

When it is difficult to sufficiently secure the length L31 of the long side of the test piece 95, the distance L33 of the incision 97 may be made smaller than 30 mm. In addition, a member such as a tape may be provided at the first end 95a to facilitate holding of the first end 95a by the first holding tool 99a and the second holding tool 99b. In addition, the seal portion 96 may not be present at the first end 95a.

The tear strength [N] of the test piece 95 including a portion of the main body 10 and a portion of the lid 20 according to the present embodiment is at least 15N or less, more preferably 10N or less. As a result, the main body 10 constituted by the bottom member 40 and the lid 20 constituted by the lid member 50 can be easily broken by tearing. This allows the container 1 to be opened by tearing.

(Joint Strength)

As mentioned above, the container 1 according to the present embodiment is formed in such a manner as to be capable of being opened by tearing the main body 10 and the lid 20 using the opening means 17. For this reason, easy-peeling property is not required for the bottom member 40 and the lid member 50.

Figure 49:
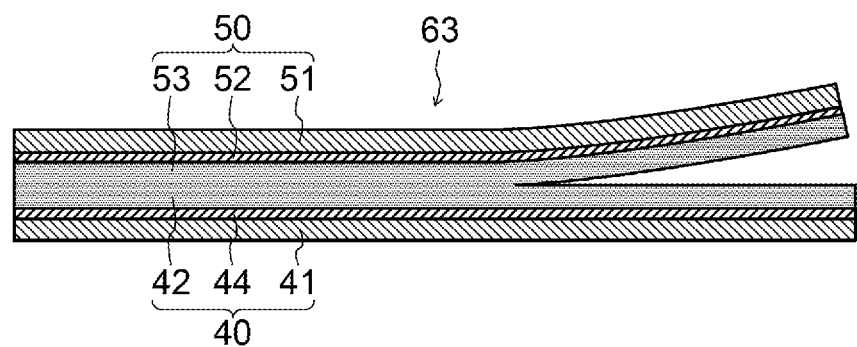
FIG. 49 is a diagram for describing a method for measuring joint strength.
Figure 50:
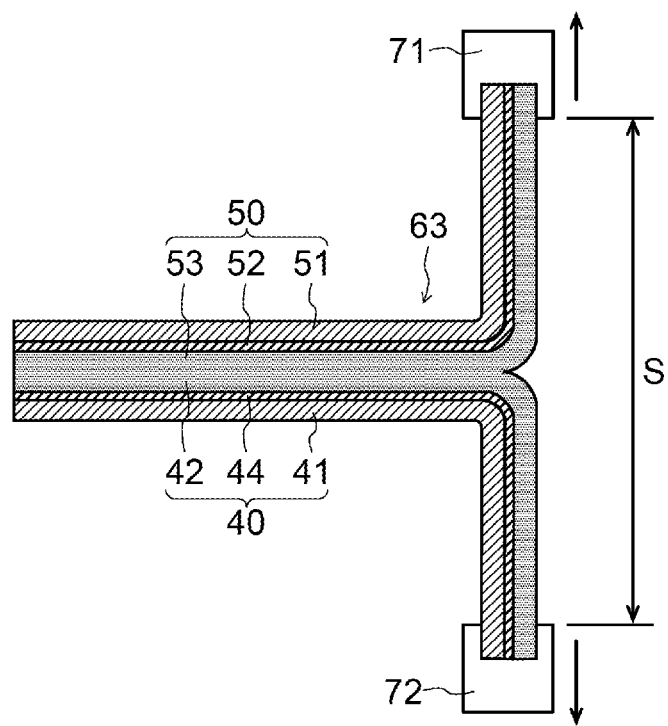
FIG. 50 is a diagram for describing the method for measuring joint strength.

Hereinafter, a method for measuring the joint strength in the present embodiment will be described. As a measuring instrument, the thermostat-equipped tensile tester RTC-1310A manufactured by Orientec Corporation can be used. Specifically, first, the bottom member 40 and the lid member 50 were joined to each other to produce a rectangular test piece 63. The test piece 63 has a width (short side) of 15 mm. Further, in the test piece 63, as illustrated in FIG. 49, the bottom member 40 and the lid member 50 are separated 15 mm from one tip along the long side. Thereafter, as illustrated in FIG. 50, the portions of the bottom member 40 and the lid member 50 which have already been separated are respectively held by the first holding tool 71 and the second holding tool 72 of the measuring instrument. In addition, the holding tools 71 and 72 are respectively pulled at a speed of 300 mm/min in directions opposite to each other and orthogonal to the surface of the portion where the bottom member 40 and the lid member 50 are still joined. Then, as in the first embodiment illustrated in FIG. 13, the maximum value of the tensile stress is measured.

The maximum values of the tensile stress of the five test pieces 63 are measured, and the average value is taken as the joint strength between the bottom member 40 and the lid member 50. The spacing K between the holding tools 71 and 72 at the start of pulling is 20 mm, and the spacing K between the holding tools 71 and 72 at the end of pulling is 40 mm. In the environment at the time of measurement, the temperature is 25° C. and the relative humidity is 50%.

The joint strength at a width of 15 mm of the test piece 63 in which the bottom member 40 and the lid member 50 according to the present embodiment are joined may be 23N or more, for example, or 40N or more. Accordingly, when the internal pressure is raised by cooking in a microwave oven, the separation of the outer edge seal portion 18 of the flange part 12 (recession of the seal to the outer edge of the flange part 12) is unlikely to occur as compared to the case where the thermoplastic resin layer 42 of the bottom member 40 and the lid member 50 is formed to have an easy peeling property, which makes it possible to reliably remove the steam through a predetermined steam passing port such as the through hole 31. In addition, the cost of the thermoplastic resin layer 42 can be reduced. The joint strength may be less than 23N.

Method for Manufacturing the Container

Next, a method for manufacturing the container 1 using the above-described bottom member 40 and lid member 50 will be described.

Figure 51:
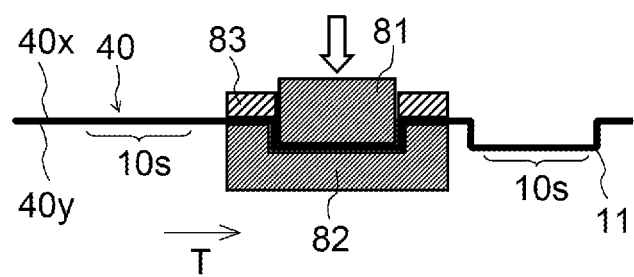
FIG. 51 is a diagram illustrating the manufacturing process of the container.

First, the bottom member 40 is prepared and transported in the transport direction T. As illustrated in FIG. 51, on the bottom member 40, the display portion 10s visually recognized when the bottom member 40 is viewed from the outer surface 40y is formed in advance by the above-described print layer 44.

Subsequently, as illustrated in FIG. 51, the bottom member 40 is subjected to draw forming. For example, the male mold 81 is disposed on the inner surface 40x, and the female mold 82 is disposed on the outer surface 40y. Then, the male mold 81 is relatively moved toward the female mold 82, and the bottom member 40 is pushed into the recess of the female mold 82. As a result, as illustrated in FIG. 51, the body part 11 can be formed in the bottom member 40. At this time, a pressing plate 83 may be used to fix the bottom member 40 in order to suppress those portions of the bottom member 40 other than the body part 11 from being stretched. In the step of subjecting the bottom member 40 to draw forming, as in the first embodiment illustrated in FIG. 15, the space on the side where the female mold 82 is located, that is, the space on the outer surface 40y side of the bottom member 40 may be in a vacuum state under a pressure lower than atmospheric pressure.

In the present embodiment, the draw forming is performed at a temperature of the bottom member 40 of lower than 120° C., preferably 60° C. or higher and 100° C. or lower, or at normal temperature, which is lower than the melting point of the thermoplastic resin layer 42 of the bottom member 40, for example, and is lower than the glass transition temperature of the first base material 41. Here, in the present embodiment, as described above, the depth of the body part 11 is relatively small, and hence the degree of extension of the bottom member 40 at the time of draw forming is also small. Therefore, even if the temperature is lower than the melting point of the thermoplastic resin layer 42 or the glass transition temperature of the first base material 41, desired draw forming can be performed on the bottom member 40. In addition, since the degree of extension of the bottom member 40 is small, it is possible to suppress distortion of the display portion 10s provided on the bottom member 40.

The adjustment of the pressure described above and the adjustment of the temperature of the bottom member 40 may be both performed. For example, in a state where the bottom member 40 is heated to 60° C. or more and 100° C. or less, for example, about 80° C., and the atmosphere of the space on the female mold 82 side or the atmosphere of the space on the male mold 81 side is evacuated, the bottom member 40 may be brought into close contact with the female mold 82 or the male mold 81. In this case, the bottom member 40 can be formed with only the female mold 82 or the male mold 81. Alternatively, the atmosphere of the space on the opposite side to the female mold 82 in the bottom member 40 may be placed in a compressed air state, and the bottom member 40 may be brought into close contact with the female mold 82. Also in this case, the bottom member 40 can be formed with only the female mold 82.

Specific examples of a combination of mold, temperature, and pressure to be used in draw forming of the bottom member 40 will be described below.

Example 1

Type: the male mold 81 and the female mold 82

Temperature of the bottom member 40: 20° C. or more and 100° C. or less

Pressure in the space on the male mold 81 side: atmospheric pressure or more and 5 atm or less Pressure in the space on the female mold 82 side: 0.05 atm or more and 0.3 atm or less Example 2

Type: the female mold 82

Temperature of the bottom member 40: 60° C. or more and 100° C. or less

Pressure in the space on the female mold 82 side: 0.05 atm or more and 0.3 atm or less Pressure in the space opposite to the female mold 82 across the bottom member 40: atmospheric pressure or higher and 5 atm or lower Example 3

Type: the female mold 82

Temperature of the bottom member 40: 60° C. or more and 100° C. or less

Pressure in the space on the female mold 82 side: atmospheric pressure

Pressure on the side opposite to the female mold 82 across the bottom member 40: 1.5 atm or more and 5 atm or less

Example 4

Type: the male mold 81
Temperature of the bottom member 40: 60° C. or more and 100° C. or less
Pressure in the space on the male mold 81 side: 0.05 atm or more and 0.3 atm or less
Pressure on the side opposite to the male mold 81 across the bottom member 40: atmospheric pressure or more and 5 atm or less Subsequently, as in the case of the first embodiment illustrated in FIG. 16, the body part 11 is filled with contents 5. In this case, since the body part 11 is in the open state over the entire area, the contents 5 can be easily charged into the body part 11.

Subsequently, as in the case of the first embodiment illustrated in FIG. 16, the lid member 50 is placed on the bottom member 40, and the body part 11 filled with the contents 5 is covered with the lid member 50. Subsequently, the lid member 50 is joined to the flange part 12 extending outward from the top of the body part 11 of the bottom member 40 using a bonding device 85 to form the outer edge seal portion 18.

Subsequently, as in the case of the first embodiment illustrated in FIG. 17, the bottom member 40 and the lid member 50 are cut at the outer edge seal portion 18. In this manner, the container 1 can be obtained, including the main body 10 with the body part 11 and the flange part 12 and the lid 20 joined to the flange part 12 and having the contents 5 contained therein.

Method for Using the Container

Figure 52:
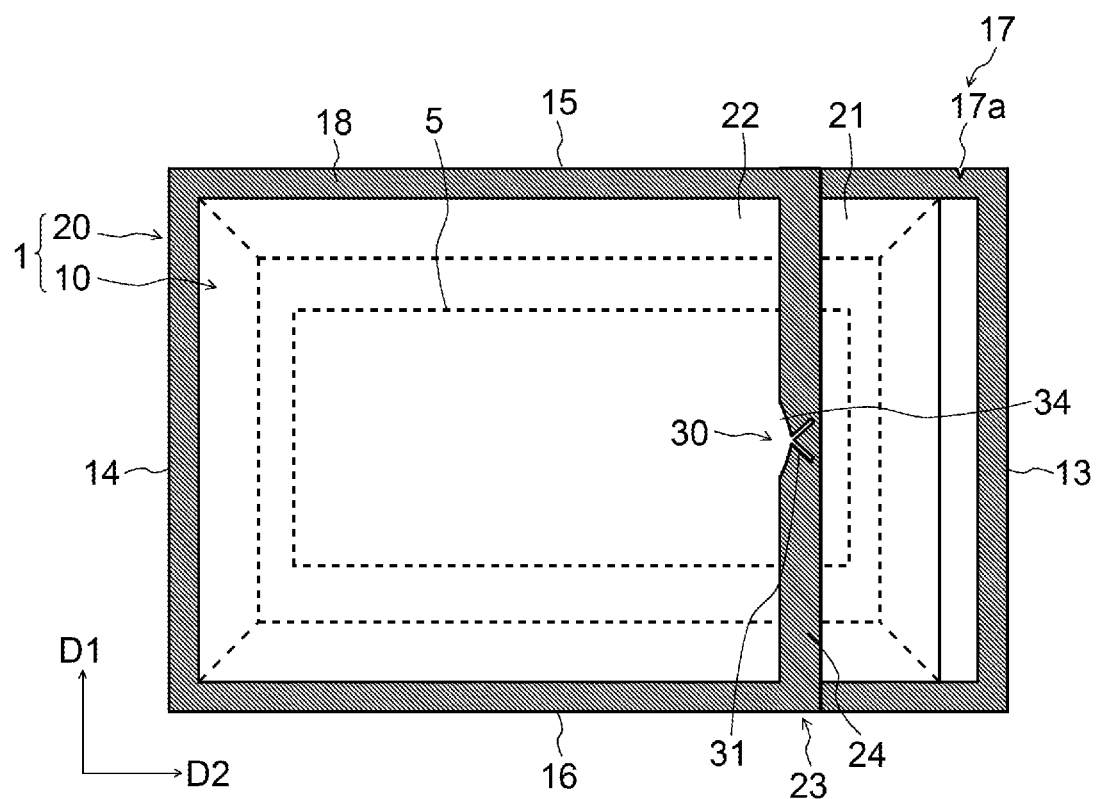
FIG. 52 is a diagram illustrating a state in which a containing portion of the container communicates with the outside.
Figure 53:
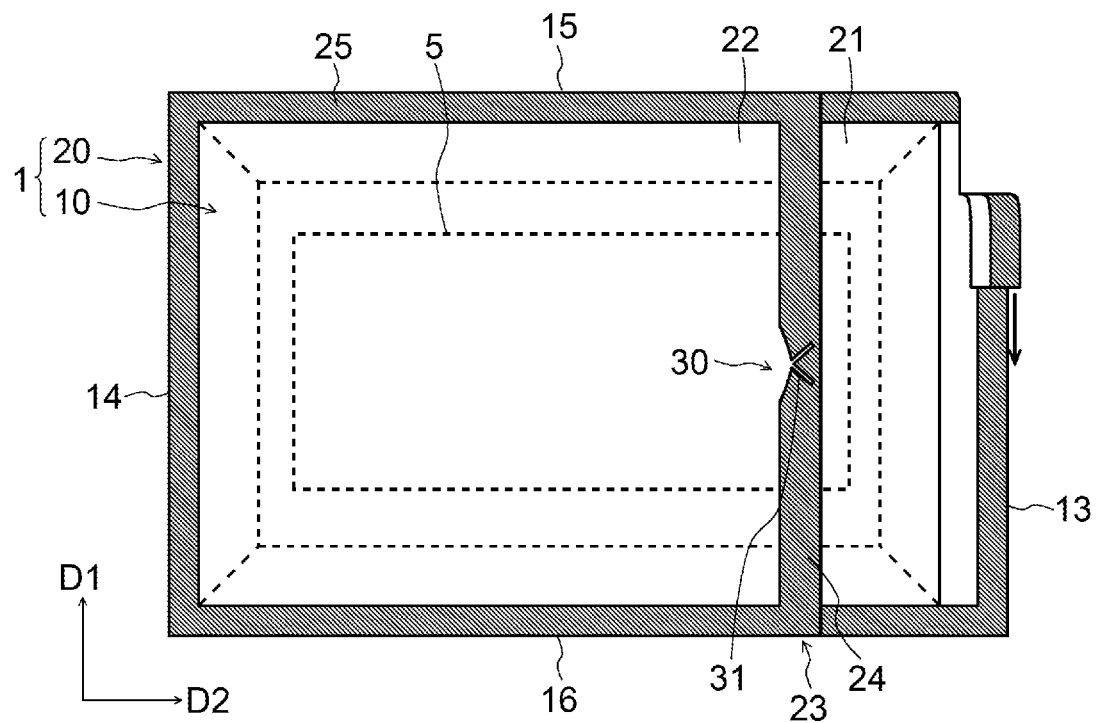
FIG. 53 is a diagram illustrating tearing of the container.

Then, the method for using the container 1 will be described with reference to FIGS. 52 and 53.

First, the container 1 is heated in a microwave oven or the like. Accordingly, the water in the contents 5 and the containing portion 101 evaporates to increase the pressure of the containing portion 101. As a result, as illustrated in FIG. 52, a portion of the pleat seal portion 24 in proximity to the center of the containing portion 101 is peeled off to form a peeled portion 34 in the vicinity of the through hole 31. When the peeling of the pleat seal portion 24 progresses and the peeled portion 34 reaches the through hole 31, the steam in the containing portion 101 passes through the through hole 31 to the outside.

After heating the container 1, the user tears the container 1 using the opening means 17. Specifically, the user first holds the main body 10 and the lid 20 on the left and right of the notch 17a with the left and right hands, respectively. Subsequently, the user pulls the main body 10 and the lid 20 on the right side of the notch 17a forward with the right hand. Here, in the present embodiment, the bottom member 40 and the lid member 50 are configured such that the tear strengths of the main body 10 and the lid 20 are 15N or less. For this reason, as illustrated in FIG. 53, the tearing of the main body 10 and the lid 20 can be advanced starting from the notch 17a along the first edge portion 13 in the first direction D1.

Effects of the Present Embodiment

As described above, in the manufacturing process of the container 1, the contents 5 are filled into the bottom member 40 in which the body part 11 is formed, and thereafter, the body part 11 is covered with the lid member 50. For this reason, the contents 5 can be easily filled as compared with pouch type containers. That is, the container 1 according to the present embodiment has filling suitability.

Moreover, as mentioned above, the base material of the bottom member 40 that constitutes the main body 10 of the container 1 according to the embodiment contains a stretched film. In the case of providing the print layer 44 on the long stretched film while conveying the stretched film, the stretched film is less likely to be stretched and shrunk at the time of conveyance as compared with a non-stretched film, and thus the print layer 44 can be provided with high positional accuracy. For this reason, the container can be provided with the main body excellent in the printability of the display portion.

Further, as described above, the degree of draw forming of the main body 10 of the container 1 according to the present embodiment is relatively small. Accordingly, as the bottom member 40 constituting the main body 10, a laminated body having a tear property, such as a laminated body containing a stretched film, can be used. This imparts a tear property to the container 1. Moreover, it is possible to suppress the distortion of the display portion 10s provided in advance in the bottom member 40.

Note that various modifications can be made to the third embodiment described above. Hereinafter, modifications will be described with reference to the drawings as needed. In the following description and the drawings used in the following description, components that can be configured in the same manner as the components in the third embodiment will be given the same reference signs as the reference signs used for the corresponding components in the third embodiment, and duplicate description will be omitted. In addition, in the case where it is obvious that the effects and advantages obtained in the third embodiment can be obtained also in the modification example, the description thereof may be omitted.

First Modification of the Container

Figure 54:
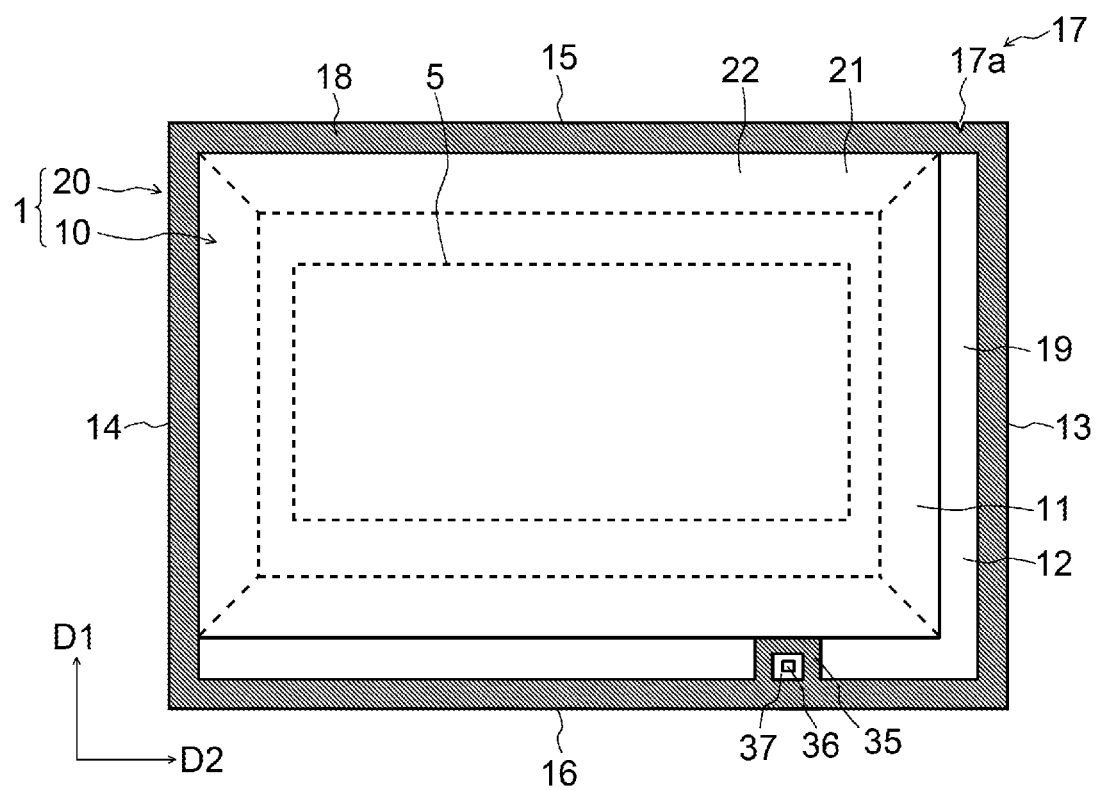
FIG. 54 is a plan view of a modification example of the container.

In the third embodiment, the steam passing portion 30 contains the through hole 31 formed in the pleat seal portion 24 as an example. However, the steam passing portion 30 can be arbitrarily configured as long as the containing portion 101 can be communicated with the outside of the container 1 when the pressure in the containing portion 101 increases. For example, as illustrated in FIG. 54, the steam passing portion 30 may include a protruding seal portion 35 that protrudes inward from the outer edge seal portion 18, a non-seal portion 37 adjacent to the protruding seal portion 35, and a through hole 36 formed in the lid 20 at the non-seal portion 37. An incision may be provided instead of the through hole 36.

Second Modification of the Container

Figure 55:
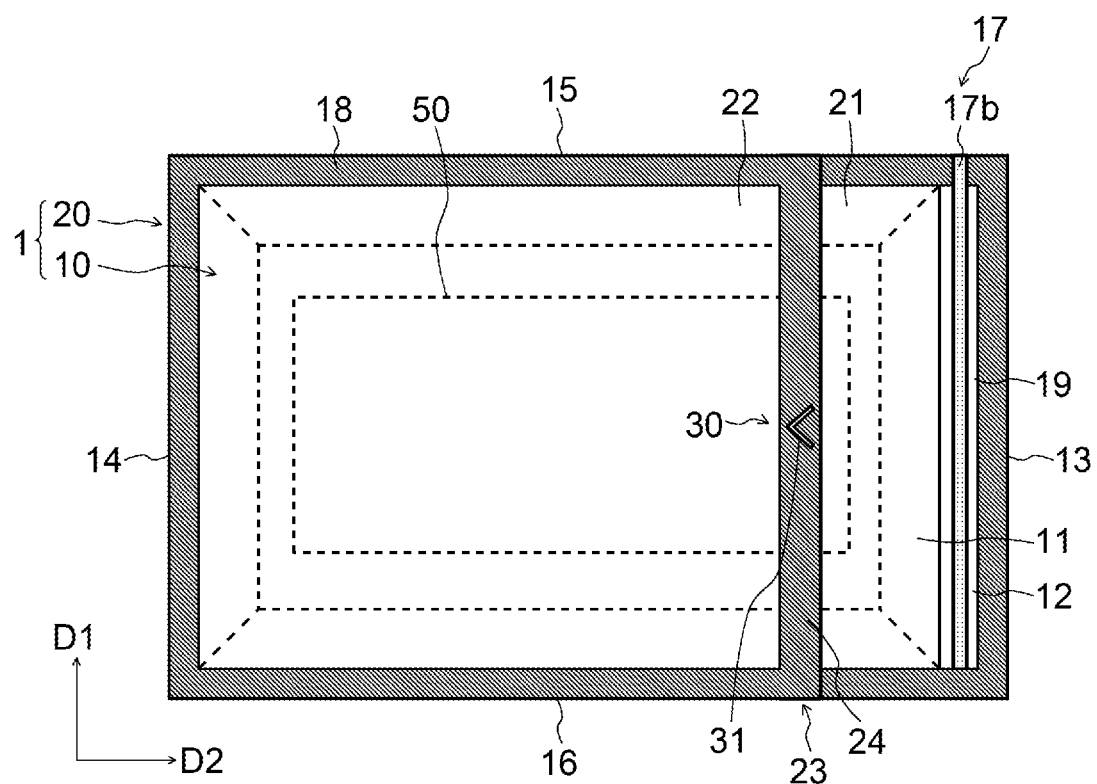
FIG. 55 is a plan view of a modification example of the container.

Moreover, in the third embodiment, the opening means 17 contains the notch 17a formed in the edge portion such as the third edge portion 15 of the flange part 12 as an example. However, the opening means 17 can be arbitrarily configured as long as the opening means 17 can enhance the tear property of the main body 10 and the lid 20. For example, as illustrated in FIG. 55, the opening means 17 is an area including a scar group 17b formed to extend along the first direction D1 from the third edge portion 15 to the fourth edge portion 16. The scar group includes, for example, a plurality of through holes formed to penetrate the first base material 41 of the bottom member 40 constituting the flange part 12 of the main body 10 but not to penetrate the thermoplastic resin layer 42. Further, the scar group includes, for example, a plurality of through holes formed to penetrate the first base material 41 of the lid member 50 constituting the lid 20 but not to penetrate the thermoplastic resin layer 42. In addition, the opening means 17 may be a region including a half cut line formed to extend along the first direction D1 from the third edge portion 15 to the fourth edge portion 16. In addition, the scar group may be formed to penetrate from the outer surface to the inner surface of the bottom member 40 or the lid member 50.

EXAMPLES

Next, the third embodiment will be more specifically described by examples. However, the third embodiment is not limited to the descriptions of the following examples unless the third embodiment deviates from the gist of the embodiment.

Example C1

As the bottom member 40 that constitutes the main body 10, a laminated body which is the same as the bottom member 40 illustrated in FIG. 43 except for the absence of the print layer 44 was prepared. As the first base material 41, biaxially stretched PET having a thickness of 12 µm was used. As the second base material 43, a stretched nylon (ONY) with a thickness of 15 µm was used. As the thermoplastic resin layer 42, a cast polypropylene (CPP) with a thickness of 70 µm was used. As an adhesive layer between the first base material 41 and the second base material 43 and between the second base material 43 and the thermoplastic resin layer 42, a hardened material of polyether polyol and an isocyanate compound was used. Moreover, as the cover material 50 that constitutes the lid 20, a laminated body which has the same layer configuration as the bottom member 40 was prepared. The thickness of the bottom member 40 and the lid member 50 was 101 µm.

The container 1 illustrated in FIG. 40 was produced using the bottom member 40 and the lid member 50. Further, the test piece 90 illustrated in FIG. 45 was cut out of the bottom portion 11a of the body part 11 of the main body 10 of the container 1. Subsequently, the tensile strengths of the three test pieces 90 were measured according to the methods illustrated in FIGS. 45 and 46. As a result, the tensile strengths were in the range of 40 MPa or more and 72 MPa or less.

Moreover, the test piece 95 illustrated in FIG. 47 was cut out of the container 1. Subsequently, the tear strengths of the three test pieces 95 were measured based on the methods illustrated in FIGS. 47 and 48. As a result, the tear strengths were in the range of 3N or more and 15N or less.

Comparative Example C1

As the bottom member 40 that constitutes the main body 10, a laminated body that is the same as the bottom member 40 illustrated in FIG. 44 except for the absence of the print layer 44 was prepared. As the first base material 41, a cast polypropylene (CPP) was used. As the intermediate layer 45, EVOH was used. As the thermoplastic resin layer 42, a cast polypropylene (CPP) was used. The thickness of the bottom member 40 was 150 µm. Further, as the lid member 50, a laminated body having the same layer configuration as the lid member 50 of example 1 was prepared.

The container 1 illustrated in FIG. 40 was produced using the bottom member 40 and the lid member 50. Moreover, as in the same manner as in example C1, a test piece was cut out of the bottom surface of the body part of the main body in the container 1, and the tensile strength of the test piece was measured. As a result, the tensile strength was in the range of 10 MPa or more and 20 MPa or less. Further, in the same manner as in example C1, a test piece in which a portion of the main body and a portion of the lid were overlapped was cut out of the container 1 and the tear strength of the test piece was measured. As a result, the bottom member 40 that constitutes a main body was extended, the test piece could not be torn, and the tear strength was not able to be measured.

Fourth Embodiment

Next, a fourth embodiment of the present invention will be described. First, problems to be solved by the fourth embodiment will be described.

In a deep drawn container as disclosed in JP 2006-232280 A, the laminated body is required to be easily stretched from the viewpoint of formability at the time of producing a body part having a large depth. On the other hand, the extendability of the laminated body and the tearability of the laminated body are in a trade-off relationship. The reason is that, when an attempt is made to tear the easily extendable laminated body, the force applied to the laminated body mainly acts as a force to extend the laminated body and hardly acts as a force to break the laminated body. Accordingly, as for deep drawn containers, it is difficult to adopt a method for tearing the container as a method for opening the container. Therefore, as a method for opening the container, there has been conventionally adopted a method for peeling the lid from the flange part. In this case, a layer for joining the lid to the flange part, for example, a thermoplastic resin layer is required to have the property of being easily peeled off by applying a force, so-called easy peeling property. However, the thermoplastic resin layer having an easy peel property is expensive, and the use of such a thermoplastic resin layer would increase the manufacturing cost of the container.

On the other hand, in a pouch-type container as disclosed in JP 2013-151317 A, the outer edges of two laminated bodies except for the upper edges are joined to each other to produce a pouch, and then the contents are filled into the pouch through the opening between the upper edges. Therefore, in the pouch-type container, the opening through which the contents to be filled passes is narrow with a low filling suitability, as compared to containers in which the body part is first filled with the contents and then is sealed with the lid such as deep drawn containers.

An object of the present embodiment is to provide a container that can effectively solve these issues and a method for manufacturing the same.

A container having a containing portion for containing contents according to the present embodiment of the present disclosure includes: a main body that has a body part defining the containing portion and a flange part extending outward from an upper portion of the body part, the main body being formed by a bottom member (first laminated body); a lid that is joined to the flange part of the main body via an outer edge seal portion so as to cover the containing portion, the lid being formed by a lid member (second laminated body); a steam passing portion that is configured to communicate the containing portion with outside of the container when pressure of the containing portion increases; and an opening means that is formed in the lid and the flange part. The tear strength of the main body and the lid is 15N or less.

A method for manufacturing a container according to the present embodiment including: a containing portion that contains contents and a steam passing portion that is configured to communicate the containing portion with outside when pressure of the containing portion increases, includes: a step of preparing a bottom member (first laminated body) for constituting a main body having a body part defining the containing portion and a flange part extending outward from an upper portion of the body part; a step of forming the body part by subjecting the bottom member to draw forming; a step of filling contents into the body part; a step of overlapping a lid member (second laminated body) for constituting a lid covering the containing portion on the bottom member; and a step of joining the lid member to the flange part extending outward from the upper portion of the body part of the bottom member. The opening means is formed in the flange part. Deep draw forming is performed with a temperature of the bottom member lower than a melting point of the thermoplastic resin layer of the bottom member.

According to the present embodiment, it is possible to provide a container having tear property and filling suitability.

Figure 56:
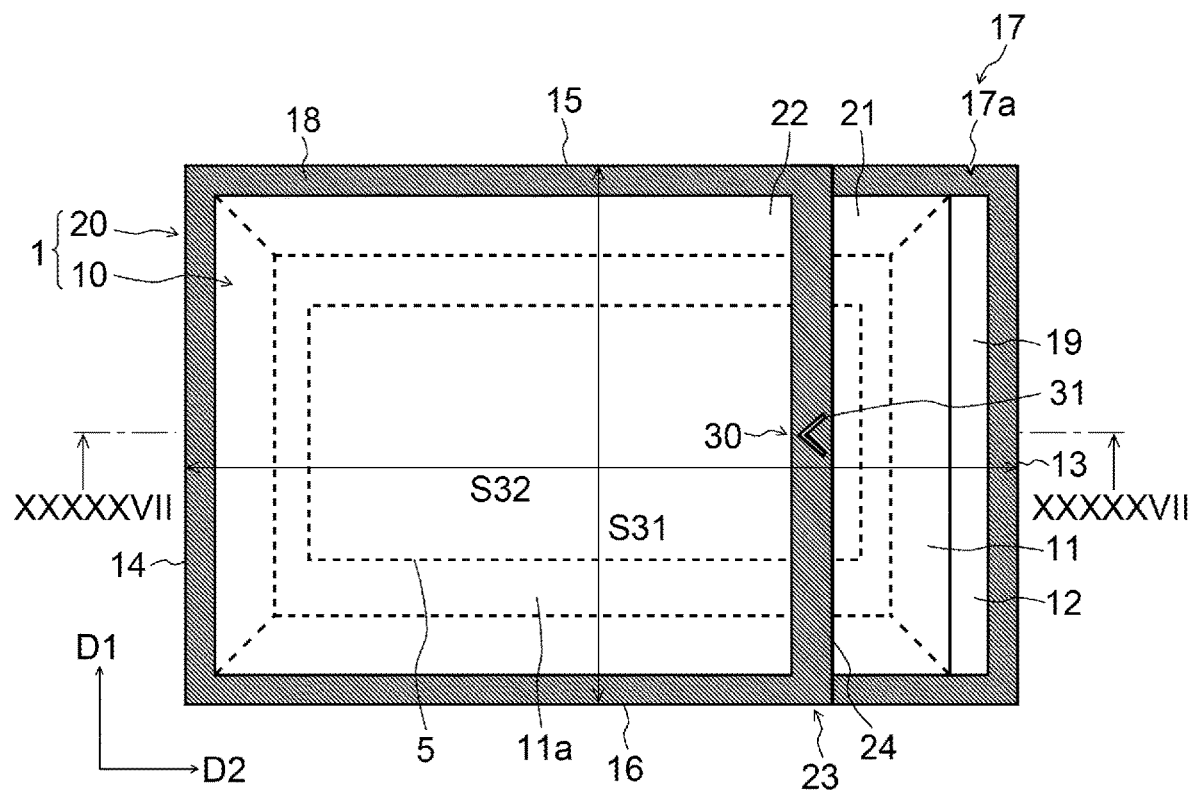
FIG. 56 is a plan view of a container in a fourth embodiment.

Hereinafter, a container 1 of the present embodiment will be specifically described. FIG. 56 is a plan view of the container 1 according to the present embodiment. The container 1 includes a main body 10, a lid 20, and a steam passing portion 30 as in the third embodiment. Moreover, the container 1 further includes an opening means 17 for making it easy to open the container 1 by tearing. In the fourth embodiment, the same components as those in the third embodiment may be assigned the same reference numerals and detailed explanations thereof may be omitted. In addition, in the case where it is obvious that the effects and advantages obtained in the third embodiment can be obtained also in the fourth embodiment, the description thereof may be omitted.

As in the case of the third embodiment, the opening means 17 is configured to facilitate tearing of the main body 10 and the lid 20 in the first direction D1 in which the first edge portion 13 extends. For example, the opening means 17 includes a notch 17a formed in the main body 10 and the lid 20 at a position in the third edge portion 15 close to the first edge portion 13. The notch 17a may be a cutout or incision. The user can tear the main body 10 and the lid 20 in the first direction D1 starting from the notch 17a.

Figure 57:
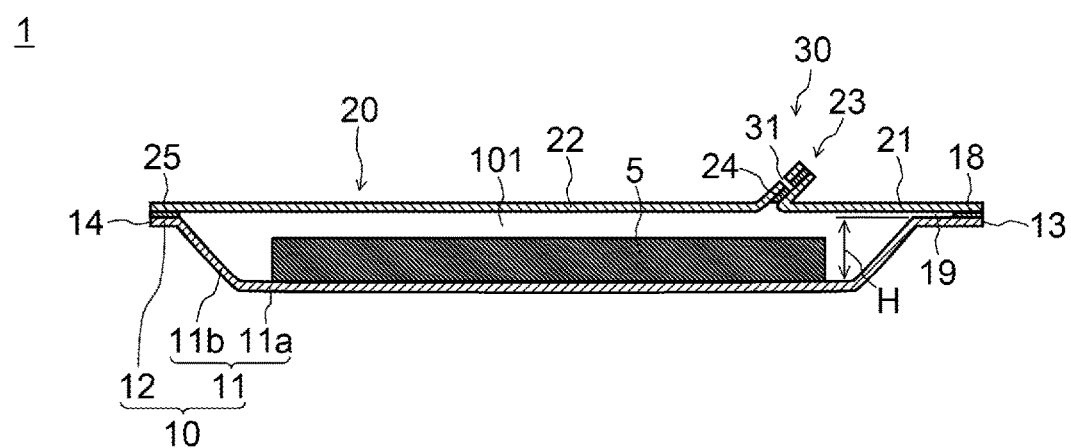
FIG. 57 is a cross-sectional view of the container illustrated in FIG. 56 as viewed along line XXXXXVII-XXXXXVII.

FIG. 57 is a cross-sectional view of the container 1 illustrated in FIG. 56 as viewed along line XXXXXVII-XXXXXVII. Unlike in the third embodiment, the main body 10 of the container 1 in the present embodiment may not include a display portion that is visually recognized when the main body 10 is viewed from the outer surface side of the bottom member (first laminated body) constituting the main body 10.

In the present embodiment, as in the third embodiment, the tear strength [N] of the test piece 95 including a portion of the main body 10 and a portion of the lid 20 is at least 15N or less, more preferably 10N or less. As a result, the main body 10 constituted by the bottom member 40 and the lid 20 constituted by the lid member 50 can be easily broken by tearing. This allows the container 1 to be opened by tearing.

Examples of Combinations of the Embodiments

The features of the above-described first to fourth embodiments can be combined as appropriate.

For example, the feature described in relation to the second embodiment that the pleat part 23 is provided along the B axis longer than the A axis may be applied to the first, third, and fourth embodiments. In this case, the ratio of the length of the B axis to the length of the A axis is, for example, 1.2 or more and 3.0 or less.

Further, the features described in relation to the third embodiment that the bottom member 40 constituting the main body 10 has at least the thermoplastic resin layer 42 constituting the inner surface 40x positioned on the containing portion 101 side and the base material laminated on the thermoplastic resin layer 42 and that the base material of the bottom member 40 includes a stretched film may be applied to the first and second embodiments. In this case, the bottom member may further have a print layer. In addition, the tensile strength of the base material may be, for example, 40 MPa or more.

Further, the features described in relation to the third and fourth embodiments that the opening means 17 is formed on the lid 20 and the flange part 12 and that the tear strength of the main body 10 and the lid 20 is 15N or less may be applied to the first and second embodiments. In this case, the flange part 12 may include the first edge portion 13 and the second edge portion 14 extending parallel to each other, and the opening means 17 may be configured to facilitate tearing of the flange part 12 extending along the first edge portion 13 at a position more inside than the outer edge seal portion 18 extending along the first edge portion 13. In addition, the opening means 17 may include at least a notch or a scar group formed in the flange part 12.

REFERENCE SIGNS LIST

1 Container
5 Contents
10 Main body
101 Containing portion
10s Display portion
11 Body part
11a Bottom portion
11b Side portion
12 Flange part
121 Long side portion
122 Short side portion
13 First edge portion
14 Second edge portion
15 Third edge portion
16 Fourth edge portion
17 Opening means
17a Notch
17b Scar group
18 Outer edge seal portion
19 Non-seal portion
20 Lid
21 First lid part
22 Second lid part
23 Pleat part
23a Tip
24 Pleat seal portion
24a, 24b First pleat seal portion
24c Second pleat seal portion
25 Fold-back portion
26 Base
27 First portion
28 Second portion
30 Steam passing portion
31 Through hole
31a Non-seal portion
32 Cutout 34 Peeled portion
35 Protruding seal portion
36 Through hole
37 Non-seal portion
38 Non-seal portion
40 Bottom member (first laminated body)
41 First base material
42 Thermoplastic resin layer
43 Second base material
44 Print layer
45 Intermediate layer
50 Lid member (second laminated body)
51 First base material
52 Print layer
53 Thermoplastic resin layer
54 Second base material
55 Intermediate layer
61 First test piece
62 Second test piece
63 Test piece
71 First holding tool
72 Second holding tool
81 Male mold
82 Female mold
83 Pressing plate
85 Bonding device
90 Test piece
91 First holding tool
92 Second holding tool
95 Test piece
96 Seal portion
97 Incision
98 End point
99a First holding tool
99b Second holding tool

The invention claimed is:

1. A container having a containing portion for containing contents, comprising:
   a main body that includes a body part defining the containing portion and a flange part extending outward from an upper portion of the body part; and
   a lid that is joined to the flange part of the main body via an outer edge seal portion so as to cover the containing portion, the lid being formed by a lid member folded back at a fold-back portion such that portions of the lid member overlap each other, wherein
   the lid has: a pleat part that includes the portions of the lid member overlapping each other and that extends from an edge of one side to an edge of the other side of the lid in a first direction; and a first lid part and a second lid part that are formed by the lid member and that are arranged on opposite sides of the pleat part,
   the pleat part includes: a pleat seal portion in which inner surfaces of the portions of the lid member are joined together and that extends from the edge of the one side to the edge of the other side of the lid in the first direction; and a steam passing portion that includes a through hole or a cutout formed in the pleat seal portion,
   seal strength of the pleat seal portion is lower than that of the outer edge seal portion,
   a bottom member constituting the main body includes at least a thermoplastic resin layer constituting an inner surface located on the containing portion side; and a base material laminated on the thermoplastic resin layer, and
   the base material of the bottom member includes a stretched film.

2. The container as claimed in claim 1, wherein a maximum distance between inner edges of the outer edge seal portion opposed in the first direction D1 is smaller than a maximum distance between the inner edges of the outer edge seal portion opposed in a second direction orthogonal to the first direction.

3. The container as claimed in claim 1, wherein
   the flange part includes a first edge portion and a second edge portion opposed to each other in a second direction orthogonal to the first direction, and
   the pleat part extends in the first direction on a side nearer the first edge portion than a center point of the containing portion of the main body.

4. The container as claimed in claim 3, wherein L2/L1 is between 0.3 and 0.6, where L1 represents a maximum distance in the second direction between the center point of the containing portion of the main body and the inner edge of the outer edge seal portion extending along the first edge portion and L2 represents a maximum distance in the second direction between a base portion of the pleat part and the inner edge of the outer edge seal portion extending along the first edge portion.

5. A container having a containing portion for containing contents, comprising:
   a main body that includes a body part defining the containing portion and a flange part extending outward from an upper portion of the body part; and
   a lid that is joined to the flange part of the main body via an outer edge seal portion so as to cover the containing portion, the lid being formed by a lid member folded back at a fold-back portion such that portions of the lid member overlap each other, wherein
   the lid has: a pleat part that includes the portions of the lid member overlapping each other and that extends from an edge of one side to an edge of the other side of the lid in a first direction; and a first lid part and a second lid part that are formed by the lid member and that are arranged on opposite sides of the pleat part,
   the pleat part includes: a pleat seal portion in which inner surfaces of the portions of the lid member are joined together and that extends from the edge of the one side to the edge of the other side of the lid in the first direction; and a steam passing portion that includes a through hole or a cutout formed in the pleat seal portion,
   seal strength of the pleat seal portion is lower than that of the outer edge seal portion,
   wherein seal strength of the pleat seal portion with a width of 15 mm at 25° C. is 12N or less,
   the seal strength is measured by using test pieces, and
   the test pieces are cut out from a portion of the manufactured container.

6. The container as claimed in claim 1, wherein
   an A axis is shorter than a B axis, where the A axis is an axis that passes through the center point of the containing portion and has a minimum distance when connecting two points in an outer edge of the outer edge seal portion and the B axis is an axis that passes through the center point of the containing portion and connects two points in the outer edge of the outer edge seal portion so as to be orthogonal to the A axis, and
   the pleat part traverses the containing portion and extends along the B axis.

7. The container as claimed in claim 6, wherein a ratio of the length of the B axis to the length of the A axis is between 1.2 and 3.0.

8. The container as claimed in claim 1, wherein the bottom member further includes a print layer.

9. The container as claimed in claim 1, wherein tensile strength of the bottom member is 40 MPa or more.

10. A container having a containing portion for containing contents, comprising:
- a main body that includes a body part defining the containing portion and a flange part extending outward from an upper portion of the body part; and
- a lid that is joined to the flange part of the main body via an outer edge seal portion so as to cover the containing portion, the lid being formed by a lid member folded back at a fold-back portion such that portions of the lid member overlap each other, wherein
- the lid has: a pleat part that includes the portions of the lid member overlapping each other and that extends from an edge of one side to an edge of the other side of the lid in a first direction; and a first lid part and a second lid part that are formed by the lid member and that are arranged on opposite sides of the pleat part,
- the pleat part includes: a pleat seal portion in which inner surfaces of the portions of the lid member are joined together and that extends from the edge of the one side to the edge of the other side of the lid in the first direction; and a steam passing portion that includes a through hole or a cutout formed in the pleat seal portion, and
- seal strength of the pleat seal portion is lower than that of the outer edge seal portion,
- the container further comprising
- a notch or a scar group formed in at least the flange part, wherein tear strength of the main body and the lid is 15N or less.

11. The container as claimed in claim 10, wherein
- the flange part includes a first edge portion and a second edge portion extending parallel to each other, and
- the opening means is configured to facilitate tearing of an area of the flange part extending along the first edge portion at a position more inside than the outer edge seal portion extending along the first edge portion.

12. A method for manufacturing a container including: a containing portion that contains contents and a steam passing portion that is configured to communicate the containing portion with outside when pressure of the containing portion increases, the method comprising:
- a main body preparation step of preparing a main body that includes a body part defining the containing portion and a flange part extending outward from an upper portion of the body part;
- a step of filling contents into the body part of the main body;
- a step of preparing a lid for covering the containing portion; and
- a step of forming an outer edge seal portion by joining the lid to the flange part of the main body, wherein
- the step of preparing the lid comprises:
- a step of preparing a lid member for constituting the lid;
- a step of forming a pleat part by folding back the lid member at a fold-back portion such that portions of the lid member overlap each other;
- a step of forming a pleat seal portion by joining inner surfaces of the portions of the lid member at the pleat part; and
- a step of forming a through hole or a cutout constituting the steam passing portion in the pleat seal portion, and
- the seal strength of the pleat seal portion is lower than that of the outer edge seal portion,
- wherein a bottom member constituting the main body includes at least a thermoplastic resin layer constituting an inner surface located on the containing portion side; and a base material laminated on the thermoplastic resin layer, and
- the base material of the bottom member includes a stretched film.

13. The method for manufacturing a container as claimed in claim 12, wherein the main body preparing step includes: a step of preparing a bottom member for constituting the main body; and a step of forming the body part by subjecting the bottom member to draw forming.

14. The method for manufacturing a container as claimed in claim 12, wherein
- the bottom member for constituting the main body has at least a thermoplastic resin layer constituting an inner surface located on the containing portion side; and a base material laminated on the thermoplastic resin layer, and
- the base material of the bottom member includes a stretched film.

15. The container as claimed in claim 1, wherein
- the pleat seal portion extends along a base portion of the pleat part from one edge portion to the other edge portion of the lid in the first direction.

16. The method for manufacturing a container as claimed in claim 14, wherein
- the pleat seal portion extends along a base portion of the pleat part from one edge portion to the other edge portion of the lid.

* * * * *